(12) United States Patent
Hatta et al.

(10) Patent No.: US 10,084,201 B2
(45) Date of Patent: Sep. 25, 2018

(54) BATTERY, ELECTROLYTE LAYER, BATTERY PACK, ELECTRONIC APPARATUS, ELECTRIC VEHICLE, POWER STORAGE DEVICE, AND ELECTRIC POWER SYSTEM

(71) Applicant: Sony Corporation, Tokyo (JP)

(72) Inventors: Kazuhito Hatta, Fukushima (JP);
Keiichi Kagami, Fukushima (JP);
Nobuaki Shimosaka, Fukushima (JP);
Toshitsugu Ono, Fukushima (JP);
Keizo Koga, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 183 days.

(21) Appl. No.: 14/777,346

(22) PCT Filed: Feb. 21, 2014

(86) PCT No.: PCT/JP2014/000899
§ 371 (c)(1),
(2) Date: Sep. 15, 2015

(87) PCT Pub. No.: WO2014/147955
PCT Pub. Date: Sep. 25, 2014

(65) Prior Publication Data
US 2016/0043429 A1    Feb. 11, 2016

(30) Foreign Application Priority Data

Mar. 19, 2013 (JP) .................. 2013-057330
Nov. 8, 2013 (JP) .................. 2013-232295

(51) Int. Cl.
*H01M 10/056* (2010.01)
*B60L 11/18* (2006.01)
(Continued)

(52) U.S. Cl.
CPC ....... *H01M 10/056* (2013.01); *B60L 11/1851* (2013.01); *H01M 10/052* (2013.01);
(Continued)

(58) Field of Classification Search
CPC combination set(s) only.
See application file for complete search history.

(56) References Cited

U.S. PATENT DOCUMENTS 3,622,398 A * 11/1971 Sekido ................ C01B 5/00
429/57
4,331,744 A * 5/1982 Henk ................ H01M 4/663
429/105

(Continued)

FOREIGN PATENT DOCUMENTS

CN    1452794 A    10/2003
EP    0865092 A2    9/1998
(Continued)

OTHER PUBLICATIONS

Chinese Office Action (with English translation) dated Jan. 13, 2017 in corresponding Chinese application No. 2014800145193 (17 pages).

(Continued)

*Primary Examiner* — Imran Akram
(74) *Attorney, Agent, or Firm* — K&L Gates LLP

(57) ABSTRACT

A gel electrolyte layer is provided between a positive electrode and a second electrode. The gel electrolyte layer is a layer containing particles, a resin material, and a polymer compound for retaining the resin material, and having a heat capacity per unit area of 0.0001 $J/Kcm^2$ or more and a heat capacity per unit volume of 3.0 $J/Kcm^3$ or less.

23 Claims, 9 Drawing Sheets

(51) Int. Cl.
*H02J 7/00* (2006.01)
*H01M 10/0525* (2010.01)
*H01M 10/052* (2010.01)
*H01M 10/0562* (2010.01)
*H01M 10/0565* (2010.01)
*H01M 2/16* (2006.01)
*H01M 2/18* (2006.01)

(52) U.S. Cl.
CPC ... *H01M 10/0525* (2013.01); *H01M 10/0562* (2013.01); *H01M 10/0565* (2013.01); *H02J 7/0068* (2013.01); *H01M 2/1646* (2013.01); *H01M 2/18* (2013.01); *H01M 2220/20* (2013.01); *H01M 2220/30* (2013.01); *H01M 2300/0025* (2013.01); *H01M 2300/0065* (2013.01); *H01M 2300/0085* (2013.01); *Y02E 60/122* (2013.01); *Y02T 10/7011* (2013.01)

(56) References Cited

U.S. PATENT DOCUMENTS

| | | | | |
|---|---|---|---|---|
| 4,400,449 | A * | 8/1983 | Henk | H01M 4/64 429/59 |
| 5,202,196 | A * | 4/1993 | Wang | H01M 2/12 429/204 |
| 2002/0006552 | A1* | 1/2002 | Ishida | H01M 4/13 429/303 |
| 2006/0231808 | A1* | 10/2006 | Sandi-Tapia | C08J 5/22 252/511 |
| 2011/0217600 | A1 | 9/2011 | Torimizu et al. | |
| 2013/0059192 | A1* | 3/2013 | Kajita | H01M 2/1653 429/143 |
| 2014/0205909 | A1* | 7/2014 | Yonehara | H01M 4/42 429/302 |

FOREIGN PATENT DOCUMENTS

| | | |
|---|---|---|
| JP | 05-303980 | 11/1993 |
| JP | 08-255615 | 10/1996 |
| JP | H09-306543 A | 11/1997 |
| JP | 10-334731 | 12/1998 |
| JP | 11-233146 | 8/1999 |
| JP | 2002-543553 A | 12/2002 |
| JP | 2003-257489 | 9/2003 |
| JP | 2005-174686 | 6/2005 |
| JP | 2005-353582 | 12/2005 |
| JP | 2011-060558 A | 3/2011 |
| JP | 2011-159488 | 8/2011 |
| JP | 2011-181353 | 9/2011 |
| JP | 2011-210433 | 10/2011 |
| JP | 2012-074367 | 4/2012 |
| JP | 2012-138335 | 7/2012 |
| JP | 2013-054973 | 3/2013 |
| JP | 2013-137984 | 7/2013 |
| WO | 00/38262 A1 | 6/2000 |
| WO | 01/99220 A1 | 12/2001 |

OTHER PUBLICATIONS

European Search Report dated Sep. 30, 2016 in corresponding European application No. 14769877.3 (8 pages).

International Search Report issued in connection with International Patent Application No. PCT/JP2014/000899, dated Apr. 28, 2014. (2 pages).

Japanese Office Action dated Dec. 20, 2016 in corresponding Japanese application No. 2013-232295 (7 pages).

* cited by examiner

US 10,084,201 B2

BATTERY, ELECTROLYTE LAYER, BATTERY PACK, ELECTRONIC APPARATUS, ELECTRIC VEHICLE, POWER STORAGE DEVICE, AND ELECTRIC POWER SYSTEM

CROSS REFERENCES TO RELATED APPLICATIONS

The present application is a national stage of International Application No. PCT/JP2014/000899 filed on Feb. 21, 2014 and claims priority to Japanese Patent Application No. 2013-057330 filed on Mar. 19, 2013, and Japanese Patent Application No. 2013-232295 filed on Nov. 8, 2013 and the disclosure of which is incorporated herein by reference.

BACKGROUND

The present technology relates to a battery. Furthermore, the present technology relates to an electrolyte layer provided between electrodes of a battery, and a battery pack, an electronic apparatus, an electric vehicle, a power storage device, and an electric power system, all of which use batteries.

In recent years, along with the distribution of portable information-related electronic apparatuses such as mobile telephones, video cameras, and laptop computers, improvement of performance, size reduction, and weight reduction of these apparatuses have been promoted. For the power supplies of these apparatuses, disposable primary batteries or secondary batteries that can be repeatedly used are used; however, from the viewpoint of being capable of effectively achieving a comprehensive balance between enhancement of performance, size reduction, weight reduction, economic efficiency and the like, the demand for non-aqueous electrolyte batteries, particularly the demand for lithium ion secondary batteries, is increasing. Furthermore, further enhancement of performance, size reduction, and the like are underway in connection with these apparatuses, and there is also a new demand for increasing the energy density for non-aqueous electrolyte batteries such as lithium ion secondary batteries.

Thus, for the purpose of an extensive increase in the capacity of lithium ion secondary batteries, it has been suggested to use, for example, a metallic material that is alloyed with lithium at the time of charging as a negative electrode active material as described in Patent Document 1 given below, instead of the carbon-based negative electrode active materials that have been traditionally used. Specifically, silicon, tin, and compounds thereof have been suggested to be used as the metal-based negative electrode active material. For example, it is known that tin (Sn) has a high theoretical capacity (about 994 mAh/g) that highly surpasses the theoretical capacity of graphite (about 372 mAh/g) as a negative electrode active material for lithium ion secondary batteries.

On the other hand, when silicon, tin, or a compound thereof is used as a negative electrode active material, the current density per unit area is increased, and at the same time, the amount of heat generation associated with discharge tends to increase. Furthermore, in regard to the applications in electric tools, electric cars and the like, there are many occasions in which even though for a short time, heat dissipation cannot keep up with the heat generation caused by large current discharge, and there are occasions in which a temperature increase in the battery cannot be avoided. Particularly, at the time of an external short circuit or an internal short circuit of a battery, there is a risk that the amount of heat emitted from the negative electrode side is large, and the separator film is broken by this heat, so that the short circuit may be further extended, or the positive electrode is heated to reach a thermal decomposition temperature, and vigorous emission of heat or gas from the battery may occur. For this reason, the request for enhancement of reliability in a case in which large energy is emitted is also rapidly increasing, and there is a strong demand for a lithium ion secondary battery that achieves a good balance between high reliability against such a test and capacity improvement.

In regard to this, for example, Patent Document 2 suggests dispersing local heat generation of an internal short circuit by incorporating inorganic particles into an electrolyte.

CITATION LIST

Patent Document

Patent Document 1: Japanese Patent Application Laid-Open No. 2005-353582
Patent Document 2: Japanese Patent Application Laid-Open No. 2011-159488

SUMMARY

Problems to be Solved by the Invention

When heat generation occurs in the negative electrode as a whole due to an external short circuit or the like, enormous heat is propagated to the positive electrode, and thereby the positive electrode undergoes a thermal decomposition reaction. Thus, there is a problem of thermal runaway of the positive electrode. For this reason, in order to prevent the heat generated in the negative electrode from being transferred to the positive electrode side, it is required to thermally insulate the space between the positive electrode and the negative electrode.

Therefore, it is an object of the present technology to provide a battery having, between a positive electrode and a negative electrode, an electrolyte layer which absorbs the heat generated in an electrode and prevents the heat from being transferred to the other electrode.

Furthermore, another object of the present technology is to provide a battery pack, an electronic apparatus, an electric vehicle, a power storage device, and an electric power system, all of which use the battery.

Solutions to Problems

In order to solve the problems described above, the battery of the present technology includes a positive electrode, a negative electrode, and an electrolyte layer disposed between the positive electrode and the negative electrode, the electrolyte layer being formed from a gel-like electrolyte containing particles, a liquid electrolyte and a resin material for retaining the liquid electrolyte, or a solid electrolyte containing particles, and the battery has a heat capacity per unit area of the electrolyte layer of 0.0001 J/Kcm$^2$ or more, and a heat capacity per unit volume of 3.0 J/Kcm$^3$ or less.

An electrolyte layer of the present technology formed from a gel-like electrolyte containing particles, a liquid electrolyte, and a resin material for retaining the liquid electrolyte, or from a solid electrolyte containing particles, the electrolyte layer having a heat capacity per unit area of 0.0001 J/Kcm² or more and a heat capacity per unit volume of 3.0 J/Kcm³ or less.

Furthermore, the battery pack, electronic apparatus, electric vehicle, power storage device, and electric power system of the present technology include the battery described above.

In the present technology, the electrolyte layer described above is provided between the positive electrode and the negative electrode. Therefore, for example, at the time of discharge caused by a short circuit, large heat generated in the negative electrode can be absorbed by the aforementioned electrolyte layer, and also, the heat can be prevented from being transferred to the positive electrode.

Effects of the Invention

According to the present technology, large heat generated in the negative electrode being transferred to the positive electrode and causing a thermal decomposition reaction of the positive electrode, can be suppressed.

Additional features and advantages are described herein, and will be apparent from the following Detailed Description and the figures.

DETAILED DESCRIPTION

Hereinafter, the best modes for carrying out the present technology (hereinafter, referred to as embodiments) will be explained. Meanwhile, the explanation will be given as follows.

1. First embodiment (example of a laminate film type battery)
2. Second embodiment (example of a battery pack of the laminate film type battery)
3. Third embodiment (example of the battery pack)
4. Fourth embodiment (example of a power storage system)
5. Other embodiments (modifications)

1. First Embodiment (1-1) Configuration of Non-Aqueous Electrolyte Battery

In the first embodiment, a laminate film type battery will be explained.

Figure 1:
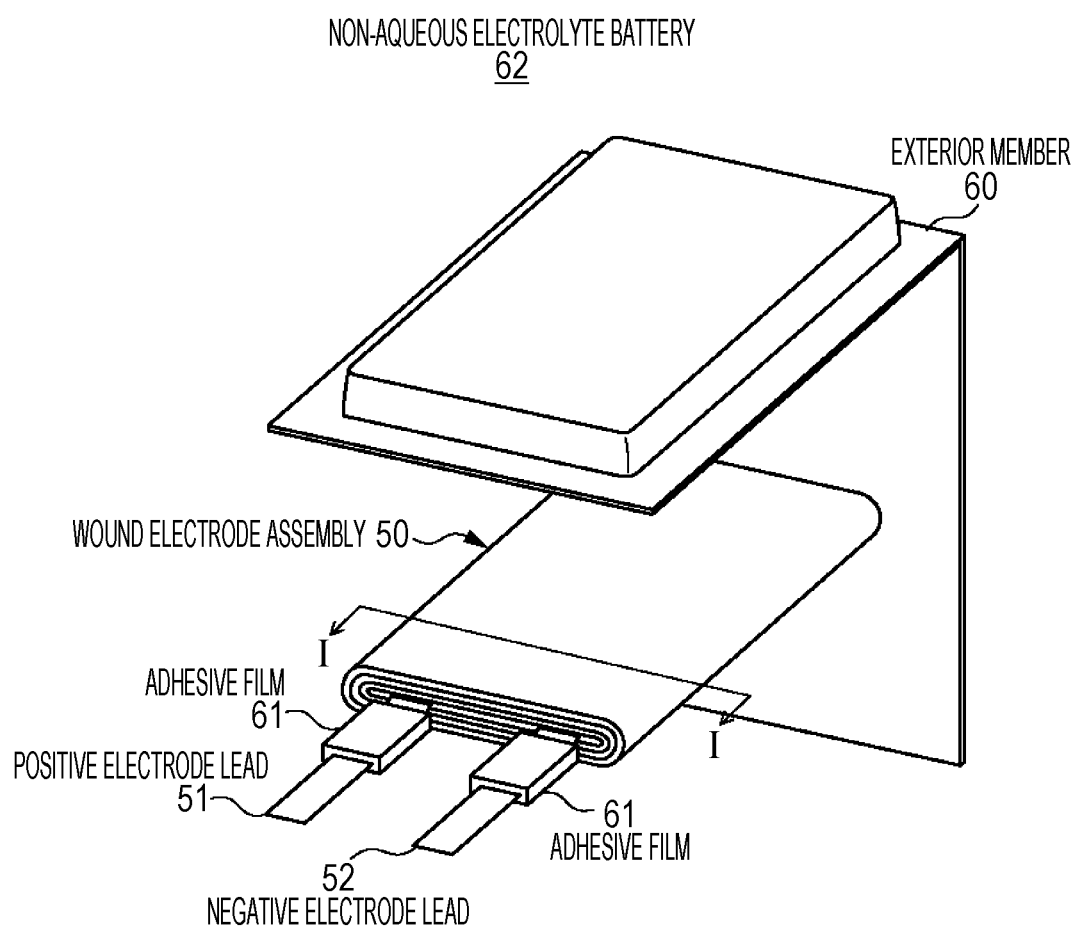
FIG. 1 is an exploded perspective view diagram illustrating the configuration of a laminate film type non-aqueous electrolyte battery related to a first embodiment of the present technology.

FIG. 1 illustrates the configuration of a non-aqueous electrolyte battery 62 according to the first embodiment. This non-aqueous electrolyte battery 62 is a so-called laminate film type, in which a wound electrode assembly 50 equipped with a positive electrode lead 51 and a negative electrode lead 52 is accommodated inside a film-like exterior member 60.

The positive electrode lead 51 and the negative electrode lead 52 are respectively led out from the interior of the exterior member 60 toward the outside, for example, in the same direction. The positive electrode lead 51 and the negative electrode lead 52 are respectively constructed from, for example, a metal material such as aluminum, copper, nickel or stainless steel, and are respectively formed in a thin plate form or a mesh form.

The exterior member 60 is formed from, for example, a laminate film in which a resin layer is formed on both surfaces of a metal layer. In the laminate film, an outer resin layer is formed on the surface that is exposed to the outside of the battery in the metal layer, and an inner resin layer is formed on the surface on the inner side of the battery, which faces the power generating element such as the wound electrode assembly 50.

The metal layer plays the most important role of blocking penetration of moisture, oxygen and light, and protecting the content, and from the viewpoints of lightness, extensibility, price, and the ease of processing, aluminum (Al) is most effectively used. The outer resin layers have good appearance, toughness, flexibility and the like, and a resin material such as nylon or polyethylene terephthalate (PET) is used. The inner resin layers are parts that are melted by heat or ultrasonic waves and are fused with each other, and therefore, a polyolefin resin is appropriate, while cast polypropylene (CPP) is frequently used. If necessary, an adhesive layer may be provided between the metal layer and the outer resin layer as well as the inner resin layer.

The exterior member 60 is provided with a recess for accommodating the wound electrode assembly 50, which is formed, for example, from the inner resin layer side toward the direction of the outer resin layer by deep drawing, and the inner resin layer is installed to face the wound electrode assembly 50. The inner resin layers facing each other in the exterior member 60 are closely adhered to each other by fusion or the like at the outer periphery of the recess. Disposed between the exterior member 60 and the positive electrode lead 51 as well as the negative electrode lead 52 is an adhesive film 61 for increasing the adhesiveness between the inner resin layer of the exterior member 60 and the positive electrode lead 51 as well as the negative electrode lead 52 formed from a metal material. The adhesive film 61 is formed from a resin material which is highly adhesive to a metal material, and the adhesive film 61 is constructed from, for example, a polyolefin resin such as polyethylene, polypropylene, or a modified polyethylene or a modified polypropylene obtained by modifying polyethylene or polypropylene.

Meanwhile, the exterior member 60 may be constructed from a laminate film having a different structure, a polymer film of polypropylene or the like, or a metal film, instead of the aluminum laminate film in which the metal layer is formed of aluminum (Al).

Figure 2:
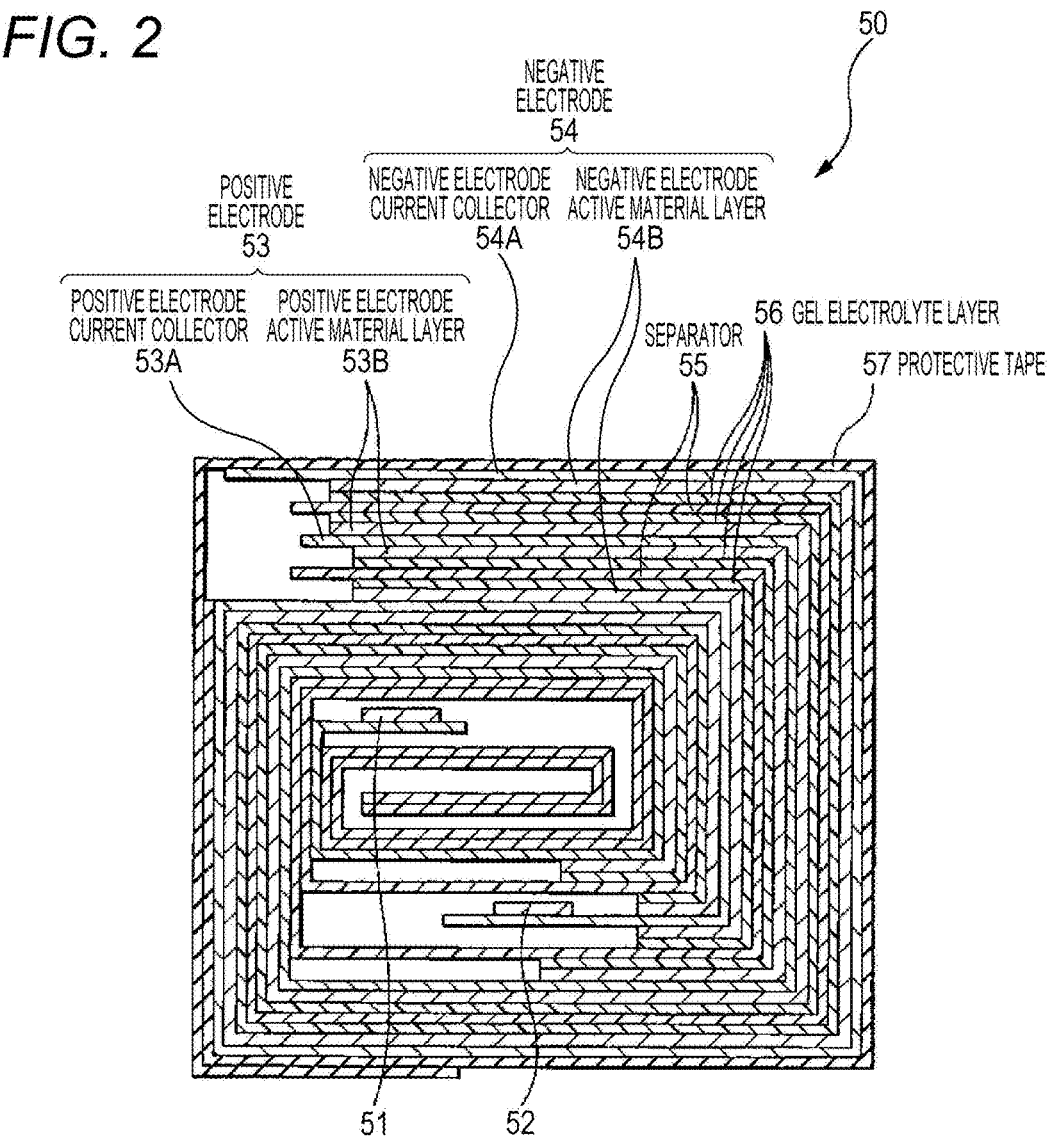
FIG. 2 is a cross-sectional diagram illustrating the cross-sectional configuration, as cut along the line I-I, of the wound electrode assembly illustrated in FIG. 1.

FIG. 2 illustrates the cross-sectional structure of the wound electrode assembly 50 illustrated in FIG. 1 as cut along the line I-I. The wound electrode assembly 50 is obtained by laminating a positive electrode 53 and a negative electrode 54, with a separator 55 and a gel electrolyte layer 56 interposed therebetween, and winding the assembly, and the outermost periphery is protected by a protective tape 57 as necessary.

[Positive Electrode]

The positive electrode 53 has a structure in which a positive electrode active material layer 53B is provided on one surface or on both surfaces of a positive electrode current collector 53A.

The positive electrode 53 is a product in which the positive electrode active material layer 53B containing a positive electrode active material is formed on both surfaces of the positive electrode current collector 53A. Regarding the positive electrode current collector 53A, for example, a metal foil such as an aluminum (Al) foil, a nickel (Ni) foil, or a stainless steel (SUS) foil can be used.

The positive electrode active material layer 53B is configured to include, for example, a positive electrode active material, a conductive agent, and a binder. Regarding the positive electrode active material, any one kind or two or more kinds of positive electrode materials capable of lithium intercalation and deintercalation can be used, and the positive electrode active material may include other materials such as a binder and a conductive agent.

The positive electrode material capable of lithium intercalation and deintercalation is preferably, for example, a lithium-containing compound. It is because a high energy density is obtained. Examples of this lithium-containing compound include composite oxides containing lithium and transition metal elements, and phosphoric acid compounds containing lithium and transition metal elements. Among them, it is preferable that the lithium-containing compound contains at least one selected from the group consisting of cobalt (Co), nickel (Ni), manganese (Mn) and iron (Fe), as the transition metal element. It is because a higher voltage is obtained.

For the positive electrode material, for example, a lithium-containing compound represented by $Li_xM1O_2$ or $Li_yM2PO_4$ can be used. In the formulas, M1 and M2 represent one or more kinds of transition metal elements. The values of x and y may vary depending on the charge-discharge state of the battery, and the values are usually such that $0.05 \leq x \leq 1.10$ and $0.05 \leq y \leq 1.10$. Examples of the composite oxides containing lithium and transition metal elements include lithium-cobalt composite oxide ($Li_xCoO_2$), lithium-nickel composite oxide ($Li_xNiO_2$), lithium-nickel-cobalt composite oxide ($Li_xNi_{1-z}Co_zO_2$ ($0<z<1$)), lithium-nickel-cobalt-manganese composite oxide ($Li_xNi_{(1-v-w)}Co_vMn_wO_2$ ($0<v+w<1$, $v>0$, $w>0$)), and lithium manganese composite oxide ($LiMn_2O_4$) or a lithium-manganese-nickel composite oxide ($LiMn_{2-t}Ni_tO_4$ ($0<t<2$)), both having a spinel type structure. Among them, composite oxides containing cobalt are preferred. It is because a high capacity is obtained, and also excellent cycle characteristics are obtained. Furthermore, examples of the phosphoric acid compounds containing lithium and transition metal elements include lithium-iron phosphate compound ($LiFePO_4$) and lithium-iron-manganese phosphate compound ($LiFe_{1-u}Mn_uPO_4$ ($0<u<1$)).

Specific examples of such a lithium composite oxide include lithium cobaltate ($LiCoO_2$), lithium nickelate ($LiNiO_2$), and lithium manganate ($LiMn_2O_4$). Furthermore, a solid solution in which a portion of a transition metal element is substituted with another element can also be used. For example, nickel-cobalt composite lithium oxide ($LiNi_{0.5}Co_{0.5}O_2$, $LiNi_{0.8}Co_{0.2}O_2$, or the like) is an example thereof. These lithium composite oxides are materials which can generate high voltages and have excellent energy densities.

Moreover, from the viewpoint that superior electrode chargeability and cycle characteristics are obtained, composite particles in which the surface of particles formed from any one of the lithium-containing compounds described above is coated with fine particles formed from any one of other lithium-containing compounds, may also be used.

In addition to this, examples of the positive electrode material capable of lithium intercalation and deintercalation include oxides such as vanadium oxide ($V_2O_5$), titanium dioxide ($TiO_2$), and manganese dioxide ($MnO_2$); disulfides such as iron disulfide ($FeS_2$), titanium disulfide ($TiS_2$), and molybdenum disulfide ($MoS_2$); chalcogenides (particularly, lamellar compounds and spinel type compounds) that do not contain lithium, such as niobium diselenide ($NbSe_2$); lithium-containing compounds containing lithium; sulfur; and conductive polymers such as polyaniline, polythiophene, polyacetylene, and polypyrrole. As a matter of fact, the positive electrode material capable of lithium intercalation and deintercalation may be any material other than those described above. Furthermore, the series of positive electrode materials described above may be used as mixtures of two or more kinds in arbitrary combinations.

Regarding the conductive agent, for example, a carbon material such as carbon black or graphite is used. Regarding the binder, for example, at least one selected from resin materials such as polyvinylidene fluoride (PVdF), polytetrafluoroethylene (PTFE), polyacrylonitrile (PAN), styrene-butadiene rubber (SBR), and carboxymethyl cellulose (CMC); and copolymers including these resin materials as main components, is used.

The positive electrode 53 has a positive electrode lead 51 that is connected to one end of the positive electrode current collector 53A by spot welding or ultrasonic welding. It is desirable that this positive electrode lead 51 is in the form of a metal foil or a mesh-shaped material; however, any material that is electrochemically and chemically stable and is capable of conduction may be used without any problem, even if the material is not a metal. Examples of the material for the positive electrode lead 51 include aluminum (Al) and nickel (Ni).

[Negative Electrode]

The negative electrode 54 has a structure in which a negative electrode active material layer 54B is provided on one surface or on both surfaces of a negative electrode current collector 54A, and the negative electrode active material layer 54B and the positive electrode active material layer 53B are disposed to face each other.

Meanwhile, although not shown in the diagram, it is still acceptable to provide the negative electrode active material layer 54B on only one surface of the negative electrode current collector 54A. The negative electrode current collector 54A is formed from, for example, a metal foil such as a copper foil.

The negative electrode active material layer 54B is configured to include any one kind or two or more kinds of negative electrode materials capable of lithium intercalation and deintercalation as a negative electrode active material, and the negative electrode active material layer 54B may be configured to optionally include other materials such as a binder and a conductive agent similar to those of the positive electrode active material layer 53B.

Meanwhile, in this non-aqueous electrolyte battery 62, the electrochemical equivalent of the negative electrode material capable of lithium intercalation and deintercalation is larger than the electrochemical equivalent of the positive electrode 53, and theoretically, lithium metal is not supposed to be precipitated on the negative electrode 54 in the middle of charging.

Furthermore, this non-aqueous electrolyte battery 62 is designed such that the open circuit voltage (that is, the battery voltage) in a fully charged state is, for example, in the range of from 2.80 V to 6.00 V. Particularly, when a material which forms a lithium alloy at near 0 V with respect to Li/Li$^+$ is used as the negative electrode active material, it is designed such that the open circuit voltage in a fully charged state is, for example, in the range of from 4.20 V to 6.00 V. In this case, the open circuit voltage in a fully charged state is preferably set to from 4.25 V to 6.00 V. When the open circuit voltage in a fully charged state is set to 4.25 V or higher, even if the same positive electrode active material is used, the amount of lithium released per unit mass is larger compared with a battery having an open circuit voltage of 4.20 V. Therefore, the amounts of the positive electrode active material and the negative electrode active material are adjusted in accordance thereto. Thereby, a high energy density may be obtained.

Examples of the negative electrode material capable of lithium intercalation and deintercalation include carbon materials such as non-graphitizable carbon, easily graphitizable carbon, graphite, pyrolytic carbons, cokes, glassy carbons, organic polymer compound calcination products, carbon fibers, and activated carbon. Among these, examples of the cokes include pitch coke, needle coke, and petroleum coke. An organic polymer compound calcination product means a product obtained by carbonizing a polymer material such as a phenolic resin or a furan resin by calcination at an appropriate temperature, and some of the organic polymer compound calcination products are classified as non-graphitizable carbon or easily graphitizable carbon. These carbon materials are preferable because there is less change in the crystal structure occurring at the time of charging and discharging, a high charge-discharge capacity can be obtained, and satisfactory cycle characteristics can be obtained. Particularly, graphite is preferred because it has a high electrochemical equivalent and can give a high energy density. Furthermore, non-graphitizable carbon is preferred because excellent cycle characteristics are obtained. In addition, a material having a low charge-discharge potential, specifically a material having a charge-discharge potential close to that of lithium metal, is preferred because increase of the energy density of batteries can be easily realized.

Examples of other negative electrode materials that are capable of lithium intercalation and deintercalation and are capable of capacity increase include materials which are capable of lithium intercalation and deintercalation and contain at least one of metal elements and semimetal elements as a constituent element. It is because when such a material is used, a high energy density can be obtained. Particularly, when such a material is used together with a carbon material, it is more preferable because a high energy density can be obtained, and also, excellent cycle characteristics can be obtained. This negative electrode material may be a simple substance, an alloy or a compound of a metal element or a semimetal element, and may also be a material having one phase or two or more phases of these materials in at least a portion. Meanwhile, according to the present technology, alloys include alloys composed of two or more kinds of metal elements, as well as alloys containing one or more kinds of metal elements and one or more kinds of semimetal elements. Furthermore, alloys may also contain non-metal elements. The structure of an alloy may be a solid solution, a eutectic crystal (eutectic mixture), or an intermetallic compound, or two or more kinds thereof may co-exist in the structure.

Examples of the metal element or semimetal element that constitutes this negative electrode material include metal elements or semimetal elements that are capable of forming alloys with lithium. Specific examples thereof include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These may be in a crystalline state or may be in an amorphous state.

Examples of the negative electrode material include lithium titanate ($Li_4Ti_5O_{12}$). Furthermore, regarding the negative electrode material, a material containing a metal element or a semimetal element of Group 4B in the short period periodic table as a constituent element is preferred, and a more preferred one is a material containing at least one of silicon (Si) and tin (Sn) as a constituent element, while a particularly preferred one is a material containing at least silicon. It is because silicon (Si) and tin (Sn) have a high ability to intercalate and deintercalate lithium, and high energy densities can be obtained. Examples of the negative electrode material having at least one of silicon and tin include simple substance, an alloy or a compound of silicon, simple substance, an alloy or a compound of tin, and a material having one phase or two or more phases thereof in at least a portion thereof.

Examples of alloys of silicon include alloys containing, as a second constituent element in addition to silicon, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of alloys of tin include alloys containing, as a second constituent element in addition to tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds containing oxygen (O) or carbon (C), and these compounds may also contain the second constituent elements described above, in addition to tin (Sn) or silicon (Si).

Among them, regarding this negative electrode material, a SnCoC-containing material that contains cobalt (Co), tin (Sn) and carbon (C) as constituent elements, has a content of carbon of from 9.9% by mass to 29.7% by mass, and has a proportion of cobalt (Co) of from 30% by mass to 70% by mass with respect to the sum of tin (Sn) and cobalt (Co), is preferred. It is because high energy densities can be obtained, and excellent cycle characteristics can be obtained in such a composition range.

This SnCoC-containing material may further contain another constituent element, if necessary. Preferred examples of the other constituent element include silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), and bismuth (Bi), and the SnCoC-containing material may contain two or more kinds thereof. It is because the capacity or cycle characteristics can be further enhanced.

Meanwhile, it is preferable that this SnCoC-containing material has a phase containing tin (Sn), cobalt (Co) and carbon (C), and this phase has a structure with low crystallinity or an amorphous structure. Furthermore, it is preferable that in this SnCoC-containing material, at least a portion of carbon (C) as a constituent element is bonded to a metal element or semimetal element as another constituent element. It is because although deterioration of cycle characteristics is considered to be caused by aggregation or crystallization of tin (Sn) or the like, such aggregation or crystallization can be suppressed when carbon (C) is bonded to another element.

Regarding an analytic method of investigating the bonded state of elements, for example, X-ray photoelectron spectroscopy (XPS) may be used. In XPS, in the case of graphite, the peak of the 1s orbital (C1s) of carbon is observed at 284.5 eV when analyzed by an apparatus that has been subjected to energy calibration so as to obtain the peak of the 4f orbital of a gold atom (Au4f) at 84.0 eV. Furthermore, in the case of surface contamination carbon, the peak of C1s is observed at 284.8 eV. On the contrary, when the charge density of carbon element is increased, for example, when carbon is bonded to a metal element or a semimetal element, the peak of C1s is observed in a region lower than 284.5 eV. That is, in a case in which the peak of a synthetic wave of C1s obtainable from a SnCoC-containing material is observed in a region lower than 284.5 eV, at least a portion of the carbon contained in the SnCoC-containing material is bonded to a metal element or a semimetal element as another constituent element.

Meanwhile, in the XPS analysis, for example, the peak of C1s is used for the compensation of the energy axis of the spectrum. Since surface contamination carbon usually exists on the surface, the peak of C1s of the surface contamination carbon is set to 284.8 eV, and this is used as an energy reference. In the XPS analysis, since the waveform of the peak of C1s is obtained as a form including the peak of the surface contamination carbon and the peak of carbon in the SnCoC-containing material, for example, the peak of the surface contamination carbon and the peak of carbon in the SnCoC-containing material are separated by analyzing the waveform using a commercially available software. For the analysis of the waveform, the position of the main peak existing on the lowest bound energy side is designated as the energy reference (284.8 eV).

[Separator]

The separator 55 is a porous film composed of an insulating film having a high ion permeability and predetermined mechanical strength. In a case in which the separator 55 is applied to a non-aqueous electrolyte battery, a non-aqueous liquid electrolyte is retained in the pores of the separator 55. The separator 55 needs to have predetermined mechanical strength and also needs to have characteristics of high resistance to non-aqueous liquid electrolytes, low reactivity, and being not easily swellable. Furthermore, when the separator 55 is used in an electrode assembly having a wound structure, flexibility is also required.

Regarding the resin material that constitutes such separator 55, it is preferable to use, for example, a polyolefin resin such as polypropylene or polyethylene, an acrylic resin, a styrene resin, a polyester resin, or a nylon resin. Particularly, polyethylene such as low density polyethylene, high density polyethylene, or linear polyethylene; or low molecular weight waxes thereof, or polyolefin resins such as polypropylene are suitably used because these resins have appropriate melting temperatures and are easily available. Furthermore, it is also acceptable to use a structure obtained by laminating porous films of two or more kinds of these resins, or a porous film formed by melt kneading two or more kinds of the resin material. A separator including a porous film formed from a polyolefin resin has excellent separability between the positive electrode 53 and the negative electrode 54 and can further reduce the decrease of internal short circuits.

The thickness of the separator 55 can be arbitrarily set as long as it is larger than or equal to a thickness which can maintain necessary strength. It is preferable that the separator 55 is set to have a thickness which promotes insulation between the positive electrode 53 and the negative electrode 54, prevents a short circuit or the like, has ion permeability intended for suitably performing a battery reaction involving the separator 55, and can increase the volumetric efficiency of the active material layer that contributes to the battery reaction in the battery as far as possible. Specifically, the thickness of the separator 55 is preferably from 7 μm to 20 μm.

The porosity of the separator 55 is preferably from 25% to 80%, and more preferably from 25% to 40%, in order to obtain the ion permeability described above. The porosity may vary depending on characteristics such as the current value at the time of actual use of the battery, and the pore structure of the separator 55, or the thickness; however, if the porosity is smaller than the range described above, migration of ions in the non-aqueous liquid electrolyte related to charging and discharging is obstructed. For this reason, the load characteristics are deteriorated, and also, it becomes difficult to extract a sufficient capacity at the time of large current discharge. Furthermore, if the porosity increases to a value outside the range described above, the strength of the separator is decreased.

[Gel Electrolyte Layer]

A gel electrolyte layer 56 contains, for example, particles such as solid particles, such as at least any one of inorganic particles and organic particles that serve as heat absorbent particles, a non-aqueous liquid electrolyte, and a resin material serving as a retaining body that retains the non-aqueous liquid electrolyte.

The gel electrolyte layer 56 is a gel-like ion conductor which contains particles and acquires a so-called gel form as the resin material is swollen by the non-aqueous liquid electrolyte. The gel electrolyte layer 56 is preferable because high ion conductivity can be obtained, and liquid leakage of the battery can be prevented.

The gel electrolyte layer 56 is formed between the positive electrode 53 and the negative electrode 54. For example, the gel electrolyte layer 56 is formed between the positive electrode 53 and the negative electrode 54. More specifically, for example, the gel electrolyte layer 56 is formed between the positive electrode 53 and the negative electrode 54, or in a case in which there is a separator 55, the gel electrolyte layer 56 is formed at least one of between the positive electrode 53 and the separator 55, and between the negative electrode 54 and the separator 55. Meanwhile, in the example illustrated in the drawing, the gel electrolyte layer 56 is formed both between the positive electrode 53 and the separator 55, and between the negative electrode 54 and the separator 55.

The gel electrolyte layer 56 is an ion conductor, and also has a function of mainly absorbing the heat generated in the negative electrode 54 and preventing the heat generated in the negative electrode 54 from being transferred to the positive electrode 53. The gel electrolyte layer 56 is intended to make heat transfer difficult, and it is preferable that particles are allowed to exist in a dispersed state. Meanwhile, according to the present technology, dispersion means a state in which particles, or groups of particles that have formed secondary particles, are present in a scattered manner without being connected and without forming lumps; however, some of the particles or the groups of particles that have formed secondary particles may be in a connected state. That is, a state in which particles are dispersed in the whole gel electrolyte layer 56 is preferred.

The gel electrolyte layer 56 has the heat capacity per area adjusted to 0.0001 $J/Kcm^2$ or more in order to sufficiently absorb the heat generated in the negative electrode 54, and it is more preferable that the heat capacity per area is adjusted to 0.0003 $J/Kcm^2$ or more. Meanwhile, the heat capacity per area is expressed as the product of the mass of particles in a unit area and the specific heat capacity of the particles. Furthermore, in a case in which the gel electrolyte layer 56 is provided both between the positive electrode 53 and the separator 55, and between the negative electrode 54 and the separator 55, the heat capacity per area is calculated on the basis of the mass and specific heat capacity of the particles present on both surfaces of the separator 55 in a unit area.

Meanwhile, although the non-aqueous liquid electrolyte and the resin material retained in the gel electrolyte layer 56 also have heat capacities, there is a possibility that the heat may be dissipated from the gel electrolyte layer 56 due to gas generation caused by abnormal heat generation, or the like. Therefore, according to the present technology, the heat capacity of the simple substance of the heat absorbent particles is designated as the heat capacity per area of the gel electrolyte layer 56.

Furthermore, in order to make it more difficult for the heat generated in the negative electrode 54 to be transferred to the positive electrode 53, the gel electrolyte layer 56 has the heat capacity per volume adjusted to 3.0 $J/Kcm^3$ or less, and it is more preferable that the heat capacity per volume is adjusted to 2.5 $J/Kcm^3$ or less. Meanwhile, the heat capacity per volume is expressed as the product of the packing ratio, the true density, and the specific heat capacity of particles in a unit volume, and is directly proportional to the packing density of the particles in the gel electrolyte layer 56. When both the heat capacity per area and the capacity per volume are adjusted to the ranges described above, the heat generated in the negative electrode 54 can be absorbed by the gel electrolyte layer 56, and the heat absorbed by the gel electrolyte layer 56 can be prevented from being transferred to the positive electrode 53.

Here, the heat capacity per volume of 3.0 $J/Kcm^3$ or less of the gel electrolyte layer 56 is the property obtainable at the time point when the gel electrolyte layer 56 has been formed. That is, when the non-aqueous electrolyte battery 62 is subjected to charging and discharging, the gel electrolyte layer 56 is collapsed as a result of expansion of the electrodes or the like, and the heat capacity per volume is increased. As a reference, when a gel electrolyte layer 56 having a heat capacity per volume of 3.0 $J/Kcm^3$ and a thickness of 15 μm is used, although the heat capacity per volume may vary depending on the configuration of the gel electrolyte layer 56, generally the heat capacity per volume of the gel electrolyte layer 56 after first charging of the non-aqueous electrolyte battery is about 3.2 $J/Kcm^3$. Also, as charging and discharging of the non-aqueous electrolyte battery 62 progress, the collapse of the gel electrolyte layer 56 is extended, and after 500 cycles of charging and discharging, the heat capacity per volume of the gel electrolyte layer 56 is about 3.8 $J/Kcm^3$. In general, the non-aqueous electrolyte battery 62 is shipped after first charging is performed. By adjusting the heat capacity per volume of the gel electrolyte layer 56 to 3.2 $J/Kcm^3$ or less at the time of shipping, propagation of heat between the electrodes can be suppressed.

According to the present technology, a gel electrolyte layer 56 having a heat capacity per volume of 3.0 $J/Kcm^3$ or less is formed at the time of forming the gel electrolyte layer 56, in order to obtain the effects of the gel electrolyte layer 56 of the present technology during the service period of the non-aqueous electrolyte battery 62. By adjusting the heat capacity per volume to 3.0 $J/Kcm^3$ or less in a state before first charging, the heat capacity per volume at the time of first charging (at the time of shipping) can be adjusted to 3.2 $J/Kcm^3$ or less. Furthermore, even if the gel electrolyte layer 56 is compressed along with the progress of cycles, when the heat capacity per volume of the gel electrolyte layer 56 is in the range of 3.8 $J/Kcm^3$ or less, the "increase in the amount of heat conduction per area" and the "decrease in the amount of heat generation per area at the time of a short circuit", which occur with the progress of cycles, cancel each other. This is because, as the gel electrolyte layer 56 is compressed and the heat capacity per volume is increased along with the progress of cycles, the amount of heat conduction per area is also increased; however, the output power (current) is decreased as a result of the increase in the internal resistance that comes with the progress of cycles, so as to cancel the increase in the amount of heat conduction per area, and thus the amount of heat generation per area is decreased. For this reason, safety is maintained for the battery as a whole.

In regard to the heat absorbent particles, a higher heat absorption effect can be obtained as the amount of the heat absorbent particles is larger. However, in many cases, a substance having a large heat capacity also has high thermal conductivity, and if the heat absorbent particles are compactly packed, there is a risk that the particles may transfer heat from the negative electrode 54 efficiently to the positive electrode 53. Therefore, it is necessary to disperse the heat absorbent particles sparsely in the gel electrolyte layer 56 and to thereby make the heat capacity per volume small so as to be in the range described above, and it is also necessary to disperse the respective heat absorbent particles without being connected to one another.

In a case in which gel electrolyte layer 56 is provided between the negative electrode 54 and the separator 55, the temperature increase in the vicinity of the separator 55 becomes mild, and the time taken by the separator 55 to reach a molten state after shutdown can be lengthened. For this reason, a discharge reaction can be suppressed, and heat generation can be suppressed. Meanwhile, in a case in which the gel electrolyte layer 56 is provided only between the negative electrode 54 and the separator 55, a layer having a flat shape and having excellent heat resistance and oxidation resistance may be provided on the positive electrode-facing side of the separator 55, which is positioned between the positive electrode 53 and the separator 55. When the full charge voltage of the battery is set to a value such as 4.25 V or higher, which is higher than the conventional value, the vicinity of the positive electrode may turn to an oxidizing atmosphere at the time of full charge. Therefore, there is a risk that the positive electrode-facing side may be oxidized and deteriorated. In order to suppress this, a layer containing a resin material having especially excellent properties in connection with heat resistance and oxidation resistance may be formed.

On the other hand, in a case in which the gel electrolyte layer 56 is provided between the positive electrode 53 and the separator 55, even if the separator 55 has melted down, the particles can maintain insulation between the positive electrode 53 and the negative electrode 54, and can continuously suppress heat transfer to the positive electrode 53 by absorbing the heat generated in the negative electrode 54. Therefore, some time can be gained until the non-aqueous liquid electrolyte at the interface between the negative electrode 54 and the separator 55 is evaporated and thereby the discharge reaction is terminated.

Then, in a case in which the gel electrolyte layer 56 is provided between the negative electrode 54 and the separator 55 and between the positive electrode 53 and the separator 55, it is particularly preferred because the functions of both the case of providing the gel electrolyte layer 56 between the negative electrode 54 and the separator 55 and the case of providing the gel electrolyte layer 56 between the positive electrode 53 and the separator 55 can be obtained.

It is preferable that the gel electrolyte layer 56 has a smooth surface. For example, by adjusting the thickness of the gel electrolyte layer 56, the gel electrolyte layer 56 can be configured to have particles sparsely dispersed over the whole layer.

Hereinafter, the non-aqueous liquid electrolyte and the resin material that constitute the gel electrolyte layer 56 will be explained.

[Non-Aqueous Liquid Electrolyte]

The non-aqueous liquid electrolyte includes an electrolyte salt and a non-aqueous solvent that dissolves this electrolyte salt.

[Electrolyte Salt]

The electrolyte salt contains, for example, one kind or two or more kinds of light metal compounds such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Among them, at least one selected from the group consisting of lithium hexafluorophosphate, lithium tetrafluoroborate, lithium perchlorate, and lithium hexafluoroarsenate is preferred, and lithium hexafluorophosphate is more preferred.

[Non-Aqueous Solvent]

Examples of the non-aqueous solvent include non-aqueous solvents, such as lactone-based solvents such as γ-butyrolactone, γ-valerolactone, δ-valerolactone, and ε-caprolactone; carbonic acid ester-based solvents such as ethylene carbonate, propylene carbonate, butylene carbonate, vinylene carbonate, dimethyl carbonate, ethyl methyl carbonate, and diethyl carbonate; ether-based solvents such as 1,2-dimethoxyethane, 1-ethoxy-2-methoxyethane, 1,2-diethoxyethane, tetrahydrofuran, and 2-methyltetrahydrofuran; nitrile-based solvents such as acetonitrile; sulfolane-based solvents; phosphoric acids and phosphoric acid ester solvents; and pyrrolidones. Regarding the solvents any one kind thereof may be used alone, or two or more kinds may be used in mixture.

Furthermore, it is preferable to use a cyclic carbonic acid ester and a chain-like carbonic acid ester in mixture as the non-aqueous solvent, and a solvent including a compound in which part or all of the hydrogen atoms of the cyclic carbonic acid ester or the chain-like carbonic acid ester have been fluorinated, is more preferred. Regarding this fluorinated compound, it is preferable to use fluoroethylene carbonate (4-fluoro-1,3-dioxolan-2-one; FEC) and difluoroethylene carbonate (4,5-difluoro-1,3-dioxolan-2-one; DFEC). It is because even in a case in which a negative electrode 54 containing a compound of silicon (Si), tin (Sn), germanium (Ge) or the like is used as the negative electrode active material, the charge-discharge cycle characteristics can be enhanced. Among them, it is preferable to use difluoroethylene carbonate as the non-aqueous solvent. It is because the cycle characteristics improving effect is excellent.

[Resin Material]

Regarding the resin material, a matrix polymer compound having properties that are compatible to the solvent can be used. Examples of such resin material include fluorine-containing resins such as polyvinylidene fluoride and polytetrafluoroethylene; fluorine-containing rubbers such as a vinylidene fluoride-tetrafluoroethylene copolymer and an ethylene-tetrafluoroethylene copolymer; rubbers such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, an ethylene-propylene rubber, polyvinyl alcohol, and polyvinyl acetate; cellulose derivatives such as ethyl cellulose, methyl cellulose, hydroxyethyl cellulose, and carboxymethyl cellulose; and resins with at least one of the melting point and the glass transition temperature being 180° C. or higher, such as polyphenylene ether, polysulfone, polyether sulfone, polyphenylene sulfide, polyetherimide, polyimide, polyamide (particularly, aramid), polyamideimide, polyacrylonitrile, polyvinyl alcohol, polyether, an acrylic acid resin, and polyester.

[Heat Absorbent Particles]

Regarding the particles such as solid particles, such as at least one of inorganic particles and organic particles, that are heat absorbent particles contained in the gel electrolyte layer 56, it is preferable to use a material having a specific heat capacity of 0.5 J/gK or more. It is because the heat absorption effect is increased. Furthermore, since the amount of particles (mass) needed to obtain a predetermined heat capacity per area can be reduced, the amount of the resin material (mass) that supports the particles can also be reduced. Furthermore, it is preferable to use a material having low thermal conductivity. It is because the effect of making the transfer of heat from the negative electrode 54 to the positive electrode 53 difficult is increased. Furthermore, it is preferable to use a material having a melting point of 1000° C. or higher. It is because heat resistance can be enhanced.

Specific examples thereof include metal oxides, metal oxide hydrides, metal hydroxides, metal nitrides, metal carbides, and metal sulfides, which are electrically insulating inorganic particles. Regarding the metal oxides or metal oxide hydrides, aluminum oxide (alumina, $Al_2O_3$), boehmite ($Al_2O_3H_2O$ or AlOOH), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), zinc oxide (ZnO), and the like can be suitably used. Regarding the metal nitrides, silicon nitride ($Si_3N_4$), aluminum nitride (AlN), boron nitride (BN), titanium nitride (TiN), and the like can be suitably used. Regarding the metal carbides, silicon carbide (SiC), boron carbide ($B_4C$), and the like can be suitably used. Regarding the metal sulfide, a sulfate compound such as barium sulfate ($BaSO_4$) can be suitably used. Regarding the metal hydroxide, aluminum hydroxide ($Al(OH)_3$) or the like can be used. Silicate, barium titanate ($BaTiO_3$), and strontium titanate ($SrTiO_3$) may also be used.

Examples of the silicate mineral include nesosilicate minerals, sorosilicate minerals, cyclosilicate minerals, inosilicate minerals, phyllosilicate minerals (layered silicate minerals), tectosilicate minerals, fibrous silicate minerals called asbestos group, and other silicate minerals. Meanwhile, the classification of nesosilicate minerals, sorosilicate minerals, cyclosilicate minerals, inosilicate minerals, phyllosilicate minerals, and tectosilicate minerals is based on the crystal structure, and the classification of the asbestos group is based on a classification criterion different from that of the crystal structure.

A nesosilicate mineral is an island-shaped tetrahedral silicate mineral formed by independent Si—O tetrahedrons ($[SiO_4]^{4-}$). Examples of the nesosilicate minerals include minerals that belong to the olivine group and the garnet group. More specific examples of the nesosilicate minerals include olivines (olivine, a continuous solid solution of $Mg_2SiO_4$ (forsterite) and $Fe_2SiO_4$ (fayalite)), and mullite ($3Al_2O_3.2SiO_2$ to $2Al_2O_3.SiO_2$).

A sorosilicate mineral is a grouped structure type silicate mineral formed by multiple bonded groups of Si—O tetrahedrons ($[Si_2O_7]^{6-}$ and $[Si_5O_{16}]^{12-}$). Examples of the sorosilicate minerals include minerals that belong to the vesuvianite and epidotes.

A cyclosilicate mineral is a ring form type silicate mineral formed by ring forms having limited (3 to 6) bonds of Si—O tetrahedrons ($[Si_3O_9]^{6-}$, $[Si_4O_{12}]^{8-}$, and $[Si_6O_{18}]^{12-}$). Examples of the cyclosilicate minerals include beryl and tourmaline.

An inosilicate mineral is a fibrous silicate mineral in which the linkage of Si—O tetrahedrons is limitlessly extended to form a chain shape ($[Si_2O_6]^{4-}$) and a band shape ($[Si_3O_9]^{6-}$, $[Si_4O_{11}]^{6-}$, $[Si_5O_{15}]^{10-}$ and $[Si_7O_{21}]^{14-}$). Examples of the inosilicate minerals include minerals that belong to pyroxenes such as calcium silicates (wollastonite) and $CaSiO_3$), and minerals that belong to amphiboles.

A phyllosilicate mineral is a layered type silicate mineral that forms network-like bonding of Si—O tetrahedrons ($[SiO_4]^{4-}$). A phyllosilicate mineral includes a tetrahedral sheet of Si—O, and an octahedral sheet of Al—O, Mg—O and the like that combine with a tetrahedral sheet. Phyllosilicate minerals are classified typically based on the numbers of the tetrahedral sheets and octahedral sheets, the number of cations in an octahedron, and the layer charge. Meanwhile, the phyllosilicate mineral may also be a compound in which all or some of interlayer metal ions have been substituted by organic ammonium ions or the like.

Specifically, examples of the phyllosilicate minerals include minerals that belong to kaolinite-serpentine group having a 1:1 type structure, pyrophyllite-talc group having a 2:1 type structure, smectite group, vermiculite group, mica group, brittle mica group, and chlorite group.

Examples of compounds that belong to the kaolinite-serpentine group include kaolinite ($Al_2Si_2O_5(OH)_4$).

Examples of compounds that belong to the pyrophyllite-talc group include talc ($Mg_3Si_4O_{10}(OH)_2$). Examples of compounds that belong to the smectite group include montmorillonite {$(Na, Ca)_{0.33}$ $(Al, Mg)_2Si_4O_{10}$ $(OH)_2.nH_2O$, a clay including montmorillonite as a main component is called bentonite}. Examples of compounds that belong to the mica group include muscovite (white mica, $KAl_2(AlSi_3)O_{10}$ $(OH)_2$), sericite, phlogopite (bronze mica), biotite, and lepidolite (lithia mica). Examples of compounds that belong to the brittle mica group include margarite, clintonite, and anandite. Examples of compounds that belong to the chlorite group include cookeite, sudoite, clinochlore, chamosite, and nimite.

A tectosilicate mineral is a three-dimensional network structure type silicate mineral in which Si—O tetrahedrons ($[SiO_4]^{4-}$) form three-dimensional network bonding. Examples of the tectosilicate minerals include porous quartz, feldspar, zeolites, and aluminosilicates such as zeolite ($M_{2/n}O.Al_2O_3.xSiO_2.yH_2O$, wherein M represents a metal element; n represents the valence of M; x≥2; and y≥0).

Examples of the asbestos group include chrysotile, amosite, and anthophyllite.

Examples of other silicate minerals include hydrated magnesium silicates such as sepiolite (meerschaum: $Mg_9Si_{12}O_{30}(OH)_6(OH_2)_4.6H_2O$), and imogolite ($Al_2SiO_3$ (OH)). Meanwhile, the minerals may be natural minerals or artificial minerals.

Also, lithium compounds such as $Li_2O_4$, $Li_3PO_4$, and LiF may also be used. Carbon materials such as graphite, carbon nanotubes, and diamond may also be used. Among them, it is preferable to use alumina, boehmite, talc, titania (particularly titania having a rutile type structure), silica, magnesia, and silicate minerals, and it is more preferable to use alumina, boehmite, and silicate minerals.

These inorganic particles may be used singly, or two or more kinds thereof may be used in mixture. The inorganic particles also have oxidation resistance, so that in a case in which the gel electrolyte layer 56 is provided between the positive electrode 53 and the separator 55, the inorganic particles have strong resistance even to the oxidative environment in the vicinity of the positive electrode at the time of charging. The shape of the inorganic particles is not particularly limited, and a spherical shape, a fibrous shape, a needle shape, a scaly shape, a sheet shape and a random shape can all be used.

Examples of the material that constitutes organic particles include fluorine-containing resins such as polyvinylidene fluoride and polytetrafluoroethylene; fluorine-containing rubbers such as a vinylidene fluoride-tetrafluoroethylene copolymer and an ethylene-tetrafluoroethylene copolymer; rubbers such as a styrene-butadiene copolymer or a hydride thereof, an acrylonitrile-butadiene copolymer or a hydride thereof, an acrylonitrile-butadiene-styrene copolymer or a hydride thereof, a methacrylic acid ester-acrylic acid ester copolymer, a styrene-acrylic acid ester copolymer, an acrylonitrile-acrylic acid ester copolymer, an ethylene-propylene rubber, polyvinyl alcohol, and polyvinyl acetate; cellulose derivatives such as ethyl cellulose, methyl cellulose, hydroxyethyl cellulose, and carboxymethyl cellulose; and resins having high heat resistance with at least one of the melting point and the glass transition temperature being 180° C. or higher, such as polyphenylene ether, polysulfone, polyether sulfone, polyphenylene sulfide, polyetherimide, polyimide, polyamide such as all-aromatic polyamide (aramid), polyamideimide, polyacrylonitrileo, polyvinyl alcohol, polyether, an acrylic acid resin, and polyester. These materials may be used singly, or may be used as mixtures of two or more kinds thereof. The shape of the organic particles is not particularly limited, and a spherical shape, a fibrous shape, a needle shape, a scale shape, a sheet shape, a random shape, and the like can all be used.

Among these, it is more preferable to use particles having an anisotropic shape such as a needle shape, a sheet shape, and a scaly shape. Since the gel electrolyte layer 56 is formed by coating the surface of the separator 55 or an electrode, or the like, particles having anisotropic shape have a tendency that the longest parts (referred to as major axis) of the particles are oriented in a direction parallel to the plane (referred to as plane direction) of the separator 55 or the plane of the electrode, which is the direction of coating. For example, the major axis of a needle shape or the plane of a sheet shape is oriented in a plane direction. Therefore, the particles are easily connected in the plane direction, but particles are not easily connected in a perpendicular direction (direction perpendicular to the plane direction). Therefore, in a case in which particles having an anisotropic shape are used, the heat generated in the negative electrode 54 can be easily dispersed uniformly in-plane in the plane direction; however, the heat is not easily dispersed in a direction perpendicular to the plane direction, so that insulation of the heat transferred to the positive electrode 53 can be further enhanced.

Regarding the particles having an anisotropic shape, from the viewpoint that thermal insulation can be enhanced, for example, particles having a shape in which the ratio of the length of the longest part of a particle (referred to as major axis) and the length of the shortest part of the particle in a direction perpendicular to the major axis (referred to as minor axis) ("length of major axis (length of the longest part of the particle)"/"length of minor axis (length of the shortest part of the particle)") is 3 times or larger, are preferred.

In regard to the particles, it is preferable to adjust the average particle size of the primary particles to several micrometers ($\mu m$) or less, from the viewpoint of smoothness of the coated surface. Specifically, the average particle size of the primary particles is preferably 1.0 $\mu m$ or less, and more preferably from 0.3 $\mu m$ to 0.8 $\mu m$. Furthermore, with regard to primary particles having an average particle size of from 0.3 $\mu m$ to 0.8 $\mu m$, primary particles having an average particle size of from 1.0 $\mu m$ to 10 $\mu m$ or a group of particles with no primary particles dispersed therein, or primary particles having an average particle size of from 0.01 $\mu m$ to 0.10 $\mu m$ may also be used in combination. Such average particle size of primary particles can be measured by a method of analyzing photographs obtained by electron microscope using a particle size analyzer.

If the average particle size of primary particles of the particles is more than 1.0 $\mu m$, the coated surface may also become rough. Furthermore, in the case of forming the gel electrolyte layer 56 containing particles by coating, if the primary particles of the particles are too large, there may be areas where a coating liquid containing the particles is not coated, and there is a risk that the coated surface may become rough. On the contrary, in a case in which primary particles having an average particle size of from 0.3 $\mu m$ to 0.8 $\mu m$ are used as a mixture with particles having a large average particle size, the problem that the coated surface becomes rough can be utilized rather advantageously.

In regard to the particles, it is preferable that the mixing ratio of the particles and the resin material is in the range of particles:resin material=20:80 to 80:20 as a mass ratio. That is, for the gel electrolyte layer 56, it is preferable that the content of the particles is from 20% by mass to 80% by mass relative to the total mass of the particles and the resin material in the gel electrolyte layer 56. In a case in which the content of the particles is smaller than the range described above, the thickness of the gel electrolyte layer 56 required to obtain a predetermined heat capacity becomes larger, and it is not preferable from the viewpoint of the volumetric efficiency. Furthermore, if the content of the particles is larger than the range described above, the amount of the gel electrolyte layer 56 supporting the particles becomes small, and formation of the gel electrolyte layer 56 is made difficult.

(1-2) Method for Producing Non-Aqueous Electrolyte Battery

This non-aqueous electrolyte battery 62 can be produced by the following first and second examples.

(First Example of Method for Producing Non-Aqueous Electrolyte Battery)

[Method for Producing Positive Electrode]

A paste-like positive electrode mix slurry is produced by preparing a positive electrode mix by mixing a positive electrode active material, a conductive agent and a binder, and dispersing this positive electrode mix in a solvent such as N-methyl-2-pyrrolidone. Subsequently, this positive electrode mix slurry is applied on a positive electrode current collector 53A, the solvent is dried, and the assembly is compression molded using a roll pressing machine or the like to thereby form a positive electrode active material layer 53B. Thus, the positive electrode 53 is produced.

[Method for Producing Negative Electrode]

A paste-like negative electrode mix slurry is produced by preparing a negative electrode mix by mixing a negative electrode active material and a binder, and dispersing this negative electrode mix in a solvent such as N-methyl-2-pyrrolidone. Subsequently, this negative electrode mix slurry is applied on a negative electrode current collector 54A, the solvent is dried, and the assembly is compression molded using a roll pressing machine or the like to thereby form a negative electrode active material layer 54B. Thus, the negative electrode 54 is produced.

[Preparation of Non-Aqueous Liquid Electrolyte]

A non-aqueous liquid electrolyte is prepared by dissolving an electrolyte salt in a non-aqueous solvent.

[Assembling of Non-Aqueous Electrolyte Battery]

A precursor solution containing a non-aqueous electrolyte liquid, a resin material, heat absorbent particles and a mixed solvent is applied on both surfaces of a positive electrode 53 and both surfaces of a negative electrode 54, the mixed solvent is volatilized, and thus a gel electrolyte layer 56 is formed. Thereafter, a positive electrode lead 51 is attached to an end of a positive electrode current collector 53A by welding, and also, a negative electrode lead 52 is attached to an end of the negative electrode current collector 54A by welding.

Meanwhile, when a gel electrolyte layer is formed, a precursor solution is applied by adjusting the amount of particles per unit area so as to satisfy the condition of the present technology that the total heat capacity per unit area should be 0.0001 $J/Kcm^2$ or more. Regarding the heat capacity per volume, the concentration of the solids content (total amount of the particle and the resin material) in the precursor solution is adjusted to a desired concentration. As the ratio of the solids content in the precursor solution is smaller, the gel electrolyte layer 56 that has been completed can be made in a more sparse state, and the heat capacity per volume can be adjusted to 3.0 $J/Kcm^3$ or less.

Next, the positive electrode 53 and the negative electrode 54, both having the gel electrolyte layer 56 formed thereon, were laminated with the separator 55 being interposed therebetween, to form a laminate, and then this laminate is wound in the longitudinal direction of the laminate. A protective tape 57 is adhered to the outermost periphery, and thus a wound electrode assembly 50 is formed.

Meanwhile, the wound electrode assembly 50 may be formed as follows. The precursor solution is applied on at least one surface of the separator 55, and then the mixed solvent is volatilized. Thereby, the gel electrolyte layer 56 is formed on at least one surface of the separator 55. Meanwhile, a positive electrode lead 51 is attached in advance to an end of the positive electrode current collector 53A by welding, and a negative electrode lead 52 is attached to an end of the negative electrode current collector 54A by welding. The positive electrode 53 and the negative electrode 54 are laminated while the separator 55 having the gel electrolyte layer 56 formed on both surfaces thereof is interposed between the electrodes, and thus a laminate is obtained. Subsequently, this laminate is wound in the longitudinal direction, and thus a wound electrode assembly 50 is obtained.

Finally, for example, the wound electrode assembly 50 is sandwiched between exterior members 60, and the outer peripheries of the exterior members 60 are sealed by adhering each other by heat fusion or the like. At that time, an adhesive film 61 is inserted between the positive electrode lead 51 as well as the negative electrode lead 52 and the exterior members 60. Thereby, the non-aqueous electrolyte battery 62 illustrated in FIG. 1 and FIG. 2 is completed.

(Second Example of Method for Producing Non-Aqueous Electrolyte Battery)

Furthermore, this non-aqueous electrolyte battery 62 may also be produced by sequentially carrying out the following resin layer forming step, winding step, and battery assembling step.

[Resin Layer Forming Step]

First, a resin layer is formed on one surface or on both surfaces of the separator 55. The resin layer can be formed, for example, by the following first example and second example.

First Example: Production Method Based on Phase Separation

A resin material and particles that constitute a resin layer are mixed at a predetermined ratio, the mixture is added to a dispersing solvent such as N-methyl-2-pyrrolidone, and a resin solution is obtained by dissolving the resin material. Subsequently, this resin solution is applied or transferred on at least one surface of the separator 55. Meanwhile, the resin solution is applied or transferred by adjusting the amount of particles per unit area so as to satisfy the condition of the present technology that the total heat capacity per unit area should be 0.0001 $J/Kcm^2$ or more. An example of the method for applying the resin solution is a method of coating by means of a bar coater or the like.

Figure 3:
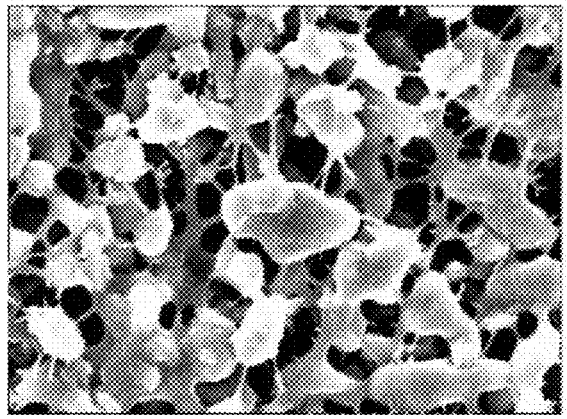
FIG. 3 is a secondary electron image obtained by scanning electron microscope (SEM), showing the configuration of a resin layer that is a precursor layer of a gel electrolyte layer.

Subsequently, the separator 55 having the resin solution coated thereon is immersed in a water bath, thereby the resin solution is subjected to phase separation, and thus a resin layer is formed. The resin solution applied on the separator is brought into contact with water or the like, which is a poor solvent for the resin material dissolved in the resin solution and is a good solvent for the dispersing solvent that dissolves the resin material, and the resin solution is finally dried by blowing hot air. Thereby, as illustrated in FIG. 3, a separator 55 in which a resin layer formed from a resin material having a three-dimensional network structure and having particles supported on the separator surface, can be obtained.

When such a method is used, a resin layer is formed by a rapid poor solvent-induced phase separation phenomenon, and the resin layer has a structure in which skeletons based on the resin material are connected in a three-dimensional network form. That is, when a resin solution containing a dissolved resin material and also containing particles is brought into contact with a solvent such as water, which is a poor solvent for the resin material and is a good solvent for the dispersing solvent that dissolves the resin material, solvent exchange occurs. Thereby, rapid (with a high speed) phase separation accompanied by spinodal decomposition occurs, and the resin material acquires a unique three-dimensional network structure.

The resin layer produced as such forms a unique porous structure by using a rapid poor solvent-induced phase separation phenomenon accompanied by spinodal decomposition, which is caused by a poor solvent.

Meanwhile, on the occasion of forming the resin layer of the present technology, in order to bring the gel electrolyte layer 56 that is formed when the resin layer is impregnated with a non-aqueous liquid electrolyte in the subsequent process, to a sparse state, and in order to adjust the heat capacity per volume of the gel electrolyte layer 56 to 3.0 $J/Kcm^3$ or less, various modifications such as described below can be made for the first example.

(i) Regulation of Solid Content Concentration in Resin Solution

In regard to the resin solution, the concentration of the solids content (total amount of the particles and the resin material) in the resin solution is adjusted to a desired concentration. As the solids content ratio in the resin solution is smaller, the resin layer that has been completed is brought into a more sparse state, and the gel electrolyte layer 56 that is formed by impregnating the resin layer with a non-aqueous liquid electrolyte in the subsequent step, can be brought into a more sparse state.

(ii) Regulation of Surface Shape of Resin Layer (in Case of Coating)

In a case in which a method of coating by means of a bar coater or the like is used as the method for applying a resin solution, an approximately uniform layer of the resin solution is formed on the separator. Here, if necessary, concavo-convex shapes may be provided on the surface of the layer of the resin solution. In a case in which concavo-convex shapes are provided on the surface of the layer of the resin solution, for example, water (poor solvent) in a mist form is brought into contact with the surface of the applied resin solution. Thereby, on the applied resin solution, the area brought into contact with water in a mist form has a concave shape, while the periphery of the area has a convex shape, and the resin solution surface is deformed into a mottled form. Also, in some parts that have been brought into contact with water, replacement of the dispersing solvent with water occurs, and the mottled surface shape is fixed. Thereafter, the separator with the resin solution applied thereon is immersed in a water bath, and thereby the entirety of the applied resin solution is subjected to phase separation. Thus, a resin layer having a concavo-convex shape on the surface can be formed, and then the gel electrolyte layer 56 that is formed by impregnating the resin layer with a non-aqueous liquid electrolyte in the subsequent step can be formed.

(iii) Regulation of Surface Shape of Resin Layer (in Case of Transfer)

Figure 4:
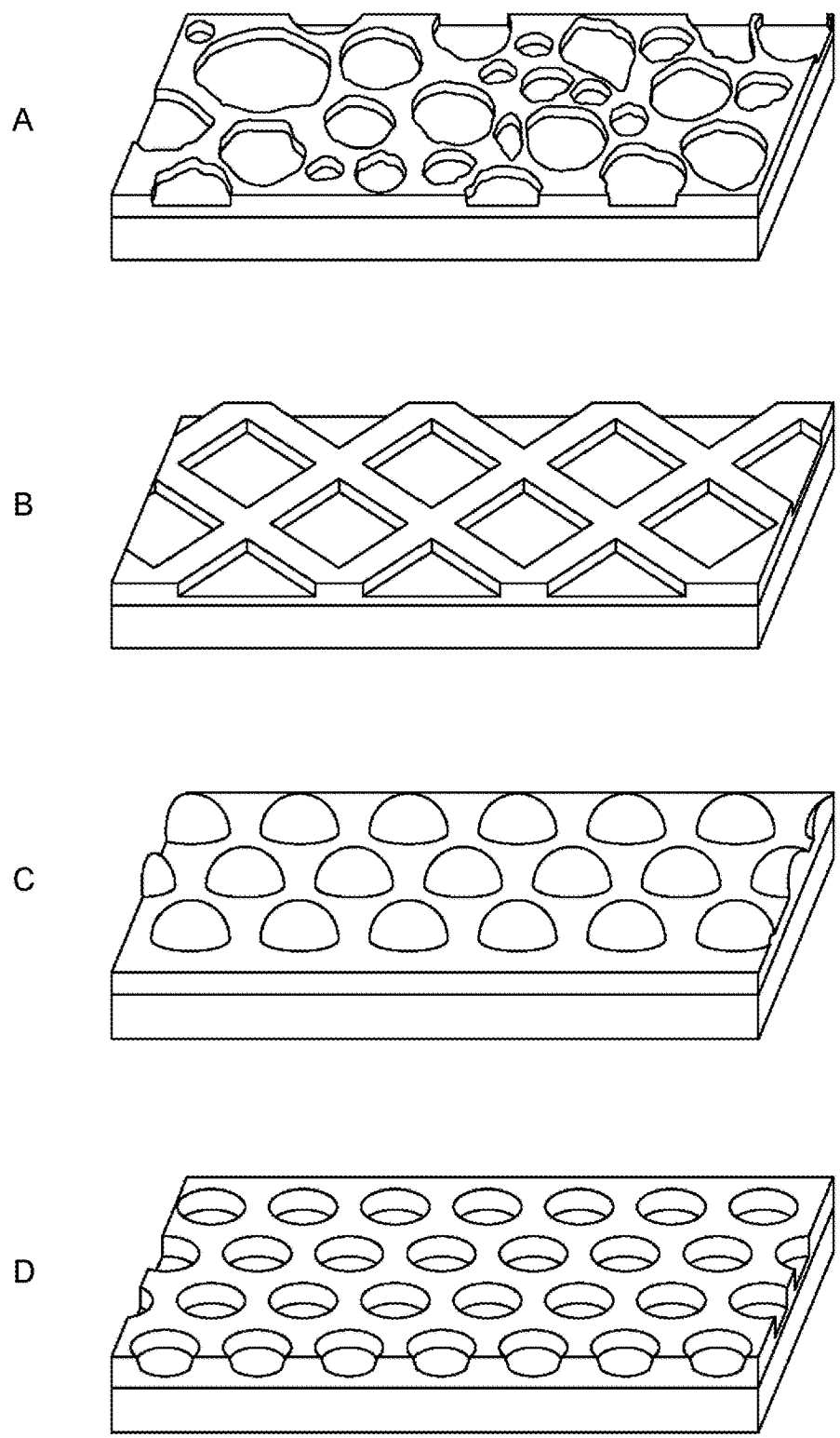
FIG. 4 is a perspective view diagram illustrating an example of the surface shape of the resin layer as a precursor layer of a gel electrolyte layer.

In a case in which a method of applying the resin solution on the surface of a roller having concavo-convex shapes on the surface or the like and transferring the resin solution onto the surface of the separator is used, as the area proportion of convexities is smaller, a more sparse state can be obtained. The area proportion of convexities can be regulated by changing the concavo-convex shapes of the surface of the roller or the like. Furthermore, as the height of convexities (difference of elevation between convexities and concavities) is larger, a more sparse state can be obtained. The height of the convexities can be regulated by the concavo-convex shapes on the surface of the roller or the like, and the viscosity of the resin solution. The viscosity of the resin solution can be adjusted by the solids content ratio in the resin solution. Here, regarding the surface shape of the roller or the like for resin solution transfer having concavo-convex shapes on the surface, the various shapes illustrated in FIG. 4 as examples (a mottled form as illustrated in FIG. 4A, a lattice form as illustrated in FIG. 4B, a dotted form as illustrated in FIG. 4C, and a pinhole shape as illustrated in FIG. 4D) can be employed.

(iv) Regulation of Conditions Upon Phase Separation of Resin Solution

When the resin solution is subjected to phase separation by immersing the separator coated with the resin solution in a water bath, it is preferable to apply ultrasonic waves to the bath. As the energy of the ultrasonic waves used at this time is larger, the resin layer that has been completed can be brought into a more sparse state, and the gel electrolyte layer 56 formed when the resin layer is impregnated with a non-aqueous liquid electrolyte in the subsequent step, can be brought into a sparse state. Meanwhile, when the resin solution is subjected to phase separation, application of ultrasonic waves to the bath allows the particles or groups of particles that have formed secondary particles to be brought into a mutually independently dispersed state, which is more preferable. Furthermore, the state of the resin layer can be controlled, and thereby the state of the gel electrolyte layer 56 that is formed by impregnating the resin layer with a non-aqueous liquid electrolyte in the subsequent step can be controlled, by regulating the speed of the phase separation. The speed of the phase separation can be regulated by, for example, adding a small amount of a dispersing solvent such as N-methyl-2-pyrrolidone to the solvent used at the time of the phase separation, such as water that is a good solvent for the dispersing solvent. For example, as the amount of incorporation of N-methyl-2-pyrrolidone to be mixed with water is larger, the speed of the phase separation is slowed, and when the phase separation is carried out using water only, the phase separation occurs most rapidly. As the speed of the phase separation is lower, the resin layer that has been completed can be brought into a more sparse state, and the gel electrolyte layer 56 that is formed by impregnating the resin layer with a non-aqueous liquid electrolyte in the subsequent step can be brought into a more sparse state.

Second Example: Production Method Based on Drying at High Temperature

A resin solution is obtained by mixing a resin material and particles that constitute the resin layer at a predetermined mass ratio, adding the mixture to a dispersing solvent such as 2-butanone (methyl ethyl ketone; MEK) or N-methyl-2-pyrrolidone (NMP), and dissolving the mixture. Subsequently, this resin solution is applied on at least one surface of a separator. Meanwhile, the resin solution is applied while the amount of particles per unit area is adjusted so as to satisfy the condition of the present technology that the total heat capacity per unit area should be 0.0001 $J/Kcm^2$ or more.

Subsequently, the separator 55 coated with the resin solution is dried by, for example, a method such as passing the separator through a drying furnace so as to volatilize the dispersing solvent, and thus a resin layer is formed. At this time, it is preferable to set the temperature at the time of drying to be sufficiently high for the dispersing solvent, so that the dispersing solvent is volatilized and gas bubbles are generated in the resin solution. In a third production method, when gas bubbles are generated in the resin solution during the drying step, gas bubbles are generated rapidly in the resin solution, and the resin layer thus formed has a porous structure and has a configuration in which particles are supported and dispersed in a resin material. Furthermore, the surface of the resin layer can be configured to have concavo-convex shapes in a mottled pattern, by means of the generated gas bubbles.

In a case in which the resin layer is formed using such a method, it is preferable to use a porous aluminosilicate such as zeolite as the particles. It is because gas is generated from the fine pores of the particles during the drying step, and a porous structure can be formed more effectively.

The boiling point of 2-butanone, which is an example of the dispersing solvent, is 80° C. Therefore, in the case of using 2-butanone as the dispersing solvent, when the drying temperature is set to about 100° C., 2-butanone is volatilized, and gas bubbles are generated in the resin solution. If the drying temperature is about 100° C., the separator 55 is not damaged when the resin layer is formed on the surface of the separator 55, and therefore, it is preferable. When a resin solution which uses 2-butanone as the dispersing solvent is dried, generated gas bubbles gather and form larger bubbles, and concavities and convexities are generated. Then, the resin solution thinly covers the surface of the separator 55 again, and thereby, the resin layer is formed. Furthermore, the small gas bubbles generated in the resin solution substantiate the three-dimensional network structure of the resin material.

On the occasion of forming the resin layer of the present technology, various adjustments as described below can be made for the second production method, in order to produce the resin layer in a sparse state, and to adjust the heat capacity per volume of the gel electrolyte layer 56 that is formed when the resin layer is impregnated with a non-aqueous liquid electrolyte in the subsequent step, to 3.0 $J/Kcm^3$ or less. The heat capacity per unit volume of the gel electrolyte layer 56 can be regulated by changing the drying conditions such as the drying temperature and the drying time for the drying process. That is, when a high drying temperature is employed in the drying process, a larger amount of gas bubbles can be generated, and the resin layer that has been completed can be brought into a more sparse state. Then, the gel electrolyte layer 56 that is formed when the resin layer is impregnated with a non-aqueous liquid electrolyte in the subsequent step can be brought into a more sparse state. Also, similarly, when a longer drying time is employed in the drying process, a larger amount of gas bubbles can be generated, and the resin layer that has been completed can be brought into a more sparse state. Then, the gel electrolyte layer 56 that is formed when the resin layer is impregnated with a non-aqueous liquid electrolyte in the subsequent step can be brought into a more sparse state.

The boiling point of N-methyl-2-pyrrolidone, which is an example of the dispersing solvent, is about 200° C. Therefore, in the case of using N-methyl-2-pyrrolidone as the dispersing solvent, it is necessary to adjust the drying temperature to a high temperature exceeding 200° C. Therefore, in a case in which the resin layer is formed using N-methyl-2-pyrrolidone as the dispersing solvent, it is essential that the separator 55 is constructed from a resin material having a higher melting point or thermal decomposition temperature than the boiling point of the dispersing solvent. In a case in which the resin layer is formed on the surface of at least one of the positive electrode and the negative electrode, since the positive electrode 53 and the negative electrode 54 have high heat resistance, N-methyl-2-pyrrolidone may be used as the dispersing solvent.

[Winding Step]

Next, a wound electrode assembly 50 having a wound structure is produced by laminating the positive electrode 53 and the negative electrode 54, while the separator 55 having a resin layer formed on one main surface or on both main surfaces thereof is interposed between the electrodes, and winding the assembly.

[Battery Assembling Step]

Next, an exterior member 60 formed from a laminate film is provided with a recess by performing deep drawing processing, and the wound electrode assembly 50 is inserted in this recess. The unprocessed parts of the exterior member 60 are folded to the top of the recess, and the outer periphery of the recess is heat-welded, except for a portion (for example, one edge). At that time, an adhesive film 61 is inserted between the positive electrode lead 51 as well as the negative electrode lead 52 and the exterior member 60.

Subsequently, a non-aqueous liquid electrolyte is prepared and poured into the inside of the exterior member 60 through the unwelded portion. Then, the unwelded portion of the exterior member 60 is sealed by heat-welding or the like. At this time, as vacuum sealing is performed, the non-aqueous liquid electrolyte is impregnated into the resin layer, causing at least a portion of the resin material to swell, and the gel electrolyte layer 56 is formed. Thereby, the non-aqueous electrolyte battery 62 illustrated in FIG. 1 and FIG. 2 is completed.

(1-3) Other Examples of Laminate Film Type Non-Aqueous Electrolyte Battery

In the above-described example, a non-aqueous electrolyte battery 62 in which the wound electrode assembly 50 is sheathed with exterior members 60 has been explained; however, a laminated electrode assembly 70 may also be used instead of the wound electrode assembly 50 as illustrated in FIG. 5A to FIG. 5C. FIG. 5A is an external appearance diagram of the non-aqueous electrolyte battery 62 accommodating the laminated electrode assembly 70. FIG. 5B is an exploded perspective view diagram illustrating the state of the laminated electrode assembly 70 accommodated in the exterior members 60. FIG. 5C is an external appearance diagram illustrating the external appearance from the bottom side of the non-aqueous electrolyte battery 62 illustrated in FIG. 5A.

Regarding the laminated electrode assembly 70, use is made of a laminated electrode assembly 70 in which a rectangular-shaped positive electrode 73 and a rectangular-shaped negative electrode 74 are laminated, with a separator 75 being interposed therebetween, and are fixed with a fixing member 76. In the laminated electrode assembly 70, a positive electrode lead 71 connected to the positive electrode 73 and a negative electrode lead 72 connected to the negative electrode 74 are led out, and an adhesive film 61 is provided between the positive electrode lead 71 as well as the negative electrode lead 72 and an exterior member 60.

Meanwhile, the method for forming the gel electrolyte layer 56 or the method for injecting a non-aqueous liquid electrolyte, and the method of thermally fusing the exterior member 60 are the same as those in the case of using the wound electrode assembly 50 described in section (1-2).

<Effects>

According to the first embodiment, the heat generated in the negative electrode, particularly the heat generated in a negative electrode that uses a negative electrode active material containing at least one of a metal element and a semimetal element as a constituent element, can be absorbed by the gel electrolyte layer, and also, heat can be insulated by the gel electrolyte layer. Therefore, the heat generated in the negative electrode cannot be easily transferred to the positive electrode, and the thermal decomposition reaction of the positive electrode can be suppressed. Furthermore, even on the occasion of melting of the separator caused by heat generation at a high temperature, insulation properties can be maintained by means of the gel electrolyte layer.

2. Second Embodiment

According to the second embodiment, an exemplary battery pack of a laminate film type battery including a gel electrolyte layer similar to that of the first embodiment will be explained.

The battery pack of a laminate film type non-aqueous electrolyte battery of the second embodiment will be explained below with reference to the drawings. Meanwhile, in the following explanation, a wound electrode assembly sheathed with a hard laminate film and a soft laminate film is referred to as a battery cell, and a battery cell connected with a circuit board and fitted with a top cover and a rear cover is referred to as a battery pack. For the battery pack and the battery cell, the protruded side of the positive electrode terminal and the negative electrode terminal is referred to as top part, the side opposite to the top part is referred to as bottom part, and the two edges excluding the top part and the bottom part are referred to as side part. Furthermore, the length in the direction of side part-side part is referred to as the width direction, and the length in the direction of top part-bottom part is referred to as height.

(2-1) Configuration of Battery Pack

Figure 6:
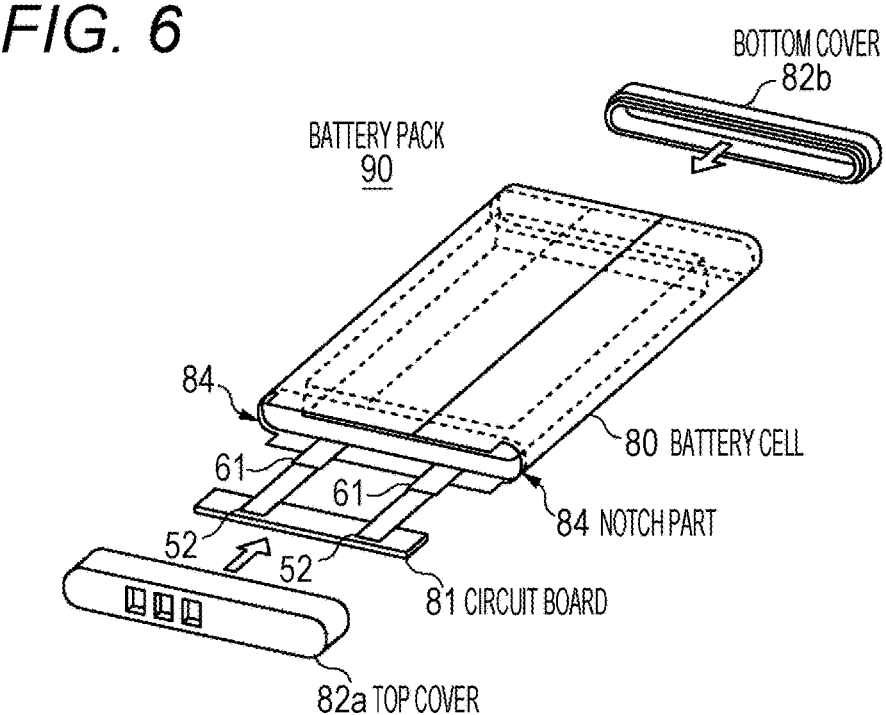
FIG. 6 is an exploded perspective view diagram illustrating the configuration of a battery pack of a laminate film type non-aqueous electrolyte battery related to the first embodiment of the present technology.
Figure 7:
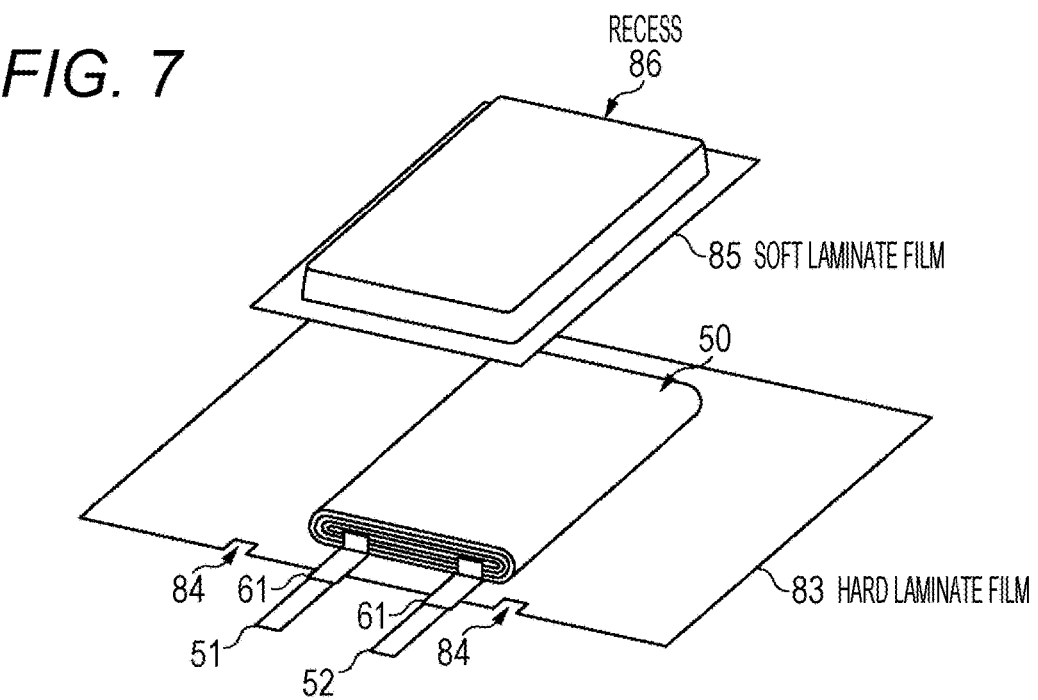
FIG. 7 is an exploded perspective view diagram illustrating the structure of a battery cell of the battery pack illustrated in FIG. 6.
Figure 8:
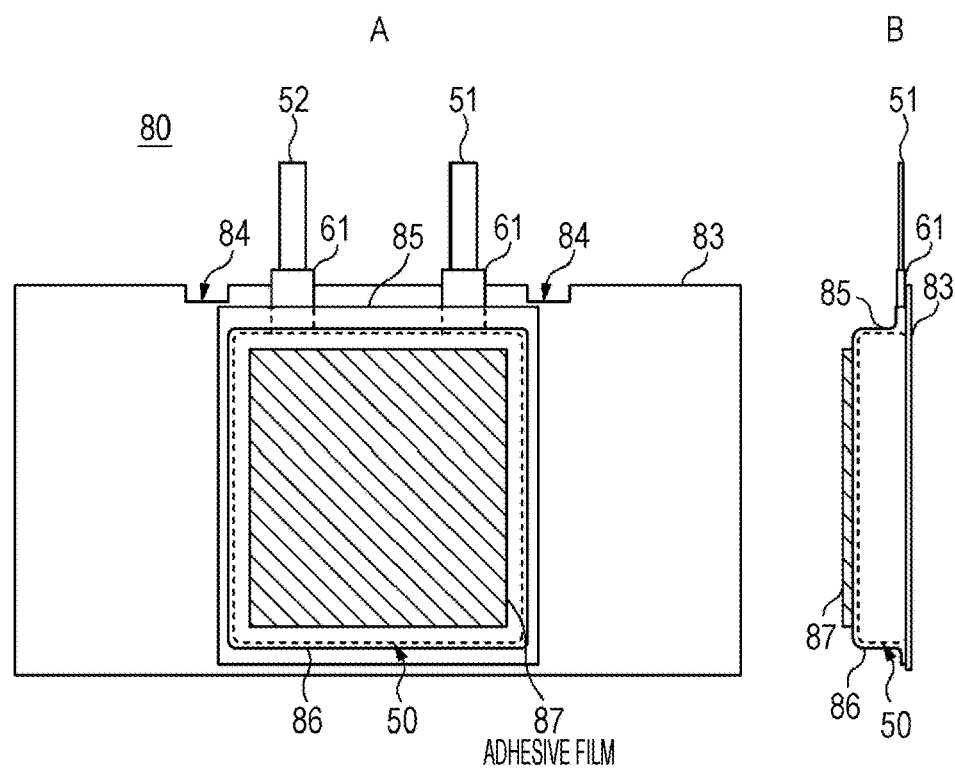
FIG. 8 is a development view diagram illustrating the structure of a battery cell of the battery pack illustrated in FIG. 6.
Figure 9:
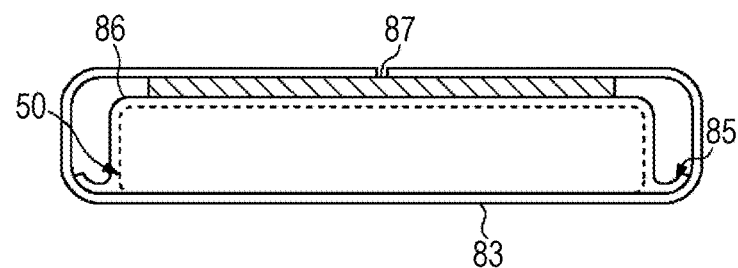
FIG. 9 is a cross-sectional diagram illustrating the structure of a battery cell of the battery pack illustrated in FIG. 6.

FIG. 6 is a perspective view diagram illustrating one configuration example of the battery pack 90 according to the second embodiment. FIG. 7 is an exploded perspective view diagram illustrating the structure of a battery cell 80. FIG. 8 is a top view diagram and a lateral view diagram illustrating the state in the middle of production of the battery cell 80 according to the second embodiment. FIG. 9 is a cross-sectional diagram illustrating the cross-sectional structure in the battery cell 80.

The battery pack 90 is, for example, a battery pack of a non-aqueous electrolyte battery having a rectangular shape or a flat shape, and as illustrated in FIG. 6, the battery pack 90 includes a battery cell 80 which has an opening formed, with two open ends, and has a wound electrode assembly 50 accommodated in an exterior material; and a top cover 82a and a bottom cover 82b respectively fitted to the openings at the two ends of the battery cell 80. Meanwhile, for the wound electrode assembly 50 accommodated in the battery pack 90, a wound electrode assembly 50 similar to that of the first embodiment can be used. In the battery cell 80, a positive electrode lead 51 and a negative electrode lead 52 connected to the wound electrode assembly 50 are led out from a fused area of the exterior material to the outside through an adhesive film 61, and the positive electrode lead 51 and the negative electrode lead 52 are connected to a circuit board 81.

As illustrated in FIG. 7 and FIG. 8, the exterior material has a general plate shape, and is formed from a hard laminate film 83 having a rectangular shape when viewed in the plane direction; and a soft laminate film 85 having a rectangular shape with a shorter length in the direction of the side part than that of the hard laminate film 83. The openings at the two ends of the battery cell 80 have a general rectangular shape, and the two shorter edges of the opening bulge out so as to form an elliptic arc toward the outer side.

The battery cell 80 is formed from a soft laminate film 85 provided with a recess 86; a wound electrode assembly 50 accommodated in the recess 86; and a hard laminate film 83 provided so as to cover the opening of the recess 86 accommodating the wound electrode assembly 50. The hard laminate film 83 is set such that while the hard laminate film 83 wraps the recess 86 accommodating the wound electrode assembly 50, the shorter edges on both sides are in close contact or are separated apart with a slight gap to face each other. Furthermore, the longer edges on the top side of the hard laminate film 83 may be provided with notch parts 84 as illustrated in FIG. 7 and FIG. 8. The notch parts 84 are provided so as to be positioned on the two shorter edges of the battery cell 80 as viewed from the front. When the notch parts 84 are provided, fitting of the top cover 82*a* can be made easier.

Furthermore, at the sealed part where the hard laminate film 83 and the soft laminate film 85 are sealed, a positive electrode lead 51 and a negative electrode lead 52 that are electrically connected to the positive electrode 53 and the negative electrode 54 of the wound electrode assembly 50, respectively, are led out.

The top cover 82*a* and the bottom cover 82*b* have a shape capable of fitting to the openings at both ends of the battery cell 80, and specifically, when viewed from the front, the top cover 82*a* and the bottom cover 82*b* have a general rectangular shape, with the two shorter edges bulging so as to form an elliptic arc toward the outer side. Meanwhile, the front means the direction of viewing the battery cell 80 from the top side.

[Exterior Material]

As illustrated in FIG. 7 and FIG. 8, this exterior material is formed from a soft laminate film 85 provided with a recess 86 for accommodating the wound electrode assembly 50; and a hard laminate film 83 that is superimposed on this soft laminate film 85 so as to cover the recess 86.

[Soft Laminate Film]

The soft laminate film 85 has a configuration similar to that of the exterior member 60 according to the first embodiment. Particularly, the soft laminate film 85 has a feature that a soft metal material, for example, annealing-treated aluminum (JIS A8021P-O) or (JIS A8079P-O) is used as the metal layer.

[Hard Laminate Film]

The soft laminate film 85 has a function of maintaining the shape after bending, and withstanding deformations from the outside. Therefore, the soft laminate film has a feature that a hard metal material, for example, a metal material such as aluminum (Al), stainless steel (SUS), iron (Fe), copper (Cu) or nickel (Ni), is used as the metal layer, and particularly, hard aluminum that has not been annealing-treated (JIS A3003P-H18) or (JIS A3004P-H18), austenite-based stainless steel (SUS304), or the like is used.

[Wound Electrode Assembly]

The wound electrode assembly 50 may have a configuration similar to that of the first embodiment. Furthermore, the laminated electrode assembly 70 explained as another example of the first embodiment may also be used.

[Non-Aqueous Liquid Electrolyte and Gel Electrolyte Layer]

The gel electrolyte layer formed between the positive electrode 53 and the separator 55 and between the negative electrode 54 and the separator 55 can be configured similarly to that of the gel electrolyte layer of the first embodiment.

[Separator]

The separator 55 is similar to that of the first embodiment.

[Circuit Board]

A circuit board 81 is electrically connected with the positive electrode lead 51 and the negative electrode lead 52 of the wound electrode assembly 50. On the circuit board 81, a protection circuit including a temperature protection element such as a fuse, a heat-sensitive resistance element (Positive Temperature Coefficient: PTC element), or a thermistor, as well as an ID resistance for identifying the battery pack, and the like are mounted, and plural (for example, three) contact points are further formed thereon. The protection circuit is provided with a charge-discharge control FET (Field Effect Transistor), an IC (Integrated Circuit) that performs monitoring of the battery cell 80 and the control of the charge-discharge control FET, and the like.

A heat-sensitive resistance element is connected in series to the wound electrode assembly, and when the temperature of the battery is higher compared to the set temperature, the electrical resistance is rapidly increased, and the current that flows through the battery is substantially cut off. A fuse is also connected in series to the wound electrode assembly, and when an overcurrent flows through the battery, the fuse undergoes fusion cutting caused by the current flowing therethrough and cuts the current off. Furthermore, the fuse is provided with a heater resistance in its vicinity, and at the time of excess voltage, the fuse undergoes fusion cutting as the temperature of the heater resistance is increased, and cuts the current off.

Furthermore, when the terminal voltage of the battery cell 80 becomes higher than or equal to the charge inhibiting voltage, which is higher than the full charge voltage, there is a possibility that the battery cell 80 may be in a hazardous condition leading to heat generation, ignition, or the like. Therefore, the protecting circuit monitors the voltage of the battery cell 80, and when the battery cell 80 reaches the charge inhibiting voltage, the protection circuit inhibits charging by turning off the charging control FET. Furthermore, when the terminal voltage of the battery cell 80 is over-discharged to a value lower than or equal to the discharge inhibiting voltage, and the voltage of the battery cell 80 reaches 0 V, there is a possibility that the battery cell 80 may be in an internal short circuit condition, and recharging may become unfeasible. Therefore, the protection circuit monitors the voltage of the battery cell 80, and when the voltage reaches the discharge inhibiting voltage, the protection circuit inhibits discharging by turning off the discharging control FET.

[Top Cover]

The top cover 82*a* is fitted to the top side opening of the battery cell 80, and a side wall for fitting to the top side opening is provided along a portion or the entirety of the outer periphery of the top cover 82*a*. The battery cell 80 and the top cover 82*a* are thermally fused with the side wall of the top cover 82*a* and the end inner surface of the hard laminate film 83, and are thus adhered.

The circuit board 81 is accommodated in the top cover 82*a*. The top cover 82*a* is provided with plural openings at positions corresponding to the contact points of the circuit board 81 so that the plural contact points are exposed to the outside. The contact points of the circuit board 81 are brought into contact with an electronic apparatus through the openings of the top cover 82*a*. Thereby, the battery pack 90 and the electronic apparatus are electronically connected. Such a top cover 82*a* is produced in advance by injection molding.

[Bottom Cover]

The bottom cover 82*b* is fitted to the opening on the bottom side of the battery cell 80, and is provided with a side wall for fitting to the opening on the bottom side along a portion or the entirety of the outer periphery of the bottom cover 82*b*. The battery cell 80 and the bottom cover 82*b* are thermally fused to the side wall of the bottom cover 82*b* and an end inner surface of the hard laminate film 83, and are thus adhered.

Such a bottom cover 82*b* is produced in advance by injection molding. Furthermore, a method of installing the battery cell 80 in a mold, pouring a hot melt resin into the bottom part, and thereby integrally molding the bottom cover with the battery cell 80 can also be used.

(2-2) Method for Producing Battery Pack

[Production of Battery Cell]

The wound electrode assembly 50 is accommodated in the recess 86 of the soft laminate film 85, and the hard laminate film 83 is disposed so as to cover the recess 86. At this time, the hard laminate film 83 and the soft laminate film 85 are disposed such that the inner resin layer of the hard laminate film 83 and the inner resin layer of the soft laminate film 85 face each other. Thereafter, the hard laminate film 83 and the soft laminate film 85 are sealed along the periphery of the recess 86. Sealing is carried out by thermally fusing the inner resin layer of the hard laminate film 83 and the inner resin layer of the soft laminate film 85 under reduced pressure, using a heater head made of metal that is not shown in the diagram.

When the inner resin layer of the hard laminate film 83 and the inner resin layer of the soft laminate film 85 are thermally fused under reduced pressure, a non-aqueous liquid electrolyte is injected through one edge that is not thermally fused. Alternatively, the wound electrode assembly 50 may be formed by forming a gel electrolyte in advance on both surfaces of the positive electrode and both surfaces of the negative electrode.

Next, as illustrated in FIG. 9, the hard laminate film 83 is deformed such that the shorter edges of the hard laminate film 83 are brought into contact. At this time, an adhesive film 87 formed from a resin material having high adhesiveness to both the inner resin layer of the hard laminate film 83 and the outer resin layer of the soft laminate film 85, is inserted between the hard laminate film 83 and the soft laminate film 85. Subsequently, when one surface at which the joint of the shorter edges of the hard laminate film 83 is positioned is heated with a heater head, the inner resin layer of the hard laminate film 83 and the outer resin layer of the soft laminate film 85 are thermally fused, and thus the battery cell 80 is obtained. Meanwhile, instead of using the adhesive film 87, an adhesive layer formed from a resin having high adhesiveness to the outer resin layer of the soft laminate film 85 may be provided on the surface of the inner resin layer of the hard laminate film 83, and the adhesive layer may be thermally fused.

[Production of Battery Pack]

Subsequently, the positive electrode lead 51 and the negative electrode lead 52 led out from the battery cell 80 are connected to the circuit board 81, subsequently the circuit board 81 is accommodated in the top cover 82*a*, and the top cover 82*a* is fitted to the opening on the top side of the battery cell 80. Furthermore, the bottom cover 82*b* is fitted to the opening on the bottom side of the battery cell 80.

Finally, the fitting parts of the top cover 82*a* and the bottom cover 82*b* are respectively heated using a heater head, and the top cover 82*a* and the bottom cover 82*b* are thermally fused with the inner resin layer of the hard laminate film 83. Thereby, the battery pack 90 is produced.

<Effects>

In the second embodiment, effects similar to those of the first embodiment can be obtained.

3. Third Embodiment

In the third embodiment, a battery pack which includes a non-aqueous electrolyte battery according to the first embodiment will be explained.

Figure 10:
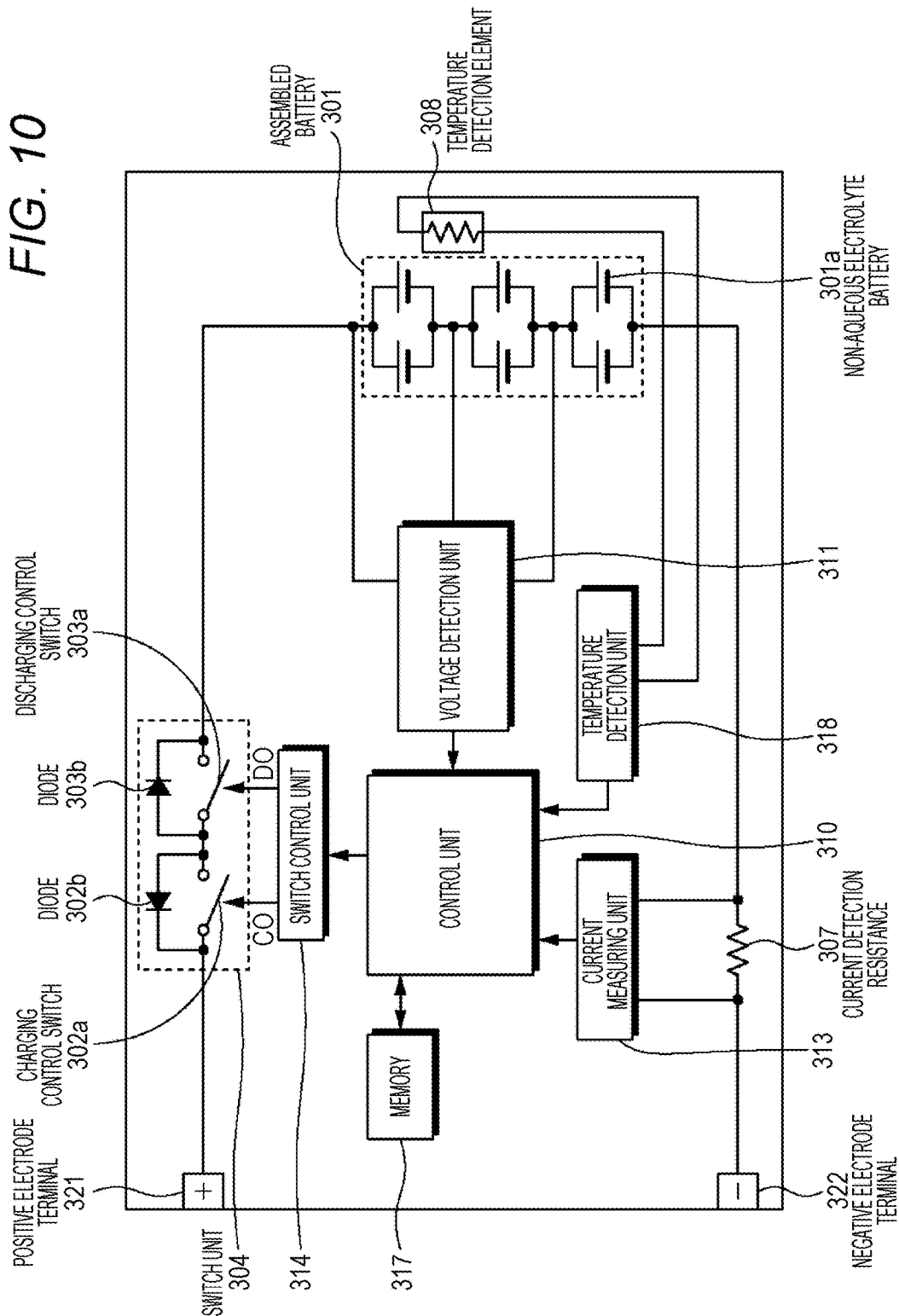
FIG. 10 is a block diagram illustrating a circuit configuration example of the battery pack according to an embodiment of the present technology.

FIG. 10 is a block diagram illustrating an example of the circuit configuration in a case in which the non-aqueous electrolyte battery of the present technology is applied to a battery pack. The battery pack includes an assembled battery 301, an exterior material, a switch unit 304 including a charging control switch 302*a* and a discharging control switch 303*a*, a current detection resistance 307, a temperature detection element 308, and a control unit 310.

Furthermore, the battery pack includes a positive electrode terminal 321 and a negative electrode terminal 322, and at the time of charging, the positive electrode terminal 321 and the negative electrode terminal 322 are connected to the positive electrode terminal and the negative electrode terminal of a battery charger, respectively, and charging is carried out. Furthermore, at the time of using an electronic apparatus, the positive electrode terminal 321 and the negative electrode terminal 322 are connected to the positive electrode terminal and the negative electrode terminal of an electronic apparatus, respectively, and discharging is carried out.

The assembled battery 301 is composed of plural non-aqueous electrolyte batteries 301*a* connected in series and/or in parallel. This non-aqueous electrolyte battery 301*a* is a non-aqueous electrolyte battery of the present technology. Meanwhile, FIG. 10 illustrates an example in which six non-aqueous electrolyte batteries 301*a* are connected in two-parallel three-serial (2P3S) connection; however, in addition to that, any connection method such as n-parallel m-serial (wherein n and m represent integers) connection may also be used.

The switch unit 304 includes a charging control switch 302*a*, a diode 302*b*, a discharging control switch 303*a*, and a diode 303*b*, and is controlled by the control unit 310. The diode 302*b* has polarity in the reverse direction with respect to the charging current that flows in the direction from the positive electrode terminal 321 to the assembled battery 301, and in the forward direction with respect to the discharging current that flows in the direction from the negative electrode terminal 322 to the assembled battery 301. The diode 303*b* has polarity in the forward direction with respect to the charging current, and in the reverse direction with respect to the discharging current. Meanwhile, in this example, the switch unit is provided on the plus (+)-side; however, the switch unit may also be provided on the minus (−)-side.

The charging control switch 302*a* is controlled by the charge-discharge control unit such that the charging control switch is turned off when the battery voltage reaches the overcharge detection voltage, and no charging current flows through the current path of the assembled battery 301. After the turning-off of the charging control switch, only discharging is enabled by means of the diode 302*b*. Furthermore, the charging control switch 302*a* is controlled by the control unit 310 such that the charging control switch is turned off when a large current flows at the time of charging, and cuts off the charging current that flows through the current path of the assembled battery 301.

The discharging control switch 303a is controlled by the control unit 310 such that the discharging control switch is turned off when the battery voltage reaches the overdischarge detection voltage, and no discharging current flows through the current path of the assembled battery 301. After the turning-off of the discharging control switch 303a, only charging is enabled by means of the diode 303b. Furthermore, the discharging control switch 303a is controlled by the control unit 310 such that the discharging control switch is turned off when a large current flows at the time of discharging, and cuts off the discharging current that flows through the current path of the assembled battery 301.

The temperature detection element 308 is, for example, a thermistor, and is provided in the vicinity of the assembled battery 301. The temperature detection element 308 measures the temperature of the assembled battery 301 and supplies the measured temperature to the control unit 310. A voltage detection unit 311 measures the voltages of the assembled battery 301 and the various non-aqueous electrolyte batteries 301a that constitute the assembled battery, performs A/D conversion of these measured voltages, and supplies the resultant values to the control unit 310. A current measuring unit 313 measures the current using the current detection resistance 307, and supplies the measured current to the control unit 310.

A switch control unit 314 controls the charging control switch 302a and the discharging control switch 303a of the switch unit 304 based on the voltages and currents input from the voltage detection unit 311 and the current measuring unit 313. The switch control unit 314 prevents overcharging, overdischarging, and overcurrent charge-discharge by sending control signals to the switch unit 304 when the voltages of some of the non-aqueous electrolyte batteries 301a reach a value lower than or equal to the overcharge detection voltage or the overdischarge detection voltage, and when a large current flows rapidly.

Here, for example, when the non-aqueous electrolyte battery is a lithium ion secondary battery, and a material which forms a lithium alloy at near 0 V with respect to $Li/Li^+$ is used as the negative electrode active material, the overcharge detection voltage is set to, for example, 4.20 V±0.05 V, and the overdischarge detection voltage is set to, for example, 2.4 V±0.1 V.

For the charge-discharge switch, for example, a semiconductor switch such as a MOSFET can be used. In this case, parasitic diodes of the MOSFET function as diodes 302b and 303b. When a P-channel type FET is used as the charge-discharge switch, the switch control unit 314 supplies control signals DO and CO respectively to the respective gates of the charging control switch 302a and the discharging control switch 303a. When the charging control switch 302a and the discharging control switch 303a are of P-channel type, the switches are turned on by a gate potential lower than the source potential by a predetermined value or more. That is, in a conventional charging and discharging operation, the control signals CO and DO are adjusted to a low level, and the charging control switch 302a and the discharging control switch 303a are brought to the on-state.

For example, at the time of overcharging or overdischarging, the control signals CO and DO are adjusted to a high level, and the charging control switch 302a and the discharging control switch 303a are brought to the off-state.

A memory 317 is composed of a RAM or a ROM, and is composed of, for example, EPROM (Erasable Programmable Read Only Memory), which is a non-volatile memory. In the memory 317, the values computed at the control unit 310, the internal resistance values of the batteries in the initial state of the various non-aqueous electrolyte batteries 301a measured in the stages of the production process, and the like are stored in advance, and rewriting can also be appropriately achieved. Furthermore, by causing the memory to store the full charge capacity of the non-aqueous electrolyte battery 301a, for example, the residual capacity can be calculated together with the control unit 310.

A temperature detection unit 318 measures the temperature using the temperature detection element 308, performs the charge-discharge control at the time of abnormal heat generation or performs compensation in the calculation of the residual capacity.

4. Fourth Embodiment

In the fourth embodiment, apparatuses such as an electronic apparatus, an electric vehicle, and a power storage device, which are equipped with the non-aqueous electrolyte battery according to the first embodiment and the battery pack according to the second and third embodiments, will be explained. The non-aqueous electrolyte battery and the battery pack explained in the first to third embodiments can be used to supply electric power to apparatuses such as an electronic apparatus, an electric vehicle, and a power storage device.

Examples of the electronic apparatus include a laptop computer, a PDA (personal digital assistant), a mobile telephone, a cordless phone headset, a video movie camera, a digital still camera, an electronic book, an electronic dictionary, a music player, a radio, a headphone, a game player, a navigator system, a memory card, a pacemaker, a hearing aid, an electric tool, an electric shaver, a refrigerator, an air conditioner, a television, a stereo system, a water heater, an electromagnetic range, a dish washer, a washing machine, a dryer, a lighting device, a toy, a medical instrument, a robot, a road conditioner, and a signal mechanism.

Furthermore, examples of the electric vehicle include a railway vehicle, a golf cart, an electric cart, and an electric car (including a hybrid car). The battery and battery pack are used as power supplies for driving or auxiliary power supplies.

Examples of the power storage device include power supplies for electric power storage for constructions including houses, or for power generation facilities.

In the following description, among the application examples described above, a specific example of a power storage system using a power storage device to which the non-aqueous electrolyte battery of the present technology is applied will be explained.

This power storage system has, for example, a configuration such as described below. A first power storage system is a power storage system in which a power storage device is charged by a power generation device that implements power generation from a renewable energy. A second power storage system is a power storage system which has a power storage device and supplies electric power to an electronic apparatus that is connected to a power storage device. A third power storage system is an electronic apparatus which receives the supply of electric power from a power storage device. These power storage systems are carried out as systems that promote efficient supply of electric power in cooperation with an external electric power supply network.

Furthermore, a fourth power storage system is an electric vehicle having a conversion device which receives supply of electric power from a power storage device and converts electric power to the driving force of a vehicle; and a control device which performs information processing related to the vehicle control according to the information related to the power storage device. A fifth power storage system is an electric power system which includes a power information transmission/reception unit that transmits and receives signals through a network with other apparatuses, and performs charge-discharge control of the power storage device described above, based on the information received by the transmission/reception unit. A sixth power storage system is an electric power system which receives supply of electric power from the power storage device described above or supplies electric power from a power generation device or a power network to a power storage device. Hereinafter, power storage systems will be explained.

(4-1) Power Storage System in House as Application Example

Figure 11:
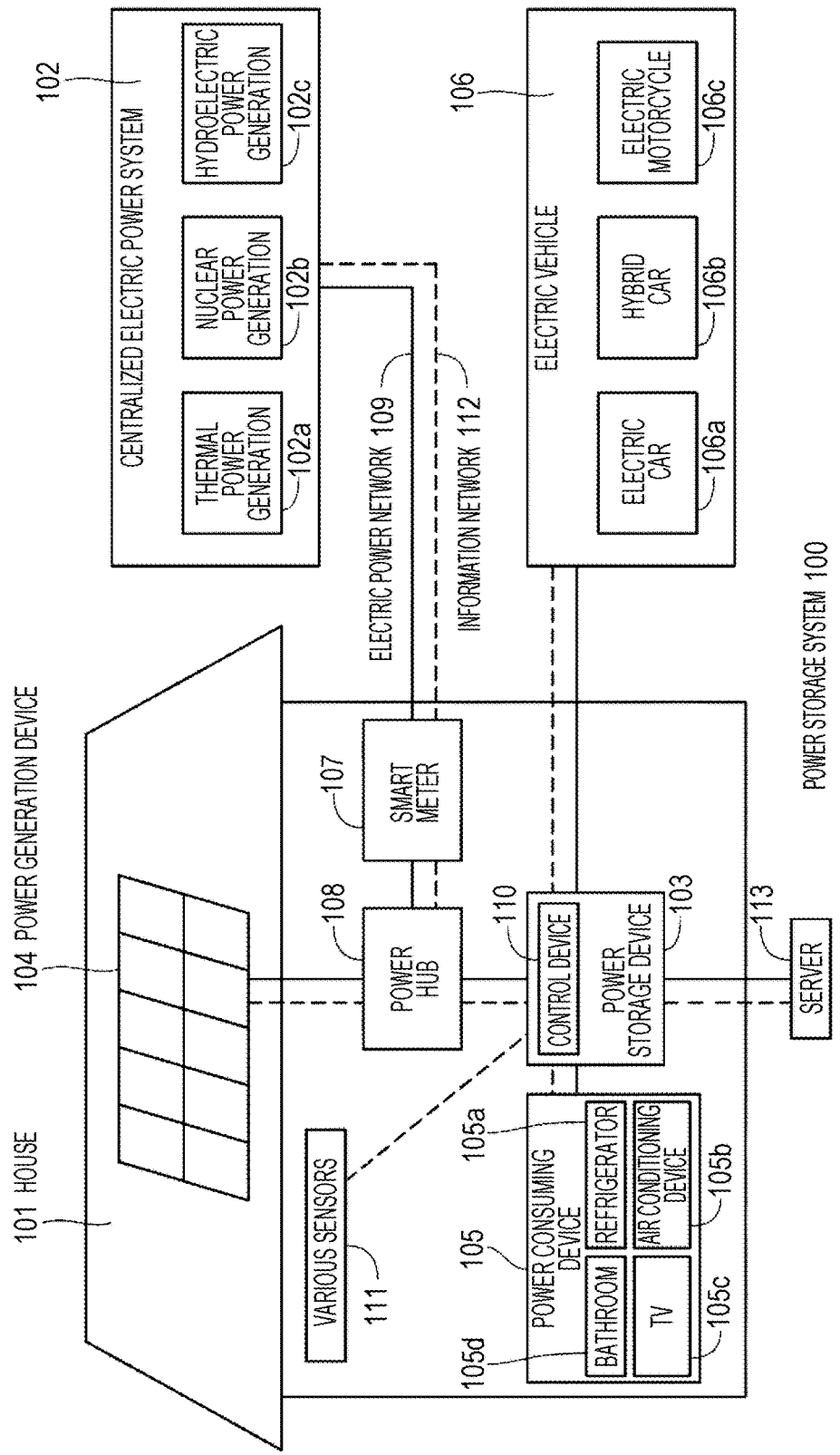
FIG. 11 is an outline diagram illustrating an example of applying the non-aqueous electrolyte battery of the present technology to a power storage system for houses.

An example of applying a power storage device which uses the non-aqueous electrolyte battery of the present technology to a power storage system for houses, is explained with reference to FIG. 11. For example, in a power storage system 100 for a house 101, electric power is supplied from a centralized electric power system 102 such as a thermal power station 102a, a nuclear power station 102b, or a hydroelectric power station 102c, to a power storage device 103 through an electric power network 109, an information network 112, a smart meter 107, a power hub 108 or the like. Together with this, electric power is supplied from an independent power source such as a domestic power generation device 104 to the power storage device 103. The electric power supplied to the power storage device 103 is stored. The electric power used in the house 101 is supplied using the power storage device 103. A similar power storage system can be used in buildings as well, without being limited to the house 101.

The house 101 is provided with a domestic power generation device 104, a power consuming device 105, a power storage device 103, a control device 110 that controls various devices, a smart meter 107, and a sensor 111 that acquires various types of information. The various devices are connected by an electric power network 109 and an information network 112. A solar cell, a fuel cell or the like is used as the domestic power generation device 104, and the electric power thus generated is supplied to the power consuming device 105 and/or power storage device 103. Examples of the power consuming device 105 include a refrigerator 105a, an air conditioning device 105b, a television receiver 105c, and a bathroom 105d. Furthermore, the power consuming device 105 includes an electric vehicle 106. Examples of the electric vehicle 106 include an electric car 106a, a hybrid car 106b, and an electric motorcycle 106c.

In the power storage device 103, the non-aqueous electrolyte battery of the present technology is applied. The non-aqueous electrolyte battery of the present technology may be configured to include, for example, the lithium ion secondary battery described above. The smart meter 107 has a function of measuring the amount of commercial electric power used, and transmits the amount of use thus measured to the power company. The electric power network 109 may use any one of direct current power supply, alternating current power supply, and non-contact power supply, or any combination of plural modes thereof.

Examples of various sensors 111 include a motion sensor, an illuminance sensor, an object detection sensor, a power consumption sensor, a vibration sensor, a contact sensor, a temperature sensor, and an infrared sensor. The information acquired by various sensors 111 are transmitted to the control device 110. The weather condition, the condition of a person and the like are understood based on the information obtained from the sensors 111, the power consuming device 105 is automatically controlled, and thus energy consumption can be minimized. Furthermore, the control device 110 can transmit the information on the house 101 to an external electric power company or the like through the internet.

The power hub 108 achieves processing such as branching of the electric power lines and direct current-alternating current conversion. Examples of the communication modes of an information network 112 that is connected to the control device 110 include a method of using a communication interface such as UART (Universal Asynchronous Receiver-Transceiver: transmission and reception circuit for asynchronous serial communication); and a method of utilizing a sensor network based on wireless communication standards such as Bluetooth, ZigBee, and Wi-Fi. The Bluetooth mode can be applied to multimedia communications, and one-to-many connection communication can be performed. ZigBee uses a physical layer of IEEE (Institute of Electrical and Electronics Engineers) 802.15.4. IEEE 802.15.4 is the title of the short distance wireless network standards called PAN (Personal Area Network) or W (Wireless) PAN.

The control device 110 is connected to an external server 113. This server 113 may be managed by any one of the house 101, an electric power company, and a service provider. The information transmitted and received by the server 113 is, for example, information on power consumption, information on lifestyle patterns, electric power fees, information on weather, information on natural disasters, and information on electricity transactions. These pieces of information may be transmitted and received from a power consuming device (for example, a television receiver) at home, or may be transmitted and received from an out-of-home device (for example, a mobile telephone). These pieces of information may be displayed on a device having a display function, for example, a television receiver, a mobile telephone, or a PDA (Personal Digital Assistant).

The control device 110 that controls various units is configured to include a CPU (Central Processing Unit), a RAM (Random Access Memory), a ROM (Read Only Memory), and the like, and in this example, the control device is housed in the power storage device 103. The control device 110 is connected to the power storage device 103, the domestic power generation device 104, the power consuming device 105, the various sensors 111, and the server 113 through the information network 112, and has a function of, for example, regulating the amount of use of commercial electric power and the amount of power generation. In addition to that, the control device 110 may also have a function of performing electricity transactions in the electric power market.

As described above, not only the electric power of the centralized electric power system 102 such as a thermal power station 102a, a nuclear power station 102b, or a hydroelectric power station 102c, but also the electric power generated by a domestic power generation device 104 (solar power generation and wind power generation) can be stored in the power storage device 103. Therefore, even if the electric power generated by the domestic power generation device 104 fluctuates, it is possible to perform control so as to make the amount of electric power sent to the outside constant, or to discharge electricity by a necessary amount.

For example, a method of use in which the electric power obtained by solar power generation is stored in the power storage device 103, and inexpensive late night power is stored in the power storage device 103 during nighttime, while the electric power stored in the power storage device 103 is discharged and used in a time zone in which the fee during daytime is high, can be employed.

Meanwhile, in this example, an example in which the control device 110 is housed in the power storage device 103 has been described; however, the control device 110 may be housed in a smart meter 107 or may be configured to be used alone. Furthermore, the power storage system 100 may be used by plural households in a multiple dwelling house, or may be used by a plural numbers of single family-dwelling houses.

(4-2) Power Storage System in Vehicle as Application Example

Figure 12:
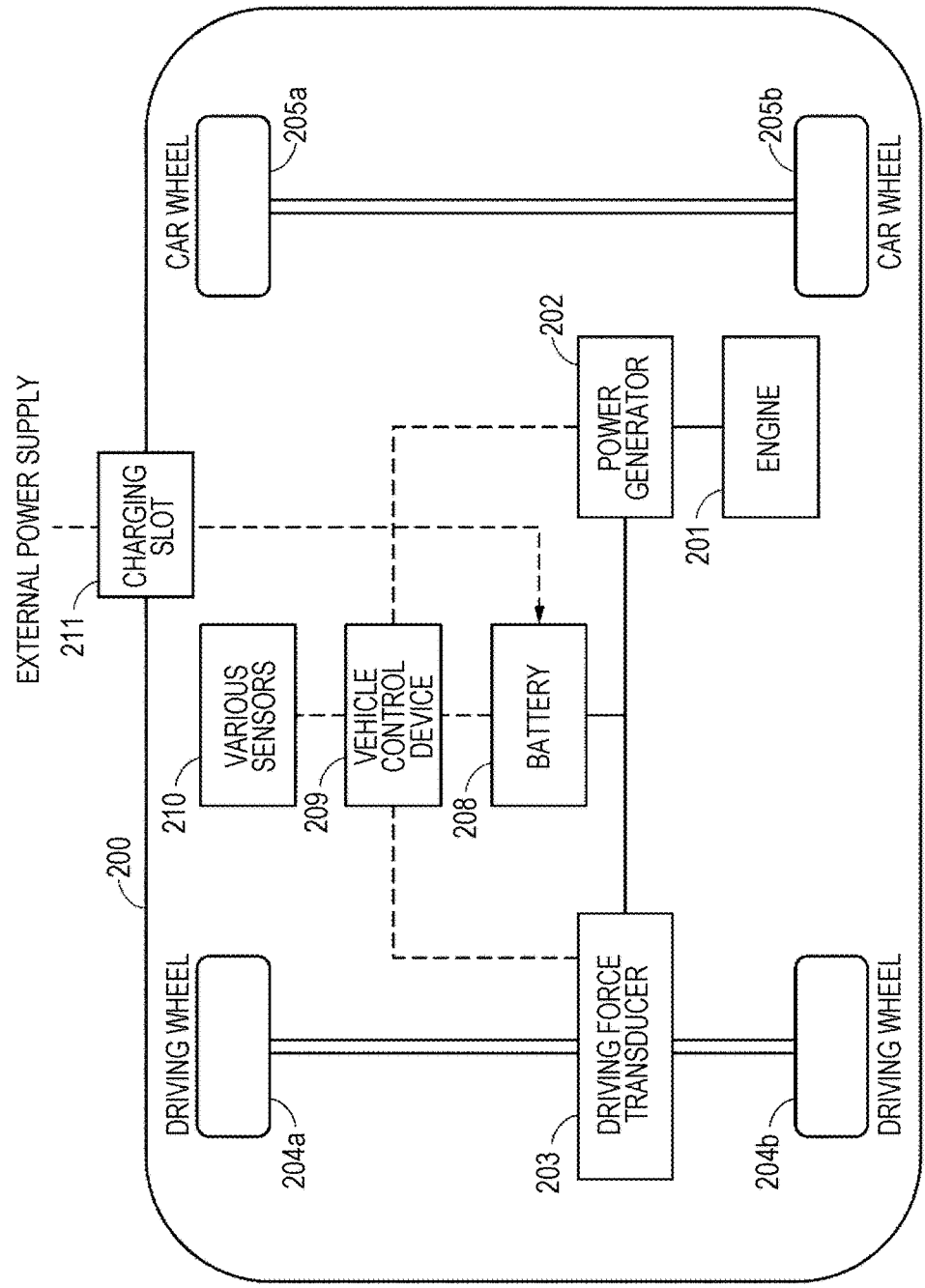
FIG. 12 is an outline diagram schematically illustrating an example of the configuration of a hybrid vehicle which employs a series hybrid system to which the present technology is applied.

An example of applying the present technology to a power storage system for vehicles will be explained with reference to FIG. 12. FIG. 12 schematically illustrates an example of the configuration of a hybrid vehicle which employs the series hybrid system to which the present technology is applied. A series hybrid system is a car which runs using an electric power driving force transducer, by using the electric power generated by a power generator that is driven by an engine, or by using electric power that has been temporarily stored in a battery.

This hybrid vehicle 200 is equipped with an engine 201, a power generator 202, an electric power driving force transducer 203, a driving wheel 204a, a driving wheel 204b, a wheel 205a, a wheel 205b, a battery 208, a vehicle control device 209, various sensors 210, and a charging slot 211. The non-aqueous electrolyte battery of the present technology described above is applied to the battery 208.

The hybrid vehicle 200 runs by means of the electric power driving force transducer 203 as a driving force source. An example of the electric power driving force transducer 203 is a motor. The electric power driving force transducer 203 is operated by the electric power of the battery 208, and the rotational force of this electric power driving force transducer 203 is transferred to the driving wheels 204a and 204b. Meanwhile, when direct current-alternating current (DC-AC) or inverse conversion (AC-DC conversion) is used at a site in need thereof, the electric power driving force transducer 203 can be applied to an alternating current motor or a direct current motor. The various sensors 210 control the engine speed through the vehicle control device 209, or control the opening (degree of throttle opening) of a throttle valve that is not shown in the diagram. The various sensors 210 include a speed sensor, an acceleration sensor, an engine speed sensor, and the like.

The rotational force of an engine 201 can be transferred to a power generator 202, and the electric power generated by the power generator 202 by means of the rotational force can be stored in a battery 208.

When a hybrid vehicle 200 is decelerated by a braking mechanism that is not shown in the diagram, the resistance force at the time of deceleration is added as a rotational force to the electric power driving force transducer 203, and the regenerative electric power generated by the electric power driving force transducer 203 by this rotational force is stored in the battery 208.

When the battery 208 is connected to an external power supply of the hybrid vehicle 200, the battery 208 can receive the supply of electric power from an external power supply through a charging slot 211 as an input slot and store the received electric power.

Although not shown in the diagram, an information processing device that performs information processing for vehicle control based on the information related to the non-aqueous electrolyte battery, may also be included. Examples of such an information processing device include an information processing device which performs display of the battery residual quantity based on the information on the residual quantity of the battery.

An explanation has been given above, for example, on a series hybrid car that runs using a motor by using electric power generated by a power generator that is driven by an engine, or by using electric power that has been temporarily stored in a battery. However, the present technology can also be effectively applied to a parallel hybrid car in which the power outputs of both the engine and the motor are used as a driving source, and three modes such as running only on the engine, running only on the motor, and running on both the engine and the motor, may be switched as appropriate upon use. In addition, the present technology can also be effectively applied to a so-called electric vehicle that runs by being driven by a driving motor only without using an engine.

EXAMPLES

Hereinafter, the present technology will be described in detail by way of Examples. Meanwhile, the present technology is not intended to be limited to the configurations of the Examples described below.

<Example 1-1> to <Example 1-48> and
<Comparative Example 1-1> to <Comparative Example 1-16

In Example 1-1 to Example 1-48 and Comparative Example 1-1 to Comparative Example 1-16 described below, the effects of the present technology were confirmed by employing batteries in each of which the heat capacity per unit area and the heat capacity per unit volume of the gel electrolyte layer had been adjusted.

Example 1-1

Production of Positive Electrode

A positive electrode mix was prepared by mixing 91% by mass of lithium cobaltate ($LiCoO_2$) as a positive electrode active material, 6% by mass of carbon black as a conductive agent, and 3% by mass of polyvinylidene fluoride (PVdF) as a binder, and this positive electrode mix was dispersed in N-methyl-2-pyrrolidone (NMP) as a dispersing medium to obtain a positive electrode mix slurry. This positive electrode mix slurry was applied on both surfaces of a positive electrode current collector formed from a band-shaped aluminum foil having a thickness of 12 μm, such that a part of the positive electrode current collector was exposed. Subsequently, the dispersing medium of the applied positive electrode mix slurry was evaporated and dried, and the remaining positive electrode mix slurry was compression molded using a roll press. Thereby, a positive electrode active material layer was formed. Lastly, a positive electrode terminal was attached to an exposed area of the positive electrode current collector, and thus a positive electrode was formed.

[Production of Negative Electrode]

A negative electrode mix was produced by mixing 96% by mass of a granular graphite powder having an average particle size of 20 μm as a negative electrode active material, 1.5% by mass of an acrylic acid modification product of a styrene-butadiene copolymer as a binder, and 1.5% by mass of carboxymethyl cellulose as a thickening agent, and an appropriate amount of water was added thereto with stirring. Thereby, a negative electrode mix slurry was prepared. This negative electrode mix slurry was applied on both surfaces of a negative electrode current collector formed from a band-shaped copper foil having a thickness of 15 μm, such that a part of the negative electrode current collector was exposed. Subsequently, the dispersing medium of the applied negative electrode mix slurry was evaporated and dried, and the remaining negative electrode mix slurry was compression molded using a roll press. Thereby, a negative electrode active material layer was formed. Lastly, a negative electrode terminal was attached to an exposed area of the negative electrode current collector, and thus a negative electrode was formed.

[Formation of Gel Electrolyte Layer]

A non-aqueous liquid electrolyte was prepared by dissolving lithium hexafluorophosphate ($LiPF_6$) as an electrolyte salt at a concentration of 1 mol/dm$^3$ in a non-aqueous solvent obtained by mixing ethylene carbonate (EC), propylene carbonate (PC) and vinylene carbonate (VC) at a mass ratio of 49:49:2.

Subsequently, a sol-like precursor solution was prepared by using polyvinylidene fluoride (PVdF) as a polymer compound (resin material) for retaining the non-aqueous liquid electrolyte, and mixing the non-aqueous liquid electrolyte, polyvinylidene fluoride, dimethyl carbonate (DMC) as a plasticizer, and inorganic particles of boehmite (specific heat capacity: 1.2 J/gK, specific gravity: 3.07 g/cm$^3$) as heat absorbent particles.

Subsequently, the precursor solution was applied on both surfaces of the positive electrode and both surfaces of the negative electrode, and the precursor solution was dried to remove the plasticizer. Thereby, gel electrolyte layers were formed on the surfaces of the positive electrode and the negative electrode. In these gel electrolyte layers, the inorganic particles, or groups of inorganic particles that have formed secondary particles, are present in a dispersed state in which the particles are scattered without being connected and without forming lumps.

Furthermore, the amount of boehmite per unit area was regulated by means of the coating thickness of the precursor solution. Specifically, the thickness was adjusted such that the amount of boehmite per unit area as the sum for the respective front and back surfaces of the positive electrode and the negative electrode would be 0.0005 g/cm$^2$, and the total heat capacity per unit area of the gel electrolyte layer was adjusted to be 0.0006 J/Kcm$^2$ (0.0005 [g/cm$^2$]×1.2 [J/gK]).

Furthermore, the packing amount of boehmite per unit volume was regulated by means of the solids content ratio of the resin solution. Specifically, a gel electrolyte layer was formed to a thickness of 7.5 μm on the respective surfaces of the positive electrode and the negative electrode such that the amount of boehmite per unit volume as the sum for the respective front and back surfaces of the positive electrode and the negative electrode would be 0.33 g/cm$^3$, and the total thickness of the gel electrolyte layers between the positive electrode and the negative electrode was adjusted to 15 μm (0.0005 [g/cm$^2$]÷0.33 [g/cm$^3$]). Thus, the total heat capacity per unit volume of the gel electrolyte layer was adjusted to be 0.4 J/Kcm$^3$ (0.33 [g/cm$^3$]×1.2 [J/gK]). Thereby, a gel electrolyte layer having a heat capacity per unit area of 0.0006 J/Kcm$^2$ and a heat capacity per unit volume of 0.4 J/Kcm$^3$ was obtained.

[Assembling of Laminate Film Type Battery]

The positive electrode and the negative electrode on which gel electrolyte layers were formed on both surfaces, and the separator were laminated in the order of the positive electrode, the separator, the negative electrode, and the separator, and the laminate was wound several times in the longitudinal direction in a flat shape. Subsequently, the winding end portion was fixed with an adhesive tape, and thereby a wound electrode assembly was formed.

Next, the wound electrode assembly was sheathed with a laminate film having a soft aluminum layer, and the edge from which the positive electrode terminal and the negative electrode terminal were led out, and other two edges around the wound electrode assembly were tightly sealed by sealing by thermal fusion under reduced pressure. Thereby, a laminate film type battery as illustrated in FIG. 1, having a battery shape that measured 37 mm in thickness, 49 mm in width, and 81 mm in height (374981 size), and a battery capacity of 2000 mAh, was produced.

<Example 1-2> to <Example 1-7>

The heat capacity per unit volume of the gel electrolyte layer was adjusted to the value indicated in Table 1, by adjusting the concentration of the inorganic particles. Thereby, laminate film type batteries of Example 1-2 to Example 1-7 including gel electrolyte layers having a heat capacity per unit area of 0.0006 J/Kcm$^2$, heat capacities per unit volume of 0.2 J/Kcm$^3$, 0.3 J/Kcm$^3$, 1.0 J/Kcm$^3$, 1.5 J/Kcm$^3$, 2.5 J/Kcm$^3$, and 3.0 J/Kcm$^3$, respectively, were produced.

<Example 1-8> to <Example 1-12>

The heat capacity per unit area of the gel electrolyte layer was regulated by means of the coating thickness of the precursor solution at the time of application of the precursor solution on the positive electrode and the negative electrode. Specifically, the heat capacities per unit area of the gel electrolyte layers were adjusted to be 0.0001 J/Kcm$^2$, 0.0002 J/Kcm$^2$, 0.0010 J/Kcm$^2$, 0.0013 J/Kcm$^2$, and 0.0015 J/Kcm$^2$, respectively. The heat capacity per unit volume was adjusted to 0.4 J/Kcm$^3$ by adjusting the concentration of the inorganic particles. Thereby, laminate film type batteries of Example 1-8 to Example 1-12 were produced.

<Example 1-13> to <Example 1-24>

At the time of forming the negative electrode active material layer, a silicon was used as the negative electrode active material instead of graphite. A negative electrode mix was produced by mixing 85% by mass of silicon (Si) particles as a negative electrode active material, 10% by mass of carbon black as a conductive agent, and 5% by mass of polyvinylidene fluoride (PVdF) as a binder, and this negative electrode mix was dispersed in N-methyl-2-pyrrolidone (NMP) as a dispersing medium. Thereby, a negative electrode mix slurry was obtained. Laminate film type batteries of Example 1-13 to Example 1-24 were produced in the same manner as in Example 1-1 to Example 1-12, respectively, except that this negative electrode mix slurry was used.

<Example 1-25> to <Example 1-36>

At the time of forming the negative electrode active material layer, a carbon-tin composite material was used as the negative electrode active material instead of graphite. Regarding the carbon-tin composite material, SnCoC-containing material which contained tin (Sn), cobalt (Co) and carbon (C) as constituent elements, had a tin content in the composition of 22% by mass, a content of cobalt of 55% by mass, a content of carbon of 23% by mass, and had a ratio of tin with respect to the sum of tin and cobalt (Co/(Sn+Co)) of 71.4% by mass, was used.

A negative electrode mix was produced by mixing 80% by mass of a SnCoC-containing material powder as a negative electrode active material, 12% by mass of graphite as a conductive agent, and 8% by mass of polyvinylidene fluoride (PVdF) as a binder. Subsequently, the negative electrode mix was dispersed in N-methyl-2-pyrrolidone, and thus a paste-like negative electrode mix slurry was prepared. Laminate film type batteries of Example 1-25 to Example 1-36 were produced in the same manner as in Example 1-1 to Example 1-12, respectively, except that this negative electrode mix slurry was used.

<Example 1-37> to <Example 1-48>

At the time of forming the negative electrode active material layer, lithium titanate ($Li_4Ti_5O_{12}$) was used as the negative electrode active material instead of graphite. A negative electrode mix was produced by mixing 85% by mass of lithium titanate ($Li_4Ti_5O_{12}$) as a negative electrode active material, 10% by mass of graphite as a conductive agent, and 5% by mass of polyvinylidene fluoride (PVdF) as a binder. Subsequently, the negative electrode mix was dispersed in N-methyl-2-pyrrolidone, and thus a paste-like negative electrode mix slurry was prepared. Laminate film type batteries of Example 1-37 to Example 1-48 were produced in the same manner as in Example 1-1 to Example 1-12, respectively, except that this negative electrode mix slurry was used.

Comparative Example 1-1

A laminate film type battery of Comparative Example 1-1 was produced in the same manner as in Example 1-1, except that inorganic particles were not incorporated into the precursor solution, and a gel electrolyte layer that did not contain inorganic particles was formed.

Comparative Example 1-2

A laminate film type battery of Comparative Example 1-2 was produced in the same manner as in Example 1-1, except that the coating amount of the precursor solution was adjusted so as to obtain a heat capacity per unit area of the gel electrolyte layer of 0.00005 $J/Kcm^2$.

Comparative Example 1-3

A laminate film type battery of Comparative Example 1-3 was produced in the same manner as in Example 1-1, except that the concentration of boehmite was adjusted so as to obtain a heat capacity per unit volume of the gel electrolyte layer of 3.5 $J/Kcm^2$.

Comparative Example 1-4

The coating amount of the precursor solution was adjusted so as to obtain a heat capacity per unit area of the gel electrolyte layer of 0.00005 $J/Kcm^2$. The concentration of boehmite was adjusted so as to obtain a heat capacity per unit volume of the gel electrolyte layer of 3.5 $J/Kcm^3$. Thus, a laminate film type battery of Comparative Example 1-4 was produced in the same manner as in Example 1-1, except for the above-described matter.

Comparative Example 1-5

A laminate film type battery of Comparative Example 1-5 was produced in the same manner as in Comparative Example 1-1, except that silicon was used as the negative electrode active material, and the negative electrode mix slurry was produced to have the same composition as that of Example 1-13.

<Comparative Example 1-6> to <Comparative Example 1-8>

Laminate film type batteries of Comparative Example 1-6 to Comparative Example 1-8 were respectively produced in the same manner as in Comparative Example 1-2 to Comparative Example 1-4, except that silicon was used as the negative electrode active material, and the negative electrode mix slurry was produced to have the same composition as that of Example 1-13.

Comparative Example 1-9

A laminate film type battery of Comparative Example 1-9 was produced in the same manner as in Comparative Example 1-1, except that a carbon-tin composite material was used as the negative electrode active material, and the negative electrode mix slurry was produced to have the same composition as that of Example 1-37.

<Comparative Example 1-10> to <Comparative Example 1-12>

Laminate film type batteries of Comparative Example 1-10 to Comparative Example 1-12 were produced in the same manner as in Comparative Example 1-2 to Comparative Example 1-4, respectively, except that a carbon-tin composite material was used as the negative electrode active material, and the negative electrode mix slurry was produced to have the same composition as that of Example 1-25.

Comparative Example 1-13

A laminate film type battery of Comparative Example 1-1 was produced in the same manner as in Comparative Example 1-1, except that lithium titanate ($Li_4Ti_5O_{12}$) was used as the negative electrode active material, and the negative electrode mix slurry was produced to have the same composition as that of Example 1-37.

<Comparative Example 1-14> to <Comparative Example 1-16>

Laminate film type batteries of Comparative Example 1-14 to Comparative Example 1-16 were produced in the same manner as in Comparative Example 1-2 to Comparative Example 1-4, respectively, except that lithium titanate ($Li_4Ti_5O_{12}$) was used as the negative electrode active material, and the negative electrode mix slurry was produced to have the same composition as that of Example 1-37.

Example 1'-1

Inorganic particles of talc (specific heat capacity: 1.1 J/gK and specific gravity: 2.70 $g/cm^3$) were used as the heat absorbent particles, instead of boehmite.

At the time of forming the gel electrolyte layer, the amount of talc per unit area was regulated by means of the coating thickness of the precursor solution. Specifically, the thickness was adjusted such that the amount of talc per unit area as the sum for the respective front and back surfaces of the positive electrode and the negative electrode would be 0.0005 g/cm$^2$. Thus, the total heat capacity per unit area of the gel electrolyte layer was adjusted to be 0.0006 J/Kcm$^2$ (0.00055 [g/cm$^2$]×1.1 [J/gK]).

Furthermore, the packing amount of talc per unit volume was regulated by means of the solids content ratio of the resin solution. Specifically, a gel electrolyte layer was formed to a thickness of 7.6 μm on the respective surfaces of the positive electrode and the negative electrode such that the amount of talc per unit volume as the sum for the respective front and back surfaces of the positive electrode and the negative electrode would be 0.36 g/cm$^3$, and the total thickness of the gel electrolyte layers between the positive electrode and the negative electrode was adjusted to 15.2 μm (0.00055 [g/cm$^2$]÷0.36 [g/cm$^3$]). Thus, the total heat capacity per unit volume of the gel electrolyte layer was adjusted to be 0.4 J/Kcm$^3$ (0.36 [g/cm$^3$]×1.1 [J/gK]). Thereby, a gel electrolyte layer having a heat capacity per unit area of 0.0006 J/Kcm$^2$ and a heat capacity per unit volume of 0.4 J/Kcm$^3$ was obtained. A laminate film type battery of Example 1'-1 was produced in the same manner as in Example 1-1, except for the above-described matter.

<Example 1'-2> to <Example 1'-7>

The heat capacity per unit volume of the gel electrolyte layer was adjusted to the value indicated in Table 1, by adjusting the concentration of the inorganic particles. Thereby, laminate film type batteries of Example 1'-2 to Example 1'-7 including gel electrolyte layers having a heat capacity per unit area of 0.0006 J/Kcm$^2$, and heat capacities per unit volume of 0.2 J/Kcm$^3$, 0.3 J/Kcm$^3$, 1.0 J/Kcm$^3$, 1.5 J/Kcm$^3$, 2.5 J/Kcm$^3$, and 3.0 J/Kcm$^3$, respectively, were produced.

<Example 1'-8> to <Example 1'-12>

At the time of application of the precursor solution on the positive electrode and the negative electrode, the heat capacity per unit area of the gel electrolyte layer was regulated by means of the coating thickness of the precursor solution. Specifically, the heat capacities per unit area of the gel electrolyte layers were adjusted to be 0.0001 J/Kcm$^2$, 0.0002 J/Kcm$^2$, 0.0010 J/Kcm$^2$, 0.0013 J/Kcm$^2$, and 0.0015 J/Kcm$^2$, respectively. The heat capacity per unit volume was adjusted to be 0.4 J/Kcm$^3$ by adjusting the concentration of the inorganic particles. Thereby, laminate film type batteries of Example 1'-8 to Example 1'-12 were produced.

<Example 1'-13> to <Example 1'-24>

At the time of forming the negative electrode active material layer, silicon was used as the negative electrode active material, instead of graphite. A negative electrode mix was prepared by mixing 85% by mass of silicon (Si) particles as a negative electrode active material, 10% by mass of carbon black as a conductive agent, and 5% by mass of polyvinylidene fluoride (PVdF) as a binder, and this negative electrode mix was dispersed in N-methyl-2-pyrrolidone (NMP) as a dispersing medium to obtain a negative electrode mix slurry. Laminate film type batteries of Example 1'-13 to Example 1'-24 were produced in the same manner as in Example 1'-1 to Example 1'-12, respectively, except that this negative electrode mix slurry was used.

<Example 1'-25> to <Example 1'-36>

At the time of forming the negative electrode active material layer, a carbon-tin composite material was used as the negative electrode active material, instead of graphite. For the carbon-tin composite material, a SnCoC-containing material which contained tin (Sn), cobalt (Co) and carbon (C) as constituent elements, and had a composition including a content of tin of 22% by mass, a content of cobalt of 55% by mass, and a content of carbon of 23% by mass, with the ratio of tin to the sum of tin and cobalt (Co/(Sn+Co)) being 71.4% by mass, was used.

A negative electrode mix was prepared by mixing 80% by mass of the SnCoC-containing material powder as a negative electrode active material, 12% by mass of graphite as a conductive agent, and 8% by mass of polyvinylidene fluoride (PVdF) as a binder. Subsequently, the negative electrode mix was dispersed in N-methyl-2-pyrrolidone (NMP), and thus a paste-like negative electrode mix slurry was prepared. Laminate film type batteries of Example 1'-25 to Example 1'-36 were produced in the same manner as in Example 1'-1 to Example 1'-12, respectively, except that this negative electrode mix slurry was used.

<Example 1'-37> to <Example 1'-48>

At the time of forming the negative electrode active material layer, lithium titanate (Li$_4$Ti$_5$O$_{12}$) was used as the negative electrode active material, instead of graphite. A negative electrode mix was prepared by mixing 85% by mass of lithium titanate (Li$_4$Ti$_5$O$_{12}$) as a negative electrode active material, 10% by mass of graphite as a conductive agent, and 5% by mass of polyvinylidene fluoride (PVdF) as a binder. Subsequently, the negative electrode mix was dispersed in N-methyl-2-pyrrolidone, and thus a paste-like negative electrode mix slurry was prepared. Laminate film type batteries of Example 1'-37 to Example 1'-48 were produced in the same manner as in Example 1'-1 to Example 1'-12, respectively, except that this negative electrode mix slurry was used.

Comparative Example 1'-1

A laminate film type battery of Comparative Example 1'-1 was produced in the same manner as in Example 1'-1, except that inorganic particles were not incorporated into the precursor solution, and a gel electrolyte layer that did not contain inorganic particles was formed.

Comparative Example 1'-2

A laminate film type battery of Comparative Example 1'-2 was produced in the same manner as in Example 1'-1, except that the coating amount of the precursor solution was adjusted so as to obtain a heat capacity per unit area of the gel electrolyte layer of 0.00005 J/Kcm$^2$.

Comparative Example 1'-3

A laminate film type battery of Comparative Example 1-3 was produced in the same manner as in Example 1-1, except that the concentration of talc was adjusted so as to obtain a heat capacity per unit volume of the gel electrolyte layer of 3.5 J/Kcm$^2$.

Comparative Example 1'-4

The coating amount of the precursor solution was adjusted so as to obtain a heat capacity per unit area of the gel electrolyte layer of 0.00005 J/Kcm². The concentration of talc was adjusted so as to obtain a heat capacity per unit volume of the gel electrolyte layer of 3.5 J/Kcm³. A laminate film type battery of Comparative Example 1'-4 was produced in the same manner as in Example 1'-1, except of the above-described matter.

Comparative Example 1'-5

A laminate film type battery of Comparative Example 1'-5 was produced in the same manner as in Comparative Example 1'-1, except that silicon was used as the negative electrode active material, and a negative electrode mix slurry having a configuration similar to that of Example 1'-13 was used.

<Comparative Example 1'-6> to <Comparative Example 1'-8

Laminate film type batteries of Comparative Example 1'-6 to Comparative Example 1'-8 were produced in the same manner as in Comparative Example 1'-2 to Comparative Example 1'-4, respectively, except that silicon was used as the negative electrode active material, and a negative electrode mix slurry having a configuration similar to that of Example 1'-13 was used.

Comparative Example 1'-9

A laminate film type battery of Comparative Example 1'-9 was produced in the same manner as in Comparative Example 1'-1, except that a carbon-tin composite material was used as the negative electrode active material, and a negative electrode mix slurry having a configuration similar to that of Example 1'-37 was used.

<Comparative Example 1'-10> to <Comparative Example 1'-12

Laminate film type batteries of Comparative Example 1'-10 to Comparative Example 1'-12 were produced in the same manner as in Comparative Example 1'-2 to Comparative Example 1'-4, respectively, except that a carbon-tin composite material was used as the negative electrode active material, and a negative electrode mix slurry having a configuration similar to that of Example 1'-25 was used.

Comparative Example 1'-13

A laminate film type battery of Comparative Example 1'-1 was produced in the same manner as in Comparative Example 1'-1, except that lithium titanate ($Li_4Ti_5O_{12}$) was used as the negative electrode active material, and a negative electrode mix slurry having a configuration similar to that of Example 1'-37 was used.

<Comparative Example 1'-14> to <Comparative Example 1'-16

Laminate film type batteries of Comparative Example 1'-14 to Comparative Example 1'-16 were produced in the same manner as in Comparative Example 1'-2 to Comparative Example 1'-4, respectively, except that lithium titanate ($Li_4Ti_5O_{12}$) was used as the negative electrode active material, and a negative electrode mix slurry having a configuration similar to that of Example 1'-37 was used.

[Evaluation of Batteries: Short Circuit Test]

For each of the laminate film type batteries of various Examples and various Comparative Examples thus produced, the positive electrode and the negative electrode were electrically short-circuited on the outside of the battery, and measurement of the heat generation temperature of the laminate film type battery and checking of the presence or absence of gas eruption were carried out. At the time of a short circuit, when the heat generation temperature of the laminate film type battery was 100° C. or lower, it was considered that the battery was in a safe state. In this case, a battery is accompanied by heat generation at 100° C. or lower due to a shutdown of the separator, a short circuit inside the laminate film type battery, and the like; however, subsequently the battery enters into a state of being not usable, and the temperature of the battery is decreased. Thus, no more risk occurs thereafter. Meanwhile, if the maximum temperature of the battery is 80° C. or lower, since a shutdown of the separator or a short circuit inside the battery does not occur, the battery can be continuously used when the battery temperature is decreased. Thus, it is more preferable.

Furthermore, when gas erupted from the battery, it was considered that the battery was in a hazardous condition. Even if a shutdown of the separator, a short circuit inside the battery, and the like occur, when the positive electrode is in a markedly overheated state, the positive electrode undergoes a thermal decomposition reaction, and gas erupts from the inside of the battery.

The evaluation results are presented in the following Table 1.

TABLE 1

| | Negative electrode active material | Gel electrolyte layer | | | | Short circuit test | |
| --- | --- | --- | --- | --- | --- | --- | --- |
| | | Inorganic particles | Resin material | Heat capacity per unit area [J/Kcm²] | Heat capacity per unit volume [J/Kcm³] | Heat generation temperature [° C.] | Gas eruption |
| Example 1-1 | Graphite | Boehmite | PVdF | 0.0006 | 0.4 | 62 | No |
| Example 1-2 | | | | 0.0006 | 0.2 | 51 | No |
| Example 1-3 | | | | 0.0006 | 0.3 | 56 | No |
| Example 1-4 | | | | 0.0006 | 1.0 | 61 | No |
| Example 1-5 | | | | 0.0006 | 1.5 | 67 | No |
| Example 1-6 | | | | 0.0006 | 2.5 | 69 | No |
| Example 1-7 | | | | 0.0006 | 3.0 | 89 | No |
| Example 1-8 | | | | 0.0001 | 0.4 | 89 | No |
| Example 1-9 | | | | 0.0002 | 0.4 | 66 | No |
| Example 1-10 | | | | 0.0010 | 0.4 | 50 | No |
| Example 1-11 | | | | 0.0013 | 0.4 | 44 | No |

TABLE 1-continued

|  | Negative electrode active material | Gel electrolyte layer | | | Short circuit test | |
|---|---|---|---|---|---|---|
|  |  | Inorganic particles | Resin material | Heat capacity per unit area [J/Kcm$^2$] | Heat capacity per unit volume [J/Kcm$^3$] | Heat generation temperature [° C.] | Gas eruption |
| Example 1-12 |  |  |  | 0.0015 | 0.4 | 38 | No |
| Example 1-13 | Silicon | Boehmite | PVdF | 0.0006 | 0.4 | 72 | No |
| Example 1-14 |  |  |  | 0.0006 | 0.2 | 61 | No |
| Example 1-15 |  |  |  | 0.0006 | 0.3 | 66 | No |
| Example 1-16 |  |  |  | 0.0006 | 1.0 | 71 | No |
| Example 1-17 |  |  |  | 0.0006 | 1.5 | 77 | No |
| Example 1-18 |  |  |  | 0.0006 | 2.5 | 79 | No |
| Example 1-19 |  |  |  | 0.0006 | 3.0 | 99 | No |
| Example 1-20 |  |  |  | 0.0001 | 0.4 | 99 | No |
| Example 1-21 |  |  |  | 0.0002 | 0.4 | 76 | No |
| Example 1-22 |  |  |  | 0.0010 | 0.4 | 60 | No |
| Example 1-23 |  |  |  | 0.0013 | 0.4 | 54 | No |
| Example 1-24 |  |  |  | 0.0015 | 0.4 | 48 | No |
| Example 1-25 | Carbon-tin composite material | Boehmite | PVdF | 0.0006 | 0.4 | 65 | No |
| Example 1-26 |  |  |  | 0.0006 | 0.2 | 54 | No |
| Example 1-27 |  |  |  | 0.0006 | 0.3 | 59 | No |
| Example 1-28 |  |  |  | 0.0006 | 1.0 | 64 | No |
| Example 1-29 |  |  |  | 0.0006 | 1.5 | 70 | No |
| Example 1-30 |  |  |  | 0.0006 | 2.5 | 72 | No |
| Example 1-31 |  |  |  | 0.0006 | 3.0 | 92 | No |
| Example 1-32 |  |  |  | 0.0001 | 0.4 | 92 | No |
| Example 1-33 |  |  |  | 0.0002 | 0.4 | 69 | No |
| Example 1-34 |  |  |  | 0.0010 | 0.4 | 53 | No |
| Example 1-35 |  |  |  | 0.0013 | 0.4 | 47 | No |
| Example 1-36 |  |  |  | 0.0015 | 0.4 | 41 | No |
| Example 1-37 | Lithium titanate | Boehmite | PVdF | 0.0006 | 0.4 | 64 | No |
| Example 1-38 |  |  |  | 0.0006 | 0.2 | 53 | No |
| Example 1-39 |  |  |  | 0.0006 | 0.3 | 58 | No |
| Example 1-40 |  |  |  | 0.0006 | 1.0 | 63 | No |
| Example 1-41 |  |  |  | 0.0006 | 1.5 | 69 | No |
| Example 1-42 |  |  |  | 0.0006 | 2.5 | 71 | No |
| Example 1-43 |  |  |  | 0.0006 | 3.0 | 91 | No |
| Example 1-44 |  |  |  | 0.0001 | 0.4 | 91 | No |
| Example 1-45 |  |  |  | 0.0002 | 0.4 | 68 | No |
| Example 1-46 |  |  |  | 0.0010 | 0.4 | 52 | No |
| Example 1-47 |  |  |  | 0.0013 | 0.4 | 46 | No |
| Example 1-48 |  |  |  | 0.0015 | 0.4 | 40 | No |
| Comparative Example 1-1 | Graphite | — | PVdF | — | — | 500 | Yes |
| Comparative Example 1-2 |  | Boehmite | PVdF | 0.00005 | 0.4 | 350 | Yes |
| Comparative Example 1-3 |  |  |  | 0.0006 | 3.5 | 290 | Yes |
| Comparative Example 1-4 |  |  |  | 0.00005 | 3.5 | 410 | Yes |
| Comparative Example 1-5 | Silicon | — | PVdF | — | — | 500 | Yes |
| Comparative Example 1-6 |  | Boehmite | PVdF | 0.00005 | 0.4 | 450 | Yes |
| Comparative Example 1-7 |  |  |  | 0.0006 | 3.5 | 390 | Yes |
| Comparative Example 1-8 |  |  |  | 0.00005 | 3.5 | 510 | Yes |
| Comparative Example 1-9 | Carbon-tin composite material | — | PVdF | — | — | 500 | Yes |
| Comparative Example 1-10 |  | Boehmite | PVdF | 0.00005 | 0.4 | 420 | Yes |
| Comparative Example 1-11 |  |  |  | 0.0006 | 3.5 | 360 | Yes |
| Comparative Example 1-12 |  |  |  | 0.00005 | 3.5 | 480 | Yes |
| Comparative Example 1-13 | Lithium titanate | — | PVdF | — | — | 500 | Yes |
| Comparative Example 1-14 |  | Boehmite | PVdF | 0.00005 | 0.4 | 380 | Yes |
| Comparative Example 1-15 |  |  |  | 0.0006 | 3.5 | 320 | Yes |
| Comparative Example 1-16 |  |  |  | 0.00005 | 3.5 | 440 | Yes |
| Example 1'-1 | Graphite | Talc | PVdF | 0.0006 | 0.4 | 62 | No |
| Example 1'-2 |  |  |  | 0.0006 | 0.2 | 51 | No |
| Example 1'-3 |  |  |  | 0.0006 | 0.3 | 56 | No |
| Example 1'-4 |  |  |  | 0.0006 | 1.0 | 61 | No |
| Example 1'-5 |  |  |  | 0.0006 | 1.5 | 67 | No |

TABLE 1-continued

|  | Negative electrode active material | Gel electrolyte layer ||| Short circuit test ||
|  |  | Inorganic particles | Resin material | Heat capacity per unit area [J/Kcm$^2$] | Heat capacity per unit volume [J/Kcm$^3$] | Heat generation temperature [° C.] | Gas eruption |
|---|---|---|---|---|---|---|---|
| Example 1'-6 |  |  |  | 0.0006 | 2.5 | 69 | No |
| Example 1'-7 |  |  |  | 0.0006 | 3.0 | 89 | No |
| Example 1'-8 |  |  |  | 0.0001 | 0.4 | 89 | No |
| Example 1'-9 |  |  |  | 0.0002 | 0.4 | 66 | No |
| Example 1'-10 |  |  |  | 0.0010 | 0.4 | 50 | No |
| Example 1'-11 |  |  |  | 0.0013 | 0.4 | 44 | No |
| Example 1'-12 |  |  |  | 0.0015 | 0.4 | 38 | No |
| Example 1'-13 | Silicon | Talc | PVdF | 0.0006 | 0.4 | 72 | No |
| Example 1'-14 |  |  |  | 0.0006 | 0.2 | 61 | No |
| Example 1'-15 |  |  |  | 0.0006 | 0.3 | 66 | No |
| Example 1'-16 |  |  |  | 0.0006 | 1.0 | 71 | No |
| Example 1'-17 |  |  |  | 0.0006 | 1.5 | 77 | No |
| Example 1'-18 |  |  |  | 0.0006 | 2.5 | 79 | No |
| Example 1'-19 |  |  |  | 0.0006 | 3.0 | 99 | No |
| Example 1'-20 |  |  |  | 0.0001 | 0.4 | 99 | No |
| Example 1'-21 |  |  |  | 0.0002 | 0.4 | 76 | No |
| Example 1'-22 |  |  |  | 0.0010 | 0.4 | 60 | No |
| Example 1'-23 |  |  |  | 0.0013 | 0.4 | 54 | No |
| Example 1'-24 |  |  |  | 0.0015 | 0.4 | 48 | No |
| Example 1'-25 | Carbon-tin composite material | Talc | PVdF | 0.0006 | 0.4 | 65 | No |
| Example 1'-26 |  |  |  | 0.0006 | 0.2 | 54 | No |
| Example 1'-27 |  |  |  | 0.0006 | 0.3 | 59 | No |
| Example 1'-28 |  |  |  | 0.0006 | 1.0 | 64 | No |
| Example 1'-29 |  |  |  | 0.0006 | 1.5 | 70 | No |
| Example 1'-30 |  |  |  | 0.0006 | 2.5 | 72 | No |
| Example 1'-31 |  |  |  | 0.0006 | 3.0 | 92 | No |
| Example 1'-32 |  |  |  | 0.0001 | 0.4 | 92 | No |
| Example 1'-33 |  |  |  | 0.0002 | 0.4 | 69 | No |
| Example 1'-34 |  |  |  | 0.0010 | 0.4 | 53 | No |
| Example 1'-35 |  |  |  | 0.0013 | 0.4 | 47 | No |
| Example 1'-36 |  |  |  | 0.0015 | 0.4 | 41 | No |
| Example 1'-37 | Lithium titanate | Boehmite | PVdF | 0.0006 | 0.4 | 64 | No |
| Example 1'-38 |  |  |  | 0.0006 | 0.2 | 53 | No |
| Example 1'-39 |  |  |  | 0.0006 | 0.3 | 58 | No |
| Example 1'-40 |  |  |  | 0.0006 | 1.0 | 63 | No |
| Example 1'-41 |  |  |  | 0.0006 | 1.5 | 69 | No |
| Example 1'-42 |  |  |  | 0.0006 | 2.5 | 71 | No |
| Example 1'-43 |  |  |  | 0.0006 | 3.0 | 91 | No |
| Example 1'-44 |  |  |  | 0.0001 | 0.4 | 91 | No |
| Example 1'-45 |  |  |  | 0.0002 | 0.4 | 68 | No |
| Example 1'-46 |  |  |  | 0.0010 | 0.4 | 52 | No |
| Example 1'-47 |  |  |  | 0.0013 | 0.4 | 46 | No |
| Example 1'-48 |  |  |  | 0.0015 | 0.4 | 40 | No |
| Comparative Example 1'-1 | Graphite | — | PVdF | — | — | 500 | Yes |
| Comparative Example 1'-2 |  | Boehmite | PVdF | 0.00005 | 0.4 | 350 | Yes |
| Comparative Example 1'-3 |  |  |  | 0.0006 | 3.5 | 290 | Yes |
| Comparative Example 1'-4 |  |  |  | 0.00005 | 3.5 | 410 | Yes |
| Comparative Example 1'-5 | Silicon | — | PVdF | — | — | 500 | Yes |
| Comparative Example 1'-6 |  | Boehmite | PVdF | 0.00005 | 0.4 | 450 | Yes |
| Comparative Example 1'-7 |  |  |  | 0.0006 | 3.5 | 390 | Yes |
| Comparative Example 1'-8 |  |  |  | 0.00005 | 3.5 | 510 | Yes |
| Comparative Example 1'-9 | Carbon-tin composite material | — | PVdF | — | — | 500 | Yes |
| Comparative Example 1'-10 |  | Boehmite | PVdF | 0.00005 | 0.4 | 420 | Yes |
| Comparative Example 1'-11 |  |  |  | 0.0006 | 3.5 | 360 | Yes |
| Comparative Example 1'-12 |  |  |  | 0.00005 | 3.5 | 480 | Yes |
| Comparative Example 1'-13 | Lithium titanate | — | PVdF | — | — | 500 | Yes |
| Comparative Example 1'-14 |  | Boehmite | PVdF | 0.00005 | 0.4 | 380 | Yes |

TABLE 1-continued

| | Negative electrode active material | Gel electrolyte layer | | | | Short circuit test | |
|---|---|---|---|---|---|---|---|
| | | Inorganic particles | Resin material | Heat capacity per unit area [J/Kcm$^2$] | Heat capacity per unit volume [J/Kcm$^3$] | Heat generation temperature [° C.] | Gas eruption |
| Comparative Example 1'-15 | | | | 0.0006 | 3.5 | 320 | Yes |
| Comparative Example 1'-16 | | | | 0.00005 | 3.5 | 440 | Yes |

As can be seen from Table 1, in Example 1-1 to Example 1-48 and Example 1'-1 to Example 1'-48 in which the heat capacity per unit area of the gel electrolyte layer was 0.0001 J/Kcm$^2$ or more, and the heat capacity per unit volume was 3.0 J/Kcm$^3$ or less, it was confirmed that the batteries were in a safe state in the short circuit test.

On the other hand, in Comparative Example 1-2 and Comparative Example 1'-2, in which the heat capacity per unit area of the gel electrolyte layer is less than 0.0001 J/Kcm$^2$; in Comparative Example 1-3 and Comparative Example 1'-3 in which the heat capacity per unit volume of the gel electrolyte layer is more than 3.0 J/Kcm$^3$; and in Comparative Example 1-4 and Comparative Example 1'-4 in which the heat capacity per unit area and the heat capacity per unit volume were not in the ranges described above, it was found that the batteries were in a hazardous state in the short circuit test. It was found that in Comparative Example 1-5 to Comparative Example 1-16 and Comparative Example 1'-5 to Comparative Example 1'-16 as well, the batteries are similarly brought into a hazardous state in the short circuit test.

<Example 2-1> to <Example 2-224> and <Comparative Example 2-1

In Example 2-1 to Example 2-224 and Comparative Example 2-1, the effects of the present technology were confirmed by replacing the heat absorbent particles and the resin material that constitute the gel electrolyte layer.

Example 2-1

A laminate film type battery of Example 2-1 was produced in the same manner as in Example 1-1.

Example 2-2

A laminate film type battery was produced in the same manner as in Example 2-1, except that polyimide was used as the resin material used in the gel electrolyte layer, instead of polyvinylidene fluoride.

Example 2-3

A laminate film type battery was produced in the same manner as in Example 2-1, except that an all-aromatic polyamide (aramid) was used as the resin material used in the gel electrolyte layer, instead of polyvinylidene fluoride.

Example 2-4

A laminate film type battery was produced in the same manner as in Example 2-1, except that polyacrylonitrile was used as the resin material used in the gel electrolyte layer, instead of polyvinylidene fluoride.

Example 2-5

A gel electrolyte layer battery was produced in the same manner as in Example 2-1, except that polyvinyl alcohol was used as the resin material used in the gel electrolyte layer, instead of polyvinylidene fluoride.

Example 2-6

A laminate film type battery was produced in the same manner as in Example 2-1, except that polyether was used as the resin material used in the gel electrolyte layer, instead of polyvinylidene fluoride.

Example 2-7

A laminate film type battery was produced in the same manner as in Example 2-1, except that an acrylic acid resin was used as the resin material used in the gel electrolyte layer, instead of polyvinylidene fluoride.

<Example 2-8> to <Example 2-14>

Laminate film type batteries were produced in the same manner as in Example 2-1 to Example 2-7, respectively, except that aluminum nitride (specific heat capacity: 0.7 J/gK) was used instead of boehmite as the heat absorbent particles used in the gel electrolyte layer.

Meanwhile, aluminum nitride and boehmite have different specific heat capacities, and the specific heat capacity of aluminum nitride is smaller than the specific heat capacity of boehmite. For this reason, in order to adjust the total heat capacity per unit area to 0.0006 J/Kcm$^2$, the amount of aluminum nitride per unit area was adjusted to be larger than the amounts of boehmite per unit area of Example 2-1 to Example 2-7.

Specifically, the total heat capacity per unit area of the gel electrolyte layer was adjusted to 0.0006 J/Kcm$^2$ (0.00086 [g/cm$^2$]×0.7 [J/gK]), by adjusting the amount of aluminum nitride per unit area to 0.00086 g/cm$^2$. Hereinafter, the coating amount of the heat absorbent particles was adjusted similarly, and thereby the heat capacity per unit area of the gel electrolyte layer was made constant.

<Example 2-15> to <Example 2-21>

Laminate film type batteries were produced in the same manner as in Example 2-1 to Example 2-7, respectively, except that boron nitride (specific heat capacity: 0.8 J/gK) was used as the heat absorbent particles used in the gel electrolyte layer, instead of boehmite.

<Example 2-22> to <Example 2-28>

Laminate film type batteries were produced in the same manner as in Example 2-1 to Example 2-7, respectively, except that silicon carbide (specific heat capacity: 0.7 J/gK) was used as the heat absorbent particles used in the gel electrolyte layer, instead of boehmite.

<Example 2-29> to <Example 2-35>

Laminate film type batteries were produced in the same manner as in Example 2-1 to Example 2-7, respectively, except that talc (specific heat capacity: 1.1 J/gK) was used as the heat absorbent particles used in the gel electrolyte layer, instead of boehmite.

<Example 2-36> to <Example 2-42>

Laminate film type batteries were produced in the same manner as in Example 2-1 to Example 2-7, respectively, except that $Li_2O_4$ (specific heat capacity: 0.8 J/gK) was used as the heat absorbent particles used in the gel electrolyte layer, instead of boehmite.

<Example 2-43> to <Example 2-49>

Laminate film type batteries were produced in the same manner as in Example 2-1 to Example 2-7, respectively, except that $Li_3PO_4$ (specific heat capacity: 0.8 J/gK) was used as the heat absorbent particles used in the gel electrolyte layer, instead of boehmite.

<Example 2-50> to <Example 2-56>

Laminate film type batteries were produced in the same manner as in Example 2-1 to Example 2-7, respectively, except that LiF (specific heat capacity: 0.9 J/gK) was used as the heat absorbent particles used in the gel electrolyte layer, instead of boehmite.

<Example 2-57> to <Example 2-63>

Laminate film type batteries were produced in the same manner as in Example 2-1 to Example 2-7, respectively, except that diamond (specific heat capacity: 0.5 J/gK) was used as the heat absorbent particles used in the gel electrolyte layer, instead of boehmite.

<Example 2-64> to <Example 2-70>

Laminate film type batteries were produced in the same manner as in Example 2-1 to Example 2-7, respectively, except that zirconium oxide (specific heat capacity: 0.7 J/gK) was used as the heat absorbent particles used in the gel electrolyte layer, instead of boehmite.

<Example 2-71> to <Example 2-77>

Laminate film type batteries were produced in the same manner as in Example 2-1 to Example 2-7, respectively, except that yttrium oxide (specific heat capacity: 0.5 J/gK) was used as the heat absorbent particles used in the gel electrolyte layer, instead of boehmite.

<Example 2-78> to <Example 2-84>

Laminate film type batteries were produced in the same manner as in Example 2-1 to Example 2-7, respectively, except that barium titanate (specific heat capacity: 0.8 J/gK) was used as the heat absorbent particles used in the gel electrolyte layer, instead of boehmite.

<Example 2-85> to <Example 2-91>

Laminate film type batteries were produced in the same manner as in Example 2-1 to Example 2-7, respectively, except that strontium titanate (specific heat capacity: 0.8 J/gK) was used as the heat absorbent particles used in the gel electrolyte layer, instead of boehmite.

<Example 2-92> to <Example 2-98>

Laminate film type batteries were produced in the same manner as in Example 2-1 to Example 2-7, respectively, except that silicon oxide (specific heat capacity: 0.8 J/gK) was used as the heat absorbent particles used in the gel electrolyte layer, instead of boehmite.

<Example 2-99> to <Example 2-105>

Laminate film type batteries were produced in the same manner as in Example 2-1 to Example 2-7, respectively, except that zeolite (specific heat capacity: 1.0 J/gK) was used as the heat absorbent particles used in the gel electrolyte layer, instead of boehmite.

<Example 2-106> to <Example 2-112>

Laminate film type batteries were produced in the same manner as in Example 2-1 to Example 2-7, respectively, except that barium sulfate (specific heat capacity: 0.9 J/gK) was used as the heat absorbent particles used in the gel electrolyte layer, instead of boehmite.

<Example 2-113> to <Example 2-119>

Laminate film type batteries were produced in the same manner as in Example 2-1 to Example 2-7, respectively, except that titanium oxide (specific heat capacity: 0.8 J/gK) was used as the heat absorbent particles used in the gel electrolyte layer, instead of boehmite.

<Example 2-120> to <Example 2-126>

Laminate film type batteries were produced in the same manner as in Example 2-1 to Example 2-7, respectively, except that magnesium oxide (specific heat capacity: 1.0 J/gK) was used as the heat absorbent particles used in the gel electrolyte layer, instead of boehmite.

<Example 2-127> to <Example 2-133>

Laminate film type batteries were produced in the same manner as in Example 2-1 to Example 2-7, respectively, except that graphite (specific heat capacity: 0.8 J/gK) was used as the heat absorbent particles used in the gel electrolyte layer, instead of boehmite.

<Example 2-134> to <Example 2-140>

Laminate film type batteries were produced in the same manner as in Example 2-1 to Example 2-7, respectively, except that carbon nanotubes (specific heat capacity: 0.8 J/gK) was used as the heat absorbent particles used in the gel electrolyte layer, instead of boehmite.

<Example 2-141> to <Example 2-147>

Laminate film type batteries were produced in the same manner as in Example 2-1 to Example 2-7, respectively, except that aluminum hydroxide (specific heat capacity: 1.5 J/gK) was used as the heat absorbent particles used in the gel electrolyte layer, instead of boehmite.

<Example 2-148> to <Example 2-154>

Laminate film type batteries were produced in the same manner as in Example 2-1 to Example 2-7, respectively, except that boron carbide (specific heat capacity: 1.0 J/gK) was used as the heat absorbent particles used in the gel electrolyte layer, instead of boehmite.

<Example 2-155> to <Example 2-161>

Laminate film type batteries were produced in the same manner as in Example 2-1 to Example 2-7, respectively, except that silicon nitride (specific heat capacity: 0.7 J/gK) was used as the heat absorbent particles used in the gel electrolyte layer, instead of boehmite.

<Example 2-162> to <Example 2-168>

Laminate film type batteries were produced in the same manner as in Example 2-1 to Example 2-7, respectively, except that titanium nitride (specific heat capacity: 0.6 J/gK) was used as the heat absorbent particles used in the gel electrolyte layer, instead of boehmite.

<Example 2-169> to <Example 2-175>

Laminate film type batteries were produced in the same manner as in Example 2-1 to Example 2-7, respectively, except that zinc oxide (specific heat capacity: 0.5 J/gK) was used as the heat absorbent particles used in the gel electrolyte layer, instead of boehmite.

<Example 2-176> to <Example 2-182>

Laminate film type batteries were produced in the same manner as in Example 2-1 to Example 2-7, respectively, except that aluminum oxide (specific heat capacity: 0.8 J/gK) was used, instead of boehmite, as the heat absorbent particles used in the gel electrolyte layer.

<Example 2-183> to <Example 2-189>

Laminate film type batteries were produced in the same manner as in Example 2-1 to Example 2-7, respectively, except that olivine (specific heat capacity: 0.8 J/gK) was used, instead of boehmite, as the heat absorbent particles used in the gel electrolyte layer.

<Example 2-190> to <Example 2-196>

Laminate film type batteries were produced in the same manner as in Example 2-1 to Example 2-7, respectively, except that montmorillonite (specific heat capacity: 0.7 J/gK) was used, instead of boehmite, as the heat absorbent particles used in the gel electrolyte layer.

<Example 2-197> to <Example 2-203>

Laminate film type batteries were produced in the same manner as in Example 2-1 to Example 2-7, respectively, except that zeolite (specific heat capacity: 0.6 J/gK) was used, instead of boehmite, as the heat absorbent particles used in the gel electrolyte layer.

<Example 2-204> to <Example 2-210>

Laminate film type batteries were produced in the same manner as in Example 2-1 to Example 2-7, respectively, except that mullite (specific heat capacity: 0.8 J/gK) was used, instead of boehmite, as the heat absorbent particles used in the gel electrolyte layer.

<Example 2-211> to <Example 2-217>

Laminate film type batteries were produced in the same manner as in Example 2-1 to Example 2-7, respectively, except that kaolinite (specific heat capacity: 0.7 J/gK) was used, instead of boehmite, as the heat absorbent particles used in the gel electrolyte layer.

<Example 2-218> to <Example 2-224>

Laminate film type batteries were produced in the same manner as in Example 2-1 to Example 2-7, respectively, except that imogolite (specific heat capacity: 0.8 J/gK) was used, instead of boehmite, as the heat absorbent particles used in the gel electrolyte layer.

Comparative Example 2-1

A laminate film type battery of Comparative Example 2-1 was produced in the same manner as in Example 2-1, except that inorganic particles were not incorporated into the precursor solution, and a gel electrolyte layer that did not contain inorganic particles was formed.

[Evaluation of Batteries: Short Circuit Test]

A short circuit test was carried out in the same manner as in Example 1-1 for the laminate film type batteries of various Examples and various Comparative Examples thus produced.

The evaluation results are presented in the following Table 2.

TABLE 2

| | | Heat absorbing layer: Heat capacity per area: 0.0006 J/Kcm$^2$, heat capacity per volume: 0.4 J/Kcm$^3$ | | | |
|---|---|---|---|---|---|
| | Negative electrode active material | Gel electrolyte layer | | Short circuit test | |
| | | Inorganic particles | Resin material | Heat generation temperature | Gas eruption |
| Example 2-1 | Graphite | Boehmite | Polyvinylidene fluoride | 62° C. | No |
| Example 2-2 | | Specific heat capacity: 1.2 J/gK | Polyimide | 63° C. | No |
| Example 2-3 | | | Aramid (polyamide) | 61° C. | No |
| Example 2-4 | | | Polyacrylonitrile | 68° C. | No |
| Example 2-5 | | | Polyvinyl alcohol | 69° C. | No |
| Example 2-6 | | | Polyether | 70° C. | No |
| Example 2-7 | | | Acrylic acid resin | 67° C. | No |
| Example 2-8 | | Aluminum nitride | Polyvinylidene fluoride | 62° C. | No |
| Example 2-9 | | Specific heat capacity: 0.7 J/gK | Polyimide | 63° C. | No |
| Example 2-10 | | | Aramid (polyamide) | 61° C. | No |
| Example 2-11 | | | Polyacrylonitrile | 68° C. | No |

TABLE 2-continued

Heat absorbing layer: Heat capacity per area: 0.0006 J/Kcm², heat capacity per volume: 0.4 J/Kcm³

| | Negative electrode active material | Gel electrolyte layer Inorganic particles | Gel electrolyte layer Resin material | Short circuit test Heat generation temperature | Short circuit test Gas eruption |
|---|---|---|---|---|---|
| Example 2-12 | | | Polyvinyl alcohol | 69° C. | No |
| Example 2-13 | | | Polyether | 70° C. | No |
| Example 2-14 | | | Acrylic acid resin | 67° C. | No |
| Example 2-15 | | Boron nitride | Polyvinylidene fluoride | 69° C. | No |
| Example 2-16 | | Specific heat | Polyimide | 70° C. | No |
| Example 2-17 | | capacity: 0.8 J/gK | Aramid (polyamide) | 68° C. | No |
| Example 2-18 | | | Polyacrylonitrile | 75° C. | No |
| Example 2-19 | | | Polyvinyl alcohol | 76° C. | No |
| Example 2-20 | | | Polyether | 77° C. | No |
| Example 2-21 | | | Acrylic acid resin | 74° C. | No |
| Example 2-22 | | Silicon carbide | Polyvinylidene fluoride | 62° C. | No |
| Example 2-23 | | Specific heat | Polyimide | 63° C. | No |
| Example 2-24 | | capacity: 0.7 J/gK | Aramid (polyamide) | 61° C. | No |
| Example 2-25 | | | Polyacrylonitrile | 68° C. | No |
| Example 2-26 | | | Polyvinyl alcohol | 69° C. | No |
| Example 2-27 | | | Polyether | 70° C. | No |
| Example 2-28 | | | Acrylic acid resin | 67° C. | No |
| Example 2-29 | | Talc | Polyvinylidene fluoride | 62° C. | No |
| Example 2-30 | | Specific heat | Polyimide | 63° C. | No |
| Example 2-31 | | capacity: 1.1 J/gK | Aramid (polyamide) | 61° C. | No |
| Example 2-32 | | | Polyacrylonitrile | 68° C. | No |
| Example 2-33 | | | Polyvinyl alcohol | 69° C. | No |
| Example 2-34 | | | Polyether | 70° C. | No |
| Example 2-35 | | | Acrylic acid resin | 67° C. | No |
| Example 2-36 | | $Li_2O_4$ | Polyvinylidene fluoride | 69° C. | No |
| Example 2-37 | | Specific heat | Polyimide | 70° C. | No |
| Example 2-38 | | capacity: 0.8 J/gK | Aramid (polyamide) | 68° C. | No |
| Example 2-39 | | | Polyacrylonitrile | 75° C. | No |
| Example 2-40 | | | Polyvinyl alcohol | 76° C. | No |
| Example 2-41 | | | Polyether | 77° C. | No |
| Example 2-42 | | | Acrylic acid resin | 74° C. | No |
| Example 2-43 | | $Li_3PO_4$ | Polyvinylidene fluoride | 69° C. | No |
| Example 2-44 | | Specific heat | Polyimide | 70° C. | No |
| Example 2-45 | | capacity: 0.8 J/gK | Aramid (polyamide) | 68° C. | No |
| Example 2-46 | | | Polyacrylonitrile | 75° C. | No |
| Example 2-47 | | | Polyvinyl alcohol | 76° C. | No |
| Example 2-48 | | | Polyether | 77° C. | No |
| Example 2-49 | | | Acrylic acid resin | 74° C. | No |
| Example 2-50 | Graphite | LiF | Polyvinylidene fluoride | 69° C. | No |
| Example 2-51 | | Specific heat | Polyimide | 70° C. | No |
| Example 2-52 | | capacity: 0.9 J/gK | Aramid (polyamide) | 68° C. | No |
| Example 2-53 | | | Polyacrylonitrile | 75° C. | No |
| Example 2-54 | | | Polyvinyl alcohol | 76° C. | No |
| Example 2-55 | | | Polyether | 77° C. | No |
| Example 2-56 | | | Acrylic acid resin | 74° C. | No |
| Example 2-57 | | Diamond | Polyvinylidene fluoride | 69° C. | No |
| Example 2-58 | | Specific heat | Polyimide | 70° C. | No |
| Example 2-59 | | capacity: 0.5 J/gK | Aramid (polyamide) | 68° C. | No |
| Example 2-60 | | | Polyacrylonitrile | 75° C. | No |
| Example 2-61 | | | Polyvinyl alcohol | 76° C. | No |
| Example 2-62 | | | Polyether | 77° C. | No |
| Example 2-63 | | | Acrylic acid resin | 74° C. | No |
| Example 2-64 | | Zirconium oxide | Polyvinylidene fluoride | 61° C. | No |
| Example 2-65 | | Specific heat | Polyimide | 62° C. | No |
| Example 2-66 | | capacity: 0.7 J/gK | Aramid (polyamide) | 60° C. | No |
| Example 2-67 | | | Polyacrylonitrile | 67° C. | No |
| Example 2-68 | | | Polyvinyl alcohol | 68° C. | No |
| Example 2-69 | | | Polyether | 69° C. | No |
| Example 2-70 | | | Acrylic acid resin | 66° C. | No |
| Example 2-71 | | Yttrium oxide | Polyvinylidene fluoride | 68° C. | No |
| Example 2-72 | | Specific heat | Polyimide | 69° C. | No |
| Example 2-73 | | capacity: 0.5 J/gK | Aramid (polyamide) | 67° C. | No |
| Example 2-74 | | | Polyacrylonitrile | 74° C. | No |
| Example 2-75 | | | Polyvinyl alcohol | 75° C. | No |
| Example 2-76 | | | Polyether | 76° C. | No |
| Example 2-77 | | | Acrylic acid resin | 73° C. | No |
| Example 2-78 | | Barium titanate | Polyvinylidene fluoride | 63° C. | No |
| Example 2-79 | | Specific heat | Polyimide | 64° C. | No |
| Example 2-80 | | capacity: 0.8 J/gK | Aramid (polyamide) | 62° C. | No |
| Example 2-81 | | | Polyacrylonitrile | 69° C. | No |

TABLE 2-continued

Heat absorbing layer: Heat capacity per area: 0.0006 J/Kcm², heat capacity per volume: 0.4 J/Kcm³

| | Negative electrode active material | Gel electrolyte layer | | Short circuit test | |
|---|---|---|---|---|---|
| | | Inorganic particles | Resin material | Heat generation temperature | Gas eruption |
| Example 2-82 | | | Polyvinyl alcohol | 70° C. | No |
| Example 2-83 | | | Polyether | 71° C. | No |
| Example 2-84 | | | Acrylic acid resin | 68° C. | No |
| Example 2-85 | | Strontium titanate | Polyvinylidene fluoride | 68° C. | No |
| Example 2-86 | | Specific heat | Polyimide | 69° C. | No |
| Example 2-87 | | capacity: 0.8 J/gK | Aramid (polyamide) | 67° C. | No |
| Example 2-88 | | | Polyacrylonitrile | 74° C. | No |
| Example 2-89 | | | Polyvinyl alcohol | 75° C. | No |
| Example 2-90 | | | Polyether | 76° C. | No |
| Example 2-91 | | | Acrylic acid resin | 73° C. | No |
| Example 2-92 | | Silicon oxide | Polyvinylidene fluoride | 63° C. | No |
| Example 2-93 | | Specific heat | Polyimide | 64° C. | No |
| Example 2-94 | | capacity: 0.8 J/gK | Aramid (polyamide) | 62° C. | No |
| Example 2-95 | | | Polyacrylonitrile | 69° C. | No |
| Example 2-96 | | | Polyvinyl alcohol | 70° C. | No |
| Example 2-97 | | | Polyether | 71° C. | No |
| Example 2-98 | | | Acrylic acid resin | 68° C. | No |
| Example 2-99 | Graphite | Zeolite | Polyvinylidene fluoride | 69° C. | No |
| Example 2-100 | | Specific heat | Polyimide | 70° C. | No |
| Example 2-101 | | capacity: 1.0 J/gK | Aramid (polyamide) | 68° C. | No |
| Example 2-102 | | | Polyacrylonitrile | 75° C. | No |
| Example 2-103 | | | Polyvinyl alcohol | 76° C. | No |
| Example 2-104 | | | Polyether | 77° C. | No |
| Example 2-105 | | | Acrylic acid resin | 74° C. | No |
| Example 2-106 | | Barium sulfate | Polyvinylidene fluoride | 69° C. | No |
| Example 2-107 | | Specific heat | Polyimide | 70° C. | No |
| Example 2-108 | | capacity: 0.9 J/gK | Aramid (polyamide) | 68° C. | No |
| Example 2-109 | | | Polyacrylonitrile | 75° C. | No |
| Example 2-110 | | | Polyvinyl alcohol | 76° C. | No |
| Example 2-111 | | | Polyether | 77° C. | No |
| Example 2-112 | | | Acrylic acid resin | 74° C. | No |
| Example 2-113 | | Titanium oxide | Polyvinylidene fluoride | 62° C. | No |
| Example 2-114 | | Specific heat | Polyimide | 63° C. | No |
| Example 2-115 | | capacity: 0.8 J/gK | Aramid (polyamide) | 61° C. | No |
| Example 2-116 | | | Polyacrylonitrile | 68° C. | No |
| Example 2-117 | | | Polyvinyl alcohol | 69° C. | No |
| Example 2-118 | | | Polyether | 70° C. | No |
| Example 2-119 | | | Acrylic acid resin | 67° C. | No |
| Example 2-120 | | Magnesium oxide | Polyvinylidene fluoride | 62° C. | No |
| Example 2-121 | | Specific heat | Polyimide | 63° C. | No |
| Example 2-122 | | capacity: 1.0 J/gK | Aramid (polyamide) | 61° C. | No |
| Example 2-123 | | | Polyacrylonitrile | 68° C. | No |
| Example 2-124 | | | Polyvinyl alcohol | 69° C. | No |
| Example 2-125 | | | Polyether | 70° C. | No |
| Example 2-126 | | | Acrylic acid resin | 67° C. | No |
| Example 2-127 | | Graphite | Polyvinylidene fluoride | 69° C. | No |
| Example 2-128 | | Specific heat | Polyimide | 70° C. | No |
| Example 2-129 | | capacity: 0.8 J/gK | Aramid (polyamide) | 68° C. | No |
| Example 2-130 | | | Polyacrylonitrile | 75° C. | No |
| Example 2-131 | | | Polyvinyl alcohol | 76° C. | No |
| Example 2-132 | | | Polyether | 77° C. | No |
| Example 2-133 | | | Acrylic acid resin | 74° C. | No |
| Example 2-134 | | Carbon nanotubes | Polyvinylidene fluoride | 69° C. | No |
| Example 2-135 | | Specific heat | Polyimide | 70° C. | No |
| Example 2-136 | | capacity: 0.8 J/gK | Aramid (polyamide) | 68° C. | No |
| Example 2-137 | | | Polyacrylonitrile | 75° C. | No |
| Example 2-138 | | | Polyvinyl alcohol | 76° C. | No |
| Example 2-139 | | | Polyether | 77° C. | No |
| Example 2-140 | | | Acrylic acid resin | 74° C. | No |
| Example 2-141 | | Aluminum hydroxide | Polyvinylidene fluoride | 69° C. | No |
| Example 2-142 | | Specific heat | Polyimide | 70° C. | No |
| Example 2-143 | | capacity: 1.5 J/gK | Aramid (polyamide) | 68° C. | No |
| Example 2-144 | | | Polyacrylonitrile | 75° C. | No |
| Example 2-145 | | | Polyvinyl alcohol | 76° C. | No |
| Example 2-146 | | | Polyether | 77° C. | No |
| Example 2-147 | | | Acrylic acid resin | 74° C. | No |
| Example 2-148 | Graphite | Boron carbide | Polyvinylidene fluoride | 69° C. | No |
| Example 2-149 | | Specific heat | Polyimide | 70° C. | No |
| Example 2-150 | | capacity: 1.0 J/gK | Aramid (polyamide) | 68° C. | No |
| Example 2-151 | | | Polyacrylonitrile | 75° C. | No |

TABLE 2-continued

Heat absorbing layer: Heat capacity per area: 0.0006 J/Kcm², heat capacity per volume: 0.4 J/Kcm³

| | Negative electrode active material | Gel electrolyte layer | | Short circuit test | |
|---|---|---|---|---|---|
| | | Inorganic particles | Resin material | Heat generation temperature | Gas eruption |
| Example 2-152 | | | Polyvinyl alcohol | 76° C. | No |
| Example 2-153 | | | Polyether | 77° C. | No |
| Example 2-154 | | | Acrylic acid resin | 74° C. | No |
| Example 2-155 | | Silicon nitride | Polyvinylidene fluoride | 69° C. | No |
| Example 2-156 | | Specific heat | Polyimide | 70° C. | No |
| Example 2-157 | | capacity: 0.7 J/gK | Aramid (polyamide) | 68° C. | No |
| Example 2-158 | | | Polyacrylonitrile | 75° C. | No |
| Example 2-159 | | | Polyvinyl alcohol | 76° C. | No |
| Example 2-160 | | | Polyether | 77° C. | No |
| Example 2-161 | | | Acrylic acid resin | 74° C. | No |
| Example 2-162 | | Titanium nitride | Polyvinylidene fluoride | 69° C. | No |
| Example 2-163 | | Specific heat | Polyimide | 70° C. | No |
| Example 2-164 | | capacity: 0.6 J/gK | Aramid (polyamide) | 68° C. | No |
| Example 2-165 | | | Polyacrylonitrile | 75° C. | No |
| Example 2-166 | | | Polyvinyl alcohol | 76° C. | No |
| Example 2-167 | | | Polyether | 77° C. | No |
| Example 2-168 | | | Acrylic acid resin | 74° C. | No |
| Example 2-169 | | Zinc oxide | Polyvinylidene fluoride | 69° C. | No |
| Example 2-170 | | Specific heat | Polyimide | 70° C. | No |
| Example 2-171 | | capacity: 0.5 J/gK | Aramid (polyamide) | 68° C. | No |
| Example 2-172 | | | Polyacrylonitrile | 75° C. | No |
| Example 2-173 | | | Polyvinyl alcohol | 76° C. | No |
| Example 2-174 | | | Polyether | 77° C. | No |
| Example 2-175 | | | Acrylic acid resin | 74° C. | No |
| Example 2-176 | | Aluminum oxide | Polyvinylidene fluoride | 69° C. | No |
| Example 2-177 | | Specific heat | Polyimide | 70° C. | No |
| Example 2-178 | | capacity; 0.8 J/gK | Aramid (polyamide) | 68° C. | No |
| Example 2-179 | | | Polyacrylonitrile | 75° C. | No |
| Example 2-180 | | | Polyvinyl alcohol | 76° C. | No |
| Example 2-181 | | | Polyether | 77° C. | No |
| Example 2-182 | | | Acrylic acid resin | 74° C. | No |
| Example 2-183 | Graphite | Olivine | Polyvinylidene fluoride | 62° C. | No |
| Example 2-184 | | Specific heat | Polyimide | 63° C. | No |
| Example 2-185 | | capacity: 0.8 J/gK | Aramid (polyamide) | 61° C. | No |
| Example 2-186 | | | Polyacrylonitrile | 68° C. | No |
| Example 2-187 | | | Polyvinyl alcohol | 69° C. | No |
| Example 2-188 | | | Polyether | 70° C. | No |
| Example 2-189 | | | Acrylic acid resin | 67° C. | No |
| Example 2-190 | | Montmorillonite | Polyvinylidene fluoride | 62° C. | No |
| Example 2-191 | | Specific heat | Polyimide | 63° C. | No |
| Example 2-192 | | capacity: 0.7 J/gK | Aramid (polyamide) | 61° C. | No |
| Example 2-193 | | | Polyacrylonitrile | 68° C. | No |
| Example 2-194 | | | Polyvinyl alcohol | 69° C. | No |
| Example 2-195 | | | Polyether | 70° C. | No |
| Example 2-196 | | | Acrylic acid resin | 67° C. | No |
| Example 2-197 | | Zeolite | Polyvinylidene fluoride | 62° C. | No |
| Example 2-198 | | Specific heat | Polyimide | 63° C. | No |
| Example 2-199 | | capacity: 0.6 J/gK | Aramid (polyamide) | 61° C. | No |
| Example 2-200 | | | Polyacrylonitrile | 68° C. | No |
| Example 2-201 | | | Polyvinyl alcohol | 69° C. | No |
| Example 2-202 | | | Polyether | 70° C. | No |
| Example 2-203 | | | Acrylic acid resin | 67° C. | No |
| Example 2-204 | | Mullite | Polyvinylidene fluoride | 62° C. | No |
| Example 2-205 | | Specific heat | Polyimide | 63° C. | No |
| Example 2-206 | | capacity: 0.8 J/gK | Aramid (polyamide) | 61° C. | No |
| Example 2-207 | | | Polyacrylonitrile | 68° C. | No |
| Example 2-208 | | | Polyvinyl alcohol | 69° C. | No |
| Example 2-209 | | | Polyether | 70° C. | No |
| Example 2-210 | | | Acrylic acid resin | 67° C. | No |
| Example 2-211 | | Kaolinite | Polyvinylidene fluoride | 62° C. | No |
| Example 2-212 | | Specific heat | Polyimide | 63° C. | No |
| Example 2-213 | | capacity: 0.7 J/gK | Aramid (polyamide) | 61° C. | No |
| Example 2-214 | | | Polyacrylonitrile | 68° C. | No |
| Example 2-215 | | | Polyvinyl alcohol | 69° C. | No |
| Example 2-216 | | | Polyether | 70° C. | No |
| Example 2-217 | | | Acrylic acid resin | 67° C. | No |
| Example 2-218 | | Imogolite | Polyvinylidene fluoride | 62° C. | No |
| Example 2-219 | | Specific heat | Polyimide | 63° C. | No |
| Example 2-220 | | capacity: 0.8 J/gK | Aramid (polyamide) | 61° C. | No |
| Example 2-221 | | | Polyacrylonitrile | 68° C. | No |

TABLE 2-continued

| | Negative electrode active material | Gel electrolyte layer | | Short circuit test | |
|---|---|---|---|---|---|
| | | | | Heat generation | |
| | | Inorganic particles | Resin material | temperature | Gas eruption |

Heat absorbing layer: Heat capacity per area: 0.0006 J/Kcm², heat capacity per volume: 0.4 J/Kcm³

| | Negative electrode active material | Inorganic particles | Resin material | temperature | Gas eruption |
|---|---|---|---|---|---|
| Example 2-222 | | | Polyvinyl alcohol | 69° C. | No |
| Example 2-223 | | | Polyether | 70° C. | No |
| Example 2-224 | | | Acrylic acid resin | 67° C. | No |
| Comparative Example 2-1 | Graphite | — | Polyvinylidene fluoride | 500° C. | Yes |

As can be seen from Table 2, the laminate film type batteries of the various Examples that were produced so as to have a total heat capacity per unit area of the gel electrolyte layer of 0.0006 J/Kcm² and a total heat capacity per unit volume of 0.4 J/Kcm³, had a low heat generation temperature in the short circuit test, such as 80° C. or lower, and were highly safe.

<Example 3-1> to <Example 3-224> and <Comparative Example 3-1

Laminate film type batteries of Example 3-1 to Example 3-224 and Comparative Example 3-1 were produced in the same manner as in Example 2-1 to Example 2-224 and Comparative Example 2-1, respectively, except that silicon similar to that of Example 1-13 was used as the negative electrode active material, instead of graphite. Meanwhile, the negative electrode mix slurry that formed the negative electrode active material layer was produced to have a composition similar to that of Example 1-13.

[Evaluation of Batteries: Short Circuit Test]

For the laminate film type batteries of various Examples and various Comparative Examples thus produced, a short circuit test was carried out in the same manner as in Example 1-1.

The evaluation results are presented in the following Table 3.

TABLE 3

Heat absorbing layer: Heat capacity per area: 0.0006 J/Kcm², heat capacity per volume: 0.4 J/Kcm³

| | Negative electrode active material | Gel electrolyte layer | | Short circuit test | |
|---|---|---|---|---|---|
| | | Inorganic particles | Resin material | Heat generation temperature | Gas eruption |
| Example 3-1 | Silicon | Boehmite | Polyvinylidene fluoride | 72° C. | No |
| Example 3-2 | | Specific heat capacity: 1.2 J/gK | Polyimide | 73° C. | No |
| Example 3-3 | | | Aramid (polyamide) | 71° C. | No |
| Example 3-4 | | | Polyacrylonitrile | 78° C. | No |
| Example 3-5 | | | Polyvinyl alcohol | 79° C. | No |
| Example 3-6 | | | Polyether | 80° C. | No |
| Example 3-7 | | | Acrylic acid resin | 77° C. | No |
| Example 3-8 | | Aluminum nitride | Polyvinylidene fluoride | 72° C. | No |
| Example 3-9 | | Specific heat capacity: 0.7 J/gK | Polyimide | 73° C. | No |
| Example 3-10 | | | Aramid (polyamide) | 71° C. | No |
| Example 3-11 | | | Polyacrylonitrile | 78° C. | No |
| Example 3-12 | | | Polyvinyl alcohol | 79° C. | No |
| Example 3-13 | | | Polyether | 80° C. | No |
| Example 3-14 | | | Acrylic acid resin | 77° C. | No |
| Example 3-15 | | Boron nitride | Polyvinylidene fluoride | 79° C. | No |
| Example 3-16 | | Specific heat capacity: 0.8 J/gK | Polyimide | 80° C. | No |
| Example 3-17 | | | Aramid (polyamide) | 78° C. | No |
| Example 3-18 | | | Polyacrylonitrile | 85° C. | No |
| Example 3-19 | | | Polyvinyl alcohol | 86° C. | No |
| Example 3-20 | | | Polyether | 87° C. | No |
| Example 3-21 | | | Acrylic acid resin | 84° C. | No |
| Example 3-22 | | Silicon carbide | Polyvinylidene fluoride | 72° C. | No |
| Example 3-23 | | Specific heat capacity: 0.7 J/gK | Polyimide | 73° C. | No |
| Example 3-24 | | | Aramid (polyamide) | 71° C. | No |
| Example 3-25 | | | Polyacrylonitrile | 78° C. | No |
| Example 3-26 | | | Polyvinyl alcohol | 79° C. | No |
| Example 3-27 | | | Polyether | 80° C. | No |
| Example 3-28 | | | Acrylic acid resin | 77° C. | No |
| Example 3-29 | | Talc | Polyvinylidene fluoride | 72° C. | No |
| Example 3-30 | | Specific heat capacity: 1.1 J/gK | Polyimide | 73° C. | No |
| Example 3-31 | | | Aramid (polyamide) | 71° C. | No |
| Example 3-32 | | | Polyacrylonitrile | 78° C. | No |
| Example 3-33 | | | Polyvinyl alcohol | 79° C. | No |

TABLE 3-continued

Heat absorbing layer: Heat capacity per area: 0.0006 J/Kcm$^2$, heat capacity per volume: 0.4 J/Kcm$^3$

| | Negative electrode active material | Gel electrolyte layer Inorganic particles | Resin material | Short circuit test Heat generation temperature | Gas eruption |
|---|---|---|---|---|---|
| Example 3-34 | | | Polyether | 80° C. | No |
| Example 3-35 | | | Acrylic acid resin | 77° C. | No |
| Example 3-36 | | Li$_2$O$_4$ | Polyvinylidene fluoride | 79° C. | No |
| Example 3-37 | | Specific heat | Polyimide | 80° C. | No |
| Example 3-38 | | capacity: 0.8 J/gK | Aramid (polyamide) | 78° C. | No |
| Example 3-39 | | | Polyacrylonitrile | 85° C. | No |
| Example 3-40 | | | Polyvinyl alcohol | 86° C. | No |
| Example 3-41 | | | Polyether | 87° C. | No |
| Example 3-42 | | | Acrylic acid resin | 84° C. | No |
| Example 3-43 | | Li$_3$PO$_4$ | Polyvinylidene fluoride | 79° C. | No |
| Example 3-44 | | Specific heat | Polyimide | 80° C. | No |
| Example 3-45 | | capacity: 0.8 J/gK | Aramid (polyamide) | 78° C. | No |
| Example 3-46 | | | Polyacrylonitrile | 85° C. | No |
| Example 347 | | | Polyvinyl alcohol | 86° C. | No |
| Example 3-48 | | | Polyether | 87° C. | No |
| Example 3-49 | | | Acrylic acid resin | 84° C. | No |
| Example 3-50 | Silicon | LiF | Polyvinylidene fluoride | 79° C. | No |
| Example 3-51 | | Specific heat | Polyimide | 80° C. | No |
| Example 3-52 | | capacity: 0.9 J/gK | Aramid (polyamide) | 78° C. | No |
| Example 3-53 | | | Polyacrylonitrile | 85° C. | No |
| Example 3-54 | | | Polyvinyl alcohol | 86° C. | No |
| Example 3-55 | | | Polyether | 87° C. | No |
| Example 3-56 | | | Acrylic acid resin | 84° C. | No |
| Example 3-57 | | Diamond | Polyvinylidene fluoride | 79° C. | No |
| Example 3-58 | | Specific heat | Polyimide | 80° C. | No |
| Example 3-59 | | capacity: 0.5 J/gK | Aramid (polyamide) | 78° C. | No |
| Example 3-60 | | | Polyacrylonitrile | 85° C. | No |
| Example 3-61 | | | Polyvinyl alcohol | 86° C. | No |
| Example 3-62 | | | Polyether | 87° C. | No |
| Example 3-63 | | | Acrylic acid resin | 84° C. | No |
| Example 3-64 | | Zirconium oxide | Polyvinylidene fluoride | 71° C. | No |
| Example 3-65 | | Specific heat | Polyimide | 72° C. | No |
| Example 3-66 | | capacity: 0.7 J/gK | Aramid (polyamide) | 70° C. | No |
| Example 3-67 | | | Polyacrylonitrile | 77° C. | No |
| Example 3-68 | | | Polyvinyl alcohol | 78° C. | No |
| Example 3-69 | | | Polyether | 79° C. | No |
| Example 3-70 | | | Acrylic acid resin | 76° C. | No |
| Example 3-71 | | Yttrium oxide | Polyvinylidene fluoride | 78° C. | No |
| Example 3-72 | | Specific heat | Polyimide | 79° C. | No |
| Example 3-73 | | capacity: 0.5 J/gK | Aramid (polyamide) | 77° C. | No |
| Example 3-74 | | | Polyacrylonitrile | 84° C. | No |
| Example 3-75 | | | Polyvinyl alcohol | 85° C. | No |
| Example 3-76 | | | Polyether | 86° C. | No |
| Example 3-77 | | | Acrylic acid resin | 83° C. | No |
| Example 3-78 | | Barium titanate | Polyvinylidene fluoride | 73° C. | No |
| Example 3-79 | | Specific heat | Polyimide | 74° C. | No |
| Example 3-80 | | capacity: 0.8 J/gK | Aramid (polyamide) | 72° C. | No |
| Example 3-81 | | | Polyacrylonitrile | 79° C. | No |
| Example 3-82 | | | Polyvinyl alcohol | 80° C. | No |
| Example 3-83 | | | Polyether | 81° C. | No |
| Example 3-84 | | | Acrylic acid resin | 78° C. | No |
| Example 3-85 | | Strontium titanate | Polyvinylidene fluoride | 78° C. | No |
| Example 3-86 | | Specific heat | Polyimide | 79° C. | No |
| Example 3-87 | | capacity: 0.8 J/gK | Aramid (polyamide) | 77° C. | No |
| Example 3-88 | | | Polyacrylonitrile | 84° C. | No |
| Example 3-89 | | | Polyvinyl alcohol | 85° C. | No |
| Example 3-90 | | | Polyether | 86° C. | No |
| Example 3-91 | | | Acrylic acid resin | 83° C. | No |
| Example 3-92 | | Silicon oxide | Polyvinylidene fluoride | 73° C. | No |
| Example 3-93 | | Specific heat | Polyimide | 74° C. | No |
| Example 3-94 | | capacity: 0.8 J/gK | Aramid (polyamide) | 72° C. | No |
| Example 3-95 | | | Polyacrylonitrile | 79° C. | No |
| Example 3-96 | | | Polyvinyl alcohol | 80° C. | No |
| Example 3-97 | | | Polyether | 81° C. | No |
| Example 3-98 | | | Acrylic acid resin | 78° C. | No |
| Example 3-99 | Silicon | Zeolite | Polyvinylidene fluoride | 79° C. | No |
| Example 3-100 | | Specific heat | Polyimide | 80° C. | No |
| Example 3-101 | | capacity: 1.0 J/gK | Aramid (polyamide) | 78° C. | No |
| Example 3-102 | | | Polyacrylonitrile | 85° C. | No |
| Example 3-103 | | | Polyvinyl alcohol | 86° C. | No |
| Example 3-104 | | | Polyether | 87° C. | No |

TABLE 3-continued

Heat absorbing layer: Heat capacity per area: 0.0006 J/Kcm², heat capacity per volume: 0.4 J/Kcm³

| | Negative electrode active material | Gel electrolyte layer Inorganic particles | Resin material | Short circuit test Heat generation temperature | Gas eruption |
|---|---|---|---|---|---|
| Example 3-105 | | | Acrylic acid resin | 84° C. | No |
| Example 3-106 | | Barium sulfate | Polyvinylidene fluoride | 79° C. | No |
| Example 3-107 | | Specific heat | Polyimide | 80° C. | No |
| Example 3-108 | | capacity: 0.9 J/gK | Aramid (polyamide) | 78° C. | No |
| Example 3-109 | | | Polyacrylonitrile | 85° C. | No |
| Example 3-110 | | | Polyvinyl alcohol | 86° C. | No |
| Example 3-111 | | | Polyether | 87° C. | No |
| Example 3-112 | | | Acrylic acid resin | 84° C. | No |
| Example 3-113 | | Titanium oxide | Polyvinylidene fluoride | 72° C. | No |
| Example 3-114 | | Specific heat | Polyimide | 73° C. | No |
| Example 3-115 | | capacity: 0.8 J/gK | Aramid (polyamide) | 71° C. | No |
| Example 3-116 | | | Polyacrylonitrile | 78° C. | No |
| Example 3-117 | | | Polyvinyl alcohol | 79° C. | No |
| Example 3-118 | | | Polyether | 80° C. | No |
| Example 3-119 | | | Acrylic acid resin | 77° C. | No |
| Example 3-120 | | Magnesium oxide | Polyvinylidene fluoride | 72° C. | No |
| Example 3-121 | | Specific heat | Polyimide | 73° C. | No |
| Example 3-122 | | capacity: 1.0 J/gK | Aramid (polyamide) | 71° C. | No |
| Example 3-123 | | | Polyacrylonitrile | 78° C. | No |
| Example 3-124 | | | Polyvinyl alcohol | 79° C. | No |
| Example 3-125 | | | Polyether | 80° C. | No |
| Example 3-126 | | | Acrylic acid resin | 77° C. | No |
| Example 3-127 | | Graphite | Polyvinylidene fluoride | 79° C. | No |
| Example 3-128 | | Specific heat | Polyimide | 80° C. | No |
| Example 3-129 | | capacity: 0.8 J/gK | Aramid (polyamide) | 78° C. | No |
| Example 3-130 | | | Polyacrylonitrile | 85° C. | No |
| Example 3-131 | | | Polyvinyl alcohol | 86° C. | No |
| Example 3-132 | | | Polyether | 87° C. | No |
| Example 3-133 | | | Acrylic acid resin | 84° C. | No |
| Example 3-134 | | Carbon nanotubes | Polyvinylidene fluoride | 79° C. | No |
| Example 3-135 | | Specific heat | Polyimide | 80° C. | No |
| Example 3-136 | | capacity: 0.8 J/gK | Aramid (polyamide) | 78° C. | No |
| Example 3-137 | | | Polyacrylonitrile | 85° C. | No |
| Example 3-138 | | | Polyvinyl alcohol | 86° C. | No |
| Example 3-139 | | | Polyether | 87° C. | No |
| Example 3-140 | | | Acrylic acid resin | 84° C. | No |
| Example 3-141 | | Aluminum hydroxide | Polyvinylidene fluoride | 79° C. | No |
| Example 3-142 | | | Polyimide | 80° C. | No |
| Example 3-143 | | Specific heat | Aramid (polyamide) | 78° C. | No |
| Example 3-144 | | capacity: 1.5 J/gK | Polyacrylonitrile | 85° C. | No |
| Example 3-145 | | | Polyvinyl alcohol | 86° C. | No |
| Example 3-146 | | | Polyether | 87° C. | No |
| Example 3-147 | | | Acrylic acid resin | 84° C. | No |
| Example 3-148 | Silicon | Boron carbide | Polyvinylidene fluoride | 79° C. | No |
| Example 3-149 | | Specific heat | Polyimide | 80° C. | No |
| Example 3-150 | | capacity: 1.0 J/gK | Aramid (polyamide) | 78° C. | No |
| Example 3-151 | | | Polyacrylonitrile | 85° C. | No |
| Example 3-152 | | | Polyvinyl alcohol | 86° C. | No |
| Example 3-153 | | | Polyether | 87° C. | No |
| Example 3-154 | | | Acrylic acid resin | 84° C. | No |
| Example 3-155 | | Silicon nitride | Polyvinylidene fluoride | 79° C. | No |
| Example 3-156 | | Specific heat | Polyimide | 80° C. | No |
| Example 3-157 | | capacity: 0.7 J/gK | Aramid (polyamide) | 78° C. | No |
| Example 3-158 | | | Polyacrylonitrile | 85° C. | No |
| Example 3-159 | | | Polyvinyl alcohol | 86° C. | No |
| Example 3-160 | | | Polyether | 87° C. | No |
| Example 3-161 | | | Acrylic acid resin | 84° C. | No |
| Example 3-162 | | Titanium nitride | Polyvinylidene fluoride | 79° C. | No |
| Example 3-163 | | Specific heat | Polyimide | 80° C. | No |
| Example 3-164 | | capacity: 0.6 J/gK | Aramid (polyamide) | 78° C. | No |
| Example 3-165 | | | Polyacrylonitrile | 85° C. | No |
| Example 3-166 | | | Polyvinyl alcohol | 86° C. | No |
| Example 3-167 | | | Polyether | 87° C. | No |
| Example 3-168 | | | Acrylic acid resin | 84° C. | No |
| Example 3-169 | | Zinc oxide | Polyvinylidene fluoride | 79° C. | No |
| Example 3-170 | | Specific heat | Polyimide | 80° C. | No |
| Example 3-171 | | capacity: 0.5 J/gK | Aramid (polyamide) | 78° C. | No |
| Example 3-172 | | | Polyacrylonitrile | 85° C. | No |
| Example 3-173 | | | Polyvinyl alcohol | 86° C. | No |
| Example 3-174 | | | Polyether | 87° C. | No |
| Example 3-175 | | | Acrylic acid resin | 84° C. | No |

TABLE 3-continued

Heat absorbing layer: Heat capacity per area: 0.0006 J/Kcm², heat capacity per volume: 0.4 J/Kcm³

| | Negative electrode active material | Gel electrolyte layer | | Short circuit test | |
|---|---|---|---|---|---|
| | | Inorganic particles | Resin material | Heat generation temperature | Gas eruption |
| Example 3-176 | | Aluminum oxide | Polyvinylidene fluoride | 79° C. | No |
| Example 3-177 | | Specific heat | Polyimide | 80° C. | No |
| Example 3-178 | | capacity; 0.8 J/gK | Aramid (polyamide) | 78° C. | No |
| Example 3-179 | | | Polyacrylonitrile | 85° C. | No |
| Example 3-180 | | | Polyvinyl alcohol | 86° C. | No |
| Example 3-181 | | | Polyether | 87° C. | No |
| Example 3-182 | | | Acrylic acid resin | 84° C. | No |
| Example 3-183 | Silicon | Olivine | Polyvinylidene fluoride | 72° C. | No |
| Example 3-184 | | Specific heat | Polyimide | 73° C. | No |
| Example 3-185 | | capacity: 0.8 J/gK | Aramid (polyamide) | 71° C. | No |
| Example 3-186 | | | Polyacrylonitrile | 78° C. | No |
| Example 3-187 | | | Polyvinyl alcohol | 79° C. | No |
| Example 3-188 | | | Polyether | 80° C. | No |
| Example 3-189 | | | Acrylic acid resin | 77° C. | No |
| Example 3-190 | | Montmorillonite | Polyvinylidene fluoride | 72° C. | No |
| Example 3-191 | | Specific heat | Polyimide | 73° C. | No |
| Example 3-192 | | capacity: 0.7 J/gK | Aramid (polyamide) | 71° C. | No |
| Example 3-193 | | | Polyacrylonitrile | 78° C. | No |
| Example 3-194 | | | Polyvinyl alcohol | 79° C. | No |
| Example 3-195 | | | Polyether | 80° C. | No |
| Example 3-196 | | | Acrylic acid resin | 77° C. | No |
| Example 3-197 | | Zeolite | Polyvinylidene fluoride | 72° C. | No |
| Example 3-198 | | Specific heat | Polyimide | 73° C. | No |
| Example 3-199 | | capacity: 0.6 J/gK | Aramid (polyamide) | 71° C. | No |
| Example 3-200 | | | Polyacrylonitrile | 78° C. | No |
| Example 3-201 | | | Polyvinyl alcohol | 79° C. | No |
| Example 3-202 | | | Polyether | 80° C. | No |
| Example 3-203 | | | Acrylic acid resin | 77° C. | No |
| Example 3-204 | | Mullite | Polyvinylidene fluoride | 72° C. | No |
| Example 3-205 | | Specific heat | Polyimide | 73° C. | No |
| Example 3-206 | | capacity: 0.8 J/gK | Aramid (polyamide) | 71° C. | No |
| Example 3-207 | | | Polyacrylonitrile | 78° C. | No |
| Example 3-208 | | | Polyvinyl alcohol | 79° C. | No |
| Example 3-209 | | | Polyether | 80° C. | No |
| Example 3-210 | | | Acrylic acid resin | 77° C. | No |
| Example 3-211 | | Kaolinite | Polyvinylidene fluoride | 72° C. | No |
| Example 3-212 | | Specific heat | Polyimide | 73° C. | No |
| Example 3-213 | | capacity: 0.7 J/gK | Aramid (polyamide) | 71° C. | No |
| Example 3-214 | | | Polyacrylonitrile | 78° C. | No |
| Example 3-215 | | | Polyvinyl alcohol | 79° C. | No |
| Example 3-216 | | | Polyether | 80° C. | No |
| Example 3-217 | | | Acrylic acid resin | 77° C. | No |
| Example 3-218 | | Imogolite | Polyvinylidene fluoride | 72° C. | No |
| Example 3-219 | | Specific heat | Polyimide | 73° C. | No |
| Example 3-220 | | capacity: 0.8 J/gK | Aramid (polyamide) | 71° C. | No |
| Example 3-221 | | | Polyacrylonitrile | 78° C. | No |
| Example 3-222 | | | Polyvinyl alcohol | 79° C. | No |
| Example 3-223 | | | Polyether | 80° C. | No |
| Example 3-224 | | | Acrylic acid resin | 77° C. | No |
| Comparative Example 3-1 | Carbon-tin composite material | — | Polyvinylidene fluoride | 500° C. | Yes |

As can be seen from Table 3, in the laminate film type batteries of the various Examples that were produced so as to have a total heat capacity per unit area of the gel electrolyte layer of 0.0006 J/Kcm² and the total heat capacity per unit volume of 0.4 J/Kcm³, the following could be confirmed. That is, even in a case in which silicon was used as the negative electrode active material, the batteries were highly safe.

<Example 4-1> to <Example 4-224> and <Comparative Example 4-1

Laminate film type batteries of Example 4-1 to Example 4-224 and Comparative Example 4-1 were produced in the same manner as in Example 2-1 to Example 2-224 and Comparative Example 2-1, respectively, except that a carbon-tin composite material similar to that of Example 1-25 was used as the negative electrode active material, instead of graphite. Meanwhile, the negative electrode mix slurry that formed the negative electrode active material layer was produced to have a composition similar to that of Example 1-25.

[Evaluation of Batteries: Short Circuit Test]

For the laminate film type batteries of various Examples and various Comparative Examples thus produced, a short circuit test was carried out in the same manner as in Example 1-1.

The evaluation results are presented in the following Table 4.

TABLE 4

Heat absorbing layer: Heat capacity per area: 0.0006 J/Kcm$^2$, heat capacity per volume: 0.4 J/Kcm$^3$

| | Negative electrode active material | Gel electrolyte layer Inorganic particles | Gel electrolyte layer Resin material | Short circuit test Heat generation temperature | Short circuit test Gas eruption |
|---|---|---|---|---|---|
| Example 4-1 | Carbon-tin composite material | Boehmite Specific heat capacity: 1.2 J/gK | Polyvinylidene fluoride | 66° C. | No |
| Example 4-2 | | | Polyimide | 63° C. | No |
| Example 4-3 | | | Aramid (polyamide) | 61° C. | No |
| Example 4-4 | | | Polyacrylonitrile | 68° C. | No |
| Example 4-5 | | | Polyvinyl alcohol | 69° C. | No |
| Example 4-6 | | | Polyether | 70° C. | No |
| Example 4-7 | | | Acrylic acid resin | 67° C. | No |
| Example 4-8 | | Aluminum nitride Specific heat capacity: 0.7 J/gK | Polyvinylidene fluoride | 66° C. | No |
| Example 4-9 | | | Polyimide | 63° C. | No |
| Example 4-10 | | | Aramid (polyamide) | 61° C. | No |
| Example 4-11 | | | Polyacrylonitrile | 68° C. | No |
| Example 4-12 | | | Polyvinyl alcohol | 69° C. | No |
| Example 4-13 | | | Polyether | 70° C. | No |
| Example 4-14 | | | Acrylic acid resin | 67° C. | No |
| Example 4-15 | | Boron nitride Specific heat capacity: 0.8 J/gK | Polyvinylidene fluoride | 73° C. | No |
| Example 4-16 | | | Polyimide | 74° C. | No |
| Example 4-17 | | | Aramid (polyamide) | 72° C. | No |
| Example 4-18 | | | Polyacrylonitrile | 79° C. | No |
| Example 4-19 | | | Polyvinyl alcohol | 80° C. | No |
| Example 4-20 | | | Polyether | 81° C. | No |
| Example 4-21 | | | Acrylic acid resin | 78° C. | No |
| Example 4-22 | | Silicon carbide Specific heat capacity: 0.7 J/gK | Polyvinylidene fluoride | 66° C. | No |
| Example 4-23 | | | Polyimide | 67° C. | No |
| Example 4-24 | | | Aramid (polyamide) | 65° C. | No |
| Example 4-25 | | | Polyacrylonitrile | 72° C. | No |
| Example 4-26 | | | Polyvinyl alcohol | 73° C. | No |
| Example 4-27 | | | Polyether | 74° C. | No |
| Example 4-28 | | | Acrylic acid resin | 71° C. | No |
| Example 4-29 | | Talc Specific heat capacity: 1.1 J/gK | Polyvinylidene fluoride | 66° C. | No |
| Example 4-30 | | | Polyimide | 63° C. | No |
| Example 4-31 | | | Aramid (polyamide) | 61° C. | No |
| Example 4-32 | | | Polyacrylonitrile | 68° C. | No |
| Example 4-33 | | | Polyvinyl alcohol | 69° C. | No |
| Example 4-34 | | | Polyether | 70° C. | No |
| Example 4-35 | | | Acrylic acid resin | 67° C. | No |
| Example 4-36 | | Li$_2$O$_4$ Specific heat capacity: 0.8 J/gK | Polyvinylidene fluoride | 73° C. | No |
| Example 4-37 | | | Polyimide | 74° C. | No |
| Example 4-38 | | | Aramid (polyamide) | 72° C. | No |
| Example 4-39 | | | Polyacrylonitrile | 79° C. | No |
| Example 4-40 | | | Polyvinyl alcohol | 80° C. | No |
| Example 4-41 | | | Polyether | 81° C. | No |
| Example 4-42 | | | Acrylic acid resin | 78° C. | No |
| Example 4-43 | | Li$_3$PO$_4$ Specific heat capacity: 0.8 J/gK | Polyvinylidene fluoride | 73° C. | No |
| Example 4-44 | | | Polyimide | 74° C. | No |
| Example 4-45 | | | Aramid (polyamide) | 72° C. | No |
| Example 4-46 | | | Polyacrylonitrile | 79° C. | No |
| Example 4-47 | | | Polyvinyl alcohol | 80° C. | No |
| Example 4-48 | | | Polyether | 81° C. | No |
| Example 4-49 | | | Acrylic acid resin | 78° C. | No |
| Example 4-50 | Carbon-tin composite material | LiF Specific heat capacity: 0.9 J/gK | Polyvinylidene fluoride | 73° C. | No |
| Example 4-51 | | | Polyimide | 74° C. | No |
| Example 4-52 | | | Aramid (polyamide) | 72° C. | No |
| Example 4-53 | | | Polyacrylonitrile | 79° C. | No |
| Example 4-54 | | | Polyvinyl alcohol | 80° C. | No |
| Example 4-55 | | | Polyether | 81° C. | No |
| Example 4-56 | | | Acrylic acid resin | 78° C. | No |
| Example 4-57 | | Diamond Specific heat capacity: 0.5 J/gK | Polyvinylidene fluoride | 73° C. | No |
| Example 4-58 | | | Polyimide | 74° C. | No |
| Example 4-59 | | | Aramid (polyamide) | 72° C. | No |
| Example 4-60 | | | Polyacrylonitrile | 79° C. | No |
| Example 4-61 | | | Polyvinyl alcohol | 80° C. | No |
| Example 4-62 | | | Polyether | 81° C. | No |
| Example 4-63 | | | Acrylic acid resin | 78° C. | No |
| Example 4-64 | | Zirconium oxide Specific heat capacity: 0.7 J/gK | Polyvinylidene fluoride | 65° C. | No |
| Example 4-65 | | | Polyimide | 62° C. | No |
| Example 4-66 | | | Aramid (polyamide) | 60° C. | No |
| Example 4-67 | | | Polyacrylonitrile | 67° C. | No |
| Example 4-68 | | | Polyvinyl alcohol | 68° C. | No |
| Example 4-69 | | | Polyether | 69° C. | No |
| Example 4-70 | | | Acrylic acid resin | 66° C. | No |
| Example 4-71 | | Yttrium oxide | Polyvinylidene fluoride | 72° C. | No |

TABLE 4-continued

Heat absorbing layer: Heat capacity per area: 0.0006 J/Kcm$^2$, heat capacity per volume: 0.4 J/Kcm$^3$

| | Negative electrode | Gel electrolyte layer | | Short circuit test | |
|---|---|---|---|---|---|
| | active material | Inorganic particles | Resin material | Heat generation temperature | Gas eruption |
| Example 4-72 | | Specific heat capacity: 0.5 J/gK | Polyimide | 73° C. | No |
| Example 4-73 | | | Aramid (polyamide) | 71° C. | No |
| Example 4-74 | | | Polyacrylonitrile | 78° C. | No |
| Example 4-75 | | | Polyvinyl alcohol | 79° C. | No |
| Example 4-76 | | | Polyether | 80° C. | No |
| Example 4-77 | | | Acrylic acid resin | 77° C. | No |
| Example 4-78 | | Barium titanate Specific heat capacity: 0.8 J/gK | Polyvinylidene fluoride | 67° C. | No |
| Example 4-79 | | | Polyimide | 68° C. | No |
| Example 4-80 | | | Aramid (polyamide) | 66° C. | No |
| Example 4-81 | | | Polyacrylonitrile | 73° C. | No |
| Example 4-82 | | | Polyvinyl alcohol | 74° C. | No |
| Example 4-83 | | | Polyether | 75° C. | No |
| Example 4-84 | | | Acrylic acid resin | 72° C. | No |
| Example 4-85 | | Strontium titanate Specific heat capacity: 0.8 J/gK | Polyvinylidene fluoride | 72° C. | No |
| Example 4-86 | | | Polyimide | 73° C. | No |
| Example 4-87 | | | Aramid (polyamide) | 71° C. | No |
| Example 4-88 | | | Polyacrylonitrile | 78° C. | No |
| Example 4-89 | | | Polyvinyl alcohol | 79° C. | No |
| Example 4-90 | | | Polyether | 80° C. | No |
| Example 4-91 | | | Acrylic acid resin | 77° C. | No |
| Example 4-92 | | Silicon oxide Specific heat capacity: 0.8 J/gK | Polyvinylidene fluoride | 67° C. | No |
| Example 4-93 | | | Polyimide | 68° C. | No |
| Example 4-94 | | | Aramid (polyamide) | 66° C. | No |
| Example 4-95 | | | Polyacrylonitrile | 73° C. | No |
| Example 4-96 | | | Polyvinyl alcohol | 74° C. | No |
| Example 4-97 | | | Polyether | 75° C. | No |
| Example 4-98 | | | Acrylic acid resin | 72° C. | No |
| Example 4-99 | Carbon-tin composite material | Zeolite Specific heat capacity: 1.0 J/gK | Polyvinylidene fluoride | 73° C. | No |
| Example 4-100 | | | Polyimide | 74° C. | No |
| Example 4-101 | | | Aramid (polyamide) | 72° C. | No |
| Example 4-102 | | | Polyacrylonitrile | 79° C. | No |
| Example 4-103 | | | Polyvinyl alcohol | 80° C. | No |
| Example 4-104 | | | Polyether | 81° C. | No |
| Example 4-105 | | | Acrylic acid resin | 78° C. | No |
| Example 4-106 | | Barium sulfate Specific heat capacity: 0.9 J/gK | Polyvinylidene fluoride | 73° C. | No |
| Example 4-107 | | | Polyimide | 74° C. | No |
| Example 4-108 | | | Aramid (polyamide) | 72° C. | No |
| Example 4-109 | | | Polyacrylonitrile | 79° C. | No |
| Example 4-110 | | | Polyvinyl alcohol | 80° C. | No |
| Example 4-111 | | | Polyether | 81° C. | No |
| Example 4-112 | | | Acrylic acid resin | 78° C. | No |
| Example 4-113 | | Titanium oxide Specific heat capacity: 0.8 J/gK | Polyvinylidene fluoride | 66° C. | No |
| Example 4-114 | | | Polyimide | 63° C. | No |
| Example 4-115 | | | Aramid (polyamide) | 61° C. | No |
| Example 4-116 | | | Polyacrylonitrile | 68° C. | No |
| Example 4-117 | | | Polyvinyl alcohol | 69° C. | No |
| Example 4-118 | | | Polyether | 70° C. | No |
| Example 4-119 | | | Acrylic acid resin | 67° C. | No |
| Example 4-120 | | Magnesium oxide Specific heat capacity: 1.0 J/gK | Polyvinylidene fluoride | 66° C. | No |
| Example 4-121 | | | Polyimide | 63° C. | No |
| Example 4-122 | | | Aramid (polyamide) | 61° C. | No |
| Example 4-123 | | | Polyacrylonitrile | 68° C. | No |
| Example 4-124 | | | Polyvinyl alcohol | 69° C. | No |
| Example 4-125 | | | Polyether | 70° C. | No |
| Example 4-126 | | | Acrylic acid resin | 67° C. | No |
| Example 4-127 | | Graphite Specific heat capacity: 0.8 J/gK | Polyvinylidene fluoride | 73° C. | No |
| Example 4-128 | | | Polyimide | 74° C. | No |
| Example 4-129 | | | Aramid (polyamide) | 72° C. | No |
| Example 4-130 | | | Polyacrylonitrile | 79° C. | No |
| Example 4-131 | | | Polyvinyl alcohol | 80° C. | No |
| Example 4-132 | | | Polyether | 81° C. | No |
| Example 4-133 | | | Acrylic acid resin | 78° C. | No |
| Example 4-134 | | Carbon nanotubes Specific heat capacity: 0.8 J/gK | Polyvinylidene fluoride | 73° C. | No |
| Example 4-135 | | | Polyimide | 74° C. | No |
| Example 4-136 | | | Aramid (polyamide) | 72° C. | No |
| Example 4-137 | | | Polyacrylonitrile | 79° C. | No |
| Example 4-138 | | | Polyvinyl alcohol | 80° C. | No |
| Example 4-139 | | | Polyether | 81° C. | No |
| Example 4-140 | | | Acrylic acid resin | 78° C. | No |
| Example 4-141 | | Aluminum hydroxide | Polyvinylidene fluoride | 73° C. | No |
| Example 4-142 | | | Polyimide | 74° C. | No |

TABLE 4-continued

Heat absorbing layer: Heat capacity per area: 0.0006 J/Kcm$^2$, heat capacity per volume: 0.4 J/Kcm$^3$

|  | Negative electrode | Gel electrolyte layer | | Short circuit test | |
|---|---|---|---|---|---|
|  | active material | Inorganic particles | Resin material | Heat generation temperature | Gas eruption |
| Example 4-143 |  | Specific heat capacity: 1.5 J/gK | Aramid (polyamide) | 72° C. | No |
| Example 4-144 |  |  | Polyacrylonitrile | 79° C. | No |
| Example 4-145 |  |  | Polyvinyl alcohol | 80° C. | No |
| Example 4-146 |  |  | Polyether | 81° C. | No |
| Example 4-147 |  |  | Acrylic acid resin | 78° C. | No |
| Example 4-148 | Carbon-tin composite material | Boron carbide Specific heat capacity: 1.0 J/gK | Polyvinylidene fluoride | 66° C. | No |
| Example 4-149 |  |  | Polyimide | 63° C. | No |
| Example 4-150 |  |  | Aramid (polyamide) | 61° C. | No |
| Example 4-151 |  |  | Polyacrylonitrile | 68° C. | No |
| Example 4-152 |  |  | Polyvinyl alcohol | 69° C. | No |
| Example 4-153 |  |  | Polyether | 70° C. | No |
| Example 4-154 |  |  | Acrylic acid resin | 67° C. | No |
| Example 4-155 |  | Silicon nitride Specific heat capacity: 0.7 J/gK | Polyvinylidene fluoride | 66° C. | No |
| Example 4-156 |  |  | Polyimide | 63° C. | No |
| Example 4-157 |  |  | Aramid (polyamide) | 61° C. | No |
| Example 4-158 |  |  | Polyacrylonitrile | 68° C. | No |
| Example 4-159 |  |  | Polyvinyl alcohol | 69° C. | No |
| Example 4-160 |  |  | Polyether | 70° C. | No |
| Example 4-161 |  |  | Acrylic acid resin | 67° C. | No |
| Example 4-162 |  | Titanium nitride Specific heat capacity: 0.6 J/gK | Polyvinylidene fluoride | 66° C. | No |
| Example 4-163 |  |  | Polyimide | 63° C. | No |
| Example 4-164 |  |  | Aramid (polyamide) | 61° C. | No |
| Example 4-165 |  |  | Polyacrylonitrile | 68° C. | No |
| Example 4-166 |  |  | Polyvinyl alcohol | 69° C. | No |
| Example 4-167 |  |  | Polyether | 70° C. | No |
| Example 4-168 |  |  | Acrylic acid resin | 67° C. | No |
| Example 4-169 |  | Zinc oxide Specific heat capacity: 0.5 J/gK | Polyvinylidene fluoride | 66° C. | No |
| Example 4-170 |  |  | Polyimide | 63° C. | No |
| Example 4-171 |  |  | Aramid (polyamide) | 61° C. | No |
| Example 4-172 |  |  | Polyacrylonitrile | 68° C. | No |
| Example 4-173 |  |  | Polyvinyl alcohol | 69° C. | No |
| Example 4-174 |  |  | Polyether | 70° C. | No |
| Example 4-175 |  |  | Acrylic acid resin | 67° C. | No |
| Example 4-176 |  | Aluminum oxide Specific heat capacity: 0.8 J/gK | Polyvinylidene fluoride | 66° C. | No |
| Example 4-177 |  |  | Polyimide | 63° C. | No |
| Example 4-178 |  |  | Aramid (polyamide) | 61° C. | No |
| Example 4-179 |  |  | Polyacrylonitrile | 68° C. | No |
| Example 4-180 |  |  | Polyvinyl alcohol | 69° C. | No |
| Example 4-181 |  |  | Polyether | 70° C. | No |
| Example 4-182 |  |  | Acrylic acid resin | 67° C. | No |
| Example 4-183 | Carbon-tin composite material | Olivine Specific heat capacity: 0.8 J/gK | Polyvinylidene fluoride | 73° C. | No |
| Example 4-184 |  |  | Polyimide | 74° C. | No |
| Example 4-185 |  |  | Aramid (polyamide) | 72° C. | No |
| Example 4-186 |  |  | Polyacrylonitrile | 79° C. | No |
| Example 4-187 |  |  | Polyvinyl alcohol | 80° C. | No |
| Example 4-188 |  |  | Polyether | 81° C. | No |
| Example 4-189 |  |  | Acrylic acid resin | 78° C. | No |
| Example 4-190 |  | Montmorillonite Specific heat capacity: 0.7 J/gK | Polyvinylidene fluoride | 73° C. | No |
| Example 4-191 |  |  | Polyimide | 74° C. | No |
| Example 4-192 |  |  | Aramid (polyamide) | 72° C. | No |
| Example 4-193 |  |  | Polyacrylonitrile | 79° C. | No |
| Example 4-194 |  |  | Polyvinyl alcohol | 80° C. | No |
| Example 4-195 |  |  | Polyether | 81° C. | No |
| Example 4-196 |  |  | Acrylic acid resin | 78° C. | No |
| Example 4-197 |  | Zeolite Specific heat capacity: 0.6 J/gK | Polyvinylidene fluoride | 73° C. | No |
| Example 4-198 |  |  | Polyimide | 74° C. | No |
| Example 4-199 |  |  | Aramid (polyamide) | 72° C. | No |
| Example 4-200 |  |  | Polyacrylonitrile | 79° C. | No |
| Example 4-201 |  |  | Polyvinyl alcohol | 80° C. | No |
| Example 4-202 |  |  | Polyether | 81° C. | No |
| Example 4-203 |  |  | Acrylic acid resin | 78° C. | No |
| Example 4-204 |  | Mullite Specific heat capacity: 0.8 J/gK | Polyvinylidene fluoride | 73° C. | No |
| Example 4-205 |  |  | Polyimide | 74° C. | No |
| Example 4-206 |  |  | Aramid (polyamide) | 72° C. | No |
| Example 4-207 |  |  | Polyacrylonitrile | 79° C. | No |
| Example 4-208 |  |  | Polyvinyl alcohol | 80° C. | No |
| Example 4-209 |  |  | Polyether | 81° C. | No |
| Example 4-210 |  |  | Acrylic acid resin | 78° C. | No |
| Example 4-211 |  | Kaolinite Specific heat capacity: 0.7 J/gK | Polyvinylidene fluoride | 73° C. | No |
| Example 4-212 |  |  | Polyimide | 74° C. | No |
| Example 4-213 |  |  | Aramid (polyamide) | 72° C. | No |

TABLE 4-continued

Heat absorbing layer: Heat capacity per area: 0.0006
J/Kcm$^2$, heat capacity per volume: 0.4 J/Kcm$^3$

|  | Negative electrode | Gel electrolyte layer | | Short circuit test | |
|---|---|---|---|---|---|
|  | active material | Inorganic particles | Resin material | Heat generation temperature | Gas eruption |
| Example 4-214 |  |  | Polyacrylonitrile | 79° C. | No |
| Example 4-215 |  |  | Polyvinyl alcohol | 80° C. | No |
| Example 4-216 |  |  | Polyether | 81° C. | No |
| Example 4-217 |  |  | Acrylic acid resin | 78° C. | No |
| Example 4-218 |  | Imogolite | Polyvinylidene fluoride | 73° C. | No |
| Example 4-219 |  | Specific heat | Polyimide | 74° C. | No |
| Example 4-220 |  | capacity: 0.8 J/gK | Aramid (polyamide) | 72° C. | No |
| Example 4-221 |  |  | Polyacrylonitrile | 79° C. | No |
| Example 4-222 |  |  | Polyvinyl alcohol | 80° C. | No |
| Example 4-223 |  |  | Polyether | 81° C. | No |
| Example 4-224 |  |  | Acrylic acid resin | 78° C. | No |
| Comparative Example 4-1 | Carbon-tin composite material | — | Polyvinylidene fluoride | 500° C. | Yes |

As can be seen from Table 4, in the laminate film type batteries of the various Examples that were produced so as to have a total heat capacity per unit area of the gel electrolyte layer of 0.0006 J/Kcm$^2$ and the total heat capacity per unit volume of 0.4 J/Kcm$^3$, the following could be confirmed. That is, even in a case in which a carbon-tin composite material was used as the negative electrode active material, the batteries were highly safe.

<Example 5-1> to <Example 5-224> and <Comparative Example 5-1

Laminate film type batteries of Example 5-1 to Example 5-224 and Comparative Example 4-1 were produced in the same manner as in Example 2-1 to Example 2-224 and Comparative Example 2-1, respectively, except that lithium titanate similar to that of Example 1-37 was used as the negative electrode active material, instead of graphite. Meanwhile, the negative electrode mix slurry that formed the negative electrode active material layer was produced to have a composition similar to that of Example 1-37.

[Evaluation of Batteries: Short Circuit Test]

For the laminate film type batteries of various Examples and various Comparative Examples thus produced, a short circuit test was carried out in the same manner as in Example 1-1.

The evaluation results are presented in the following Table 5.

TABLE 5

Heat absorbing layer: Heat capacity per area: 0.0006
J/Kcm$^2$, heat capacity per volume: 0.4 J/Kcm$^3$

|  | Negative electrode active material | Gel electrolyte layer | | Short circuit test | |
|---|---|---|---|---|---|
|  |  | Inorganic particles | Resin material | Heat generation temperature | Gas eruption |
| Example 5-1 | Lithium titanate | Boehmite | Polyvinylidene fluoride | 64° C. | No |
| Example 5-2 |  | Specific heat | Polyimide | 63° C. | No |
| Example 5-3 |  | capacity: 1.2 J/gK | Aramid (polyamide) | 61° C. | No |
| Example 5-4 |  |  | Polyacrylonitrile | 68° C. | No |
| Example 5-5 |  |  | Polyvinyl alcohol | 69° C. | No |
| Example 5-6 |  |  | Polyether | 70° C. | No |
| Example 5-7 |  |  | Acrylic acid resin | 67° C. | No |
| Example 5-8 |  | Aluminum nitride | Polyvinylidene fluoride | 64° C. | No |
| Example 5-9 |  | Specific heat | Polyimide | 63° C. | No |
| Example 5-10 |  | capacity: 0.7 J/gK | Aramid (polyamide) | 61° C. | No |
| Example 5-11 |  |  | Polyacrylonitrile | 68° C. | No |
| Example 5-12 |  |  | Polyvinyl alcohol | 69° C. | No |
| Example 5-13 |  |  | Polyether | 70° C. | No |
| Example 5-14 |  |  | Acrylic acid resin | 67° C. | No |
| Example 5-15 |  | Boron nitride | Polyvinylidene fluoride | 71° C. | No |
| Example 5-16 |  | Specific heat | Polyimide | 72° C. | No |
| Example 5-17 |  | capacity: 0.8 J/gK | Aramid (polyamide) | 70° C. | No |
| Example 5-18 |  |  | Polyacrylonitrile | 77° C. | No |
| Example 5-19 |  |  | Polyvinyl alcohol | 78° C. | No |
| Example 5-20 |  |  | Polyether | 79° C. | No |
| Example 5-21 |  |  | Acrylic acid resin | 76° C. | No |
| Example 5-22 |  | Silicon carbide | Polyvinylidene fluoride | 64° C. | No |
| Example 5-23 |  | Specific heat | Polyimide | 65° C. | No |
| Example 5-24 |  | capacity: 0.7 J/gK | Aramid (polyamide) | 63° C. | No |
| Example 5-25 |  |  | Polyacrylonitrile | 70° C. | No |

TABLE 5-continued

Heat absorbing layer: Heat capacity per area: 0.0006 J/Kcm², heat capacity per volume: 0.4 J/Kcm³

| | Negative electrode active material | Gel electrolyte layer | | Short circuit test | |
|---|---|---|---|---|---|
| | | Inorganic particles | Resin material | Heat generation temperature | Gas eruption |
| Example 5-26 | | | Polyvinyl alcohol | 71° C. | No |
| Example 5-27 | | | Polyether | 72° C. | No |
| Example 5-28 | | | Acrylic acid resin | 69° C. | No |
| Example 5-29 | | Talc | Polyvinylidene fluoride | 64° C. | No |
| Example 5-30 | | Specific heat | Polyimide | 65° C. | No |
| Example 5-31 | | capacity: 1.1 J/gK | Aramid (polyamide) | 63° C. | No |
| Example 5-32 | | | Polyacrylonitrile | 70° C. | No |
| Example 5-33 | | | Polyvinyl alcohol | 71° C. | No |
| Example 5-34 | | | Polyether | 72° C. | No |
| Example 5-35 | | | Acrylic acid resin | 69° C. | No |
| Example 5-36 | | Li$_2$O$_4$ | Polyvinylidene fluoride | 71° C. | No |
| Example 5-37 | | Specific heat | Polyimide | 72° C. | No |
| Example 5-38 | | capacity: 0.8 J/gK | Aramid (polyamide) | 70° C. | No |
| Example 5-39 | | | Polyacrylonitrile | 77° C. | No |
| Example 5-40 | | | Polyvinyl alcohol | 78° C. | No |
| Example 5-41 | | | Polyether | 79° C. | No |
| Example 5-42 | | | Acrylic acid resin | 76° C. | No |
| Example 5-43 | | Li$_3$PO$_4$ | Polyvinylidene fluoride | 71° C. | No |
| Example 5-44 | | Specific heat | Polyimide | 72° C. | No |
| Example 5-45 | | capacity: 0.8 J/gK | Aramid (polyamide) | 70° C. | No |
| Example 5-46 | | | Polyacrylonitrile | 77° C. | No |
| Example 5-47 | | | Polyvinyl alcohol | 78° C. | No |
| Example 5-48 | | | Polyether | 79° C. | No |
| Example 5-49 | | | Acrylic acid resin | 76° C. | No |
| Example 5-50 | Lithium titanate | LiF | Polyvinylidene fluoride | 71° C. | No |
| Example 5-51 | | Specific heat | Polyimide | 72° C. | No |
| Example 5-52 | | capacity: 0.9 J/gK | Aramid (polyamide) | 70° C. | No |
| Example 5-53 | | | Polyacrylonitrile | 77° C. | No |
| Example 5-54 | | | Polyvinyl alcohol | 78° C. | No |
| Example 5-55 | | | Polyether | 79° C. | No |
| Example 5-56 | | | Acrylic acid resin | 76° C. | No |
| Example 5-57 | | Diamond | Polyvinylidene fluoride | 71° C. | No |
| Example 5-58 | | Specific heat | Polyimide | 72° C. | No |
| Example 5-59 | | capacity: 0.5 J/gK | Aramid (polyamide) | 70° C. | No |
| Example 5-60 | | | Polyacrylonitrile | 77° C. | No |
| Example 5-61 | | | Polyvinyl alcohol | 78° C. | No |
| Example 5-62 | | | Polyether | 79° C. | No |
| Example 5-63 | | | Acrylic acid resin | 76° C. | No |
| Example 5-64 | | Zirconium oxide | Polyvinylidene fluoride | 63° C. | No |
| Example 5-65 | | Specific heat | Polyimide | 64° C. | No |
| Example 5-66 | | capacity: 0.7 J/gK | Aramid (polyamide) | 62° C. | No |
| Example 5-67 | | | Polyacrylonitrile | 69° C. | No |
| Example 5-68 | | | Polyvinyl alcohol | 70° C. | No |
| Example 5-69 | | | Polyether | 71° C. | No |
| Example 5-70 | | | Acrylic acid resin | 68° C. | No |
| Example 5-71 | | Yttrium oxide | Polyvinylidene fluoride | 70° C. | No |
| Example 5-72 | | Specific heat | Polyimide | 71° C. | No |
| Example 5-73 | | capacity: 0.5 J/gK | Aramid (polyamide) | 69° C. | No |
| Example 5-74 | | | Polyacrylonitrile | 76° C. | No |
| Example 5-75 | | | Polyvinyl alcohol | 77° C. | No |
| Example 5-76 | | | Polyether | 78° C. | No |
| Example 5-77 | | | Acrylic acid resin | 75° C. | No |
| Example 5-78 | | Barium titanate | Polyvinylidene fluoride | 65° C. | No |
| Example 5-79 | | Specific heat | Polyimide | 66° C. | No |
| Example 5-80 | | capacity: 0.8 J/gK | Aramid (polyamide) | 64° C. | No |
| Example 5-81 | | | Polyacrylonitrile | 71° C. | No |
| Example 5-82 | | | Polyvinyl alcohol | 72° C. | No |
| Example 5-83 | | | Polyether | 73° C. | No |
| Example 5-84 | | | Acrylic acid resin | 70° C. | No |
| Example 5-85 | | Strontium titanate | Polyvinylidene fluoride | 70° C. | No |
| Example 5-86 | | Specific heat | Polyimide | 71° C. | No |
| Example 5-87 | | capacity: 0.8 J/gK | Aramid (polyamide) | 69° C. | No |
| Example 5-88 | | | Polyacrylonitrile | 76° C. | No |
| Example 5-89 | | | Polyvinyl alcohol | 77° C. | No |
| Example 5-90 | | | Polyether | 78° C. | No |
| Example 5-91 | | | Acrylic acid resin | 75° C. | No |
| Example 5-92 | | Silicon oxide | Polyvinylidene fluoride | 65° C. | No |
| Example 5-93 | | Specific heat | Polyimide | 66° C. | No |
| Example 5-94 | | capacity: 0.8 J/gK | Aramid (polyamide) | 64° C. | No |
| Example 5-95 | | | Polyacrylonitrile | 71° C. | No |
| Example 5-96 | | | Polyvinyl alcohol | 72° C. | No |

TABLE 5-continued

Heat absorbing layer: Heat capacity per area: 0.0006 J/Kcm², heat capacity per volume: 0.4 J/Kcm³

| | Negative electrode active material | Gel electrolyte layer | | Short circuit test | |
|---|---|---|---|---|---|
| | | Inorganic particles | Resin material | Heat generation temperature | Gas eruption |
| Example 5-97 | | | Polyether | 73° C. | No |
| Example 5-98 | | | Acrylic acid resin | 70° C. | No |
| Example 5-99 | Lithium titanate | Zeolite | Polyvinylidene fluoride | 71° C. | No |
| Example 5-100 | | Specific heat | Polyimide | 72° C. | No |
| Example 5-101 | | capacity: 1.0 J/gK | Aramid (polyamide) | 70° C. | No |
| Example 5-102 | | | Polyacrylonitrile | 77° C. | No |
| Example 5-103 | | | Polyvinyl alcohol | 78° C. | No |
| Example 5-104 | | | Polyether | 79° C. | No |
| Example 5-105 | | | Acrylic acid resin | 76° C. | No |
| Example 5-106 | | Barium sulfate | Polyvinylidene fluoride | 71° C. | No |
| Example 5-107 | | Specific heat | Polyimide | 72° C. | No |
| Example 5-108 | | capacity: 0.9 J/gK | Aramid (polyamide) | 70° C. | No |
| Example 5-109 | | | Polyacrylonitrile | 77° C. | No |
| Example 5-110 | | | Polyvinyl alcohol | 78° C. | No |
| Example 5-111 | | | Polyether | 79° C. | No |
| Example 5-112 | | | Acrylic acid resin | 76° C. | No |
| Example 5-113 | | Titanium oxide | Polyvinylidene fluoride | 64° C. | No |
| Example 5-114 | | Specific heat | Polyimide | 65° C. | No |
| Example 5-115 | | capacity: 0.8 J/gK | Aramid (polyamide) | 63° C. | No |
| Example 5-116 | | | Polyacrylonitrile | 70° C. | No |
| Example 5-117 | | | Polyvinyl alcohol | 71° C. | No |
| Example 5-118 | | | Polyether | 72° C. | No |
| Example 5-119 | | | Acrylic acid resin | 69° C. | No |
| Example 5-120 | | Magnesium oxide | Polyvinylidene fluoride | 64° C. | No |
| Example 5-121 | | Specific heat | Polyimide | 65° C. | No |
| Example 5-122 | | capacity: 1.0 J/gK | Aramid (polyamide) | 63° C. | No |
| Example 5-123 | | | Polyacrylonitrile | 70° C. | No |
| Example 5-124 | | | Polyvinyl alcohol | 71° C. | No |
| Example 5-125 | | | Polyether | 72° C. | No |
| Example 5-126 | | | Acrylic acid resin | 69° C. | No |
| Example 5-127 | | Graphite | Polyvinylidene fluoride | 71° C. | No |
| Example 5-128 | | Specific heat | Polyimide | 72° C. | No |
| Example 5-129 | | capacity: 0.8 J/gK | Aramid (polyamide) | 70° C. | No |
| Example 5-130 | | | Polyacrylonitrile | 77° C. | No |
| Example 5-131 | | | Polyvinyl alcohol | 78° C. | No |
| Example 5-132 | | | Polyether | 79° C. | No |
| Example 5-133 | | | Acrylic acid resin | 76° C. | No |
| Example 5-134 | | Carbon nanotubes | Polyvinylidene fluoride | 71° C. | No |
| Example 5-135 | | Specific heat | Polyimide | 72° C. | No |
| Example 5-136 | | capacity: 0.8 J/gK | Aramid (polyamide) | 70° C. | No |
| Example 5-137 | | | Polyacrylonitrile | 77° C. | No |
| Example 5-138 | | | Polyvinyl alcohol | 78° C. | No |
| Example 5-139 | | | Polyether | 79° C. | No |
| Example 5-140 | | | Acrylic acid resin | 76° C. | No |
| Example 5-141 | | Aluminum | Polyvinylidene fluoride | 71° C. | No |
| Example 5-142 | | hydroxide | Polyimide | 72° C. | No |
| Example 5-143 | | Specific heat | Aramid (polyamide) | 70° C. | No |
| Example 5-144 | | capacity: 1.5 J/gK | Polyacrylonitrile | 77° C. | No |
| Example 5-145 | | | Polyvinyl alcohol | 78° C. | No |
| Example 5-146 | | | Polyether | 79° C. | No |
| Example 5-147 | | | Acrylic acid resin | 76° C. | No |
| Example 5-148 | Lithium titanate | Boron carbide | Polyvinylidene fluoride | 71° C. | No |
| Example 5-149 | | Specific heat | Polyimide | 72° C. | No |
| Example 5-150 | | capacity: 1.0 J/gK | Aramid (polyamide) | 70° C. | No |
| Example 5-151 | | | Polyacrylonitrile | 77° C. | No |
| Example 5-152 | | | Polyvinyl alcohol | 78° C. | No |
| Example 5-153 | | | Polyether | 79° C. | No |
| Example 5-154 | | | Acrylic acid resin | 76° C. | No |
| Example 5-155 | | Silicon nitride | Polyvinylidene fluoride | 71° C. | No |
| Example 5-156 | | Specific heat | Polyimide | 72° C. | No |
| Example 5-157 | | capacity: 0.7 J/gK | Aramid (polyamide) | 70° C. | No |
| Example 5-158 | | | Polyacrylonitrile | 77° C. | No |
| Example 5-159 | | | Polyvinyl alcohol | 78° C. | No |
| Example 5-160 | | | Polyether | 79° C. | No |
| Example 5-161 | | | Acrylic acid resin | 76° C. | No |
| Example 5-162 | | Titanium nitride | Polyvinylidene fluoride | 71° C. | No |
| Example 5-163 | | Specific heat | Polyimide | 72° C. | No |
| Example 5-164 | | capacity: 0.6 J/gK | Aramid (polyamide) | 70° C. | No |
| Example 5-165 | | | Polyacrylonitrile | 77° C. | No |
| Example 5-166 | | | Polyvinyl alcohol | 78° C. | No |
| Example 5-167 | | | Polyether | 79° C. | No |

TABLE 5-continued

Heat absorbing layer: Heat capacity per area: 0.0006 J/Kcm², heat capacity per volume: 0.4 J/Kcm³

| | Negative electrode active material | Gel electrolyte layer | | Short circuit test | |
|---|---|---|---|---|---|
| | | Inorganic particles | Resin material | Heat generation temperature | Gas eruption |
| Example 5-168 | | | Acrylic acid resin | 76° C. | No |
| Example 5-169 | | Zinc oxide | Polyvinylidene fluoride | 71° C. | No |
| Example 5-170 | | Specific heat | Polyimide | 72° C. | No |
| Example 5-171 | | capacity: 0.5 J/gK | Aramid (polyamide) | 70° C. | No |
| Example 5-172 | | | Polyacrylonitrile | 77° C. | No |
| Example 5-173 | | | Polyvinyl alcohol | 78° C. | No |
| Example 5-174 | | | Polyether | 79° C. | No |
| Example 5-175 | | | Acrylic acid resin | 76° C. | No |
| Example 5-176 | | Aluminum oxide | Polyvinylidene fluoride | 71° C. | No |
| Example 5-177 | | Specific heat | Polyimide | 72° C. | No |
| Example 5-178 | | capacity: 0.8 J/gK | Aramid (polyamide) | 70° C. | No |
| Example 5-179 | | | Polyacrylonitrile | 77° C. | No |
| Example 5-180 | | | Polyvinyl alcohol | 78° C. | No |
| Example 5-181 | | | Polyether | 79° C. | No |
| Example 5-182 | | | Acrylic acid resin | 76° C. | No |
| Example 5-183 | Lithium titanate | Olivine | Polyvinylidene fluoride | 64° C. | No |
| Example 5-184 | | Specific heat | Polyimide | 63° C. | No |
| Example 5-185 | | capacity: 0.8 J/gK | Aramid (polyamide) | 61° C. | No |
| Example 5-186 | | | Polyacrylonitrile | 68° C. | No |
| Example 5-187 | | | Polyvinyl alcohol | 69° C. | No |
| Example 5-188 | | | Polyether | 70° C. | No |
| Example 5-189 | | | Acrylic acid resin | 67° C. | No |
| Example 5-190 | | Montmorillonite | Polyvinylidene fluoride | 64° C. | No |
| Example 5-191 | | Specific heat | Polyimide | 63° C. | No |
| Example 5-192 | | capacity: 0.7 J/gK | Aramid (polyamide) | 61° C. | No |
| Example 5-193 | | | Polyacrylonitrile | 68° C. | No |
| Example 5-194 | | | Polyvinyl alcohol | 69° C. | No |
| Example 5-195 | | | Polyether | 70° C. | No |
| Example 5-196 | | | Acrylic acid resin | 67° C. | No |
| Example 5-197 | | Zeolite | Polyvinylidene fluoride | 64° C. | No |
| Example 5-198 | | Specific heat | Polyimide | 63° C. | No |
| Example 5-199 | | capacity: 0.6 J/gK | Aramid (polyamide) | 61° C. | No |
| Example 5-200 | | | Polyacrylonitrile | 68° C. | No |
| Example 5-201 | | | Polyvinyl alcohol | 69° C. | No |
| Example 5-202 | | | Polyether | 70° C. | No |
| Example 5-203 | | | Acrylic acid resin | 67° C. | No |
| Example 5-204 | | Mullite | Polyvinylidene fluoride | 64° C. | No |
| Example 5-205 | | Specific heat | Polyimide | 63° C. | No |
| Example 5-206 | | capacity: 0.8 J/gK | Aramid (polyamide) | 61° C. | No |
| Example 5-207 | | | Polyacrylonitrile | 68° C. | No |
| Example 5-208 | | | Polyvinyl alcohol | 69° C. | No |
| Example 5-209 | | | Polyether | 70° C. | No |
| Example 5-210 | | | Acrylic acid resin | 67° C. | No |
| Example 5-211 | | Kaolinite | Polyvinylidene fluoride | 64° C. | No |
| Example 5-212 | | Specific heat | Polyimide | 63° C. | No |
| Example 5-213 | | capacity: 0.7 J/gK | Aramid (polyamide) | 61° C. | No |
| Example 5-214 | | | Polyacrylonitrile | 68° C. | No |
| Example 5-215 | | | Polyvinyl alcohol | 69° C. | No |
| Example 5-216 | | | Polyether | 70° C. | No |
| Example 5-217 | | | Acrylic acid resin | 67° C. | No |
| Example 5-218 | | Imogolite | Polyvinylidene fluoride | 64° C. | No |
| Example 5-219 | | Specific heat | Polyimide | 63° C. | No |
| Example 5-220 | | capacity: 0.8 J/gK | Aramid (polyamide) | 61° C. | No |
| Example 5-221 | | | Polyacrylonitrile | 68° C. | No |
| Example 5-222 | | | Polyvinyl alcohol | 69° C. | No |
| Example 5-223 | | | Polyether | 70° C. | No |
| Example 5-224 | | | Acrylic acid resin | 67° C. | No |
| Comparative Example 5-1 | Lithium titanate | — | Polyvinylidene fluoride | 500° C. | Yes |

As can be seen from Table 5, in the laminate film type batteries of the various Examples that were produced so as to have a total heat capacity per unit area of the gel electrolyte layer of 0.0006 J/Kcm$^2$ and the total heat capacity per unit volume of 0.4 J/Kcm$^3$, the following could be confirmed. That is, even in a case in which lithium titanate was used as the negative electrode active material, the batteries had a low heat generation temperature in the short circuit test, such as below 80° C., and were highly safe.

Example 6-1

A laminate film type battery similar to that of Example 1-1 was produced, and this was used to produce a laminate film type battery of Example 6-1 in which a gel electrolyte layer having a one-surface thickness of 7.5 μm was formed on both surfaces of a polyethylene microporous film having a thickness of 9 μm (in Table 6, indicated as both surfaces of substrate). That is, a battery in which a gel electrolyte layer was formed between the positive electrode and the separator, and between the negative electrode and the separator, was designated as the laminate film type battery of Example 6-1.

Example 6-2

A precursor solution similar to that of Example 1-1 was applied on both surfaces of the positive electrode only, and the precursor solution was dried to remove the plasticizer. Thereby, a gel electrolyte layer having a one-surface thickness of 15 μm was formed only on the positive electrode side surface (the surface facing the positive electrode at the time of battery production; in Table 6, indicated as positive electrode side surface of substrate) of a polyethylene microporous film having a thickness of 9 μm. That is, a gel electrolyte layer was formed only between the positive electrode and the separator. Except for this, a laminate film type battery was produced in the same manner as in Example 6-1.

Example 6-3

A precursor solution similar to that of Example 1-1 was applied on both surfaces of the negative electrode only, and the precursor solution was dried to remove the plasticizer. Thereby, a gel electrolyte layer having a one-surface thickness of 15 μm was formed only on the negative electrode side surface (the surface facing the negative electrode at the time of battery production; in Table 6, indicated as negative electrode side surface of substrate) of a polyethylene microporous film having a thickness of 9 μm. That is, a gel electrolyte layer was formed only between the positive electrode and the separator. Except for this, a laminate film type battery was produced in the same manner as in Example 6-1.

<Example 6-4> to <Example 6-6>

Laminate film type batteries of Example 6-4 to Example 6-6 were produced in the same manner as in Example 6-1 to Example 6-3, respectively, except that silicon was used as the negative electrode active material, and the negative electrode mix slurry was produced to have a composition similar to that of Example 1-13.

<Example 6-7> to <Example 6-9>

Laminate film type batteries of Example 6-7 to Example 6-9 were produced in the same manner as in Example 6-1 to Example 6-3, respectively, except that a carbon-tin composite material was used as the negative electrode active material, and the negative electrode mix slurry was produced to have a composition similar to that of Example 1-25.

<Example 6-10> to <Example 6-12>

Laminate film type batteries of Example 6-10 to Example 6-12 were produced in the same manner as in Example 6-1 to Example 6-3, respectively, except that lithium titanate was used as the negative electrode active material, and the negative electrode mix slurry was produced to have a composition similar to that of Example 1-37.

Example 6-13

A laminate film type battery was produced, in which the respective configurations of the positive electrode, the negative electrode and the gel electrolyte layer were similar to those of Example 6-1, and the laminated electrode assembly was sheathed with a soft laminate film. That is, the battery was configured such that the battery exterior material was a laminate film, the electrode assembly was of laminate type, and the negative electrode active material was graphite.

[Assembling of Laminate Film Type Battery]

A precursor solution similar to that of Example 6-1 was applied on both surfaces of a rectangular-shaped positive electrode and a rectangular-shaped negative electrode, and the precursor solution was dried to remove the plasticizer. Thus, gel electrolyte layers were formed on the surfaces of the positive electrode and the negative electrode. Next, the rectangular-shaped positive electrode and negative electrode, and a rectangular-shaped separator were laminated in the order of the positive electrode (having a gel electrolyte layer formed on both surfaces), the separator, the negative electrode (having a gel electrolyte layer formed on both surfaces), and the separator, and thus a laminated electrode assembly was formed.

Figure 5:
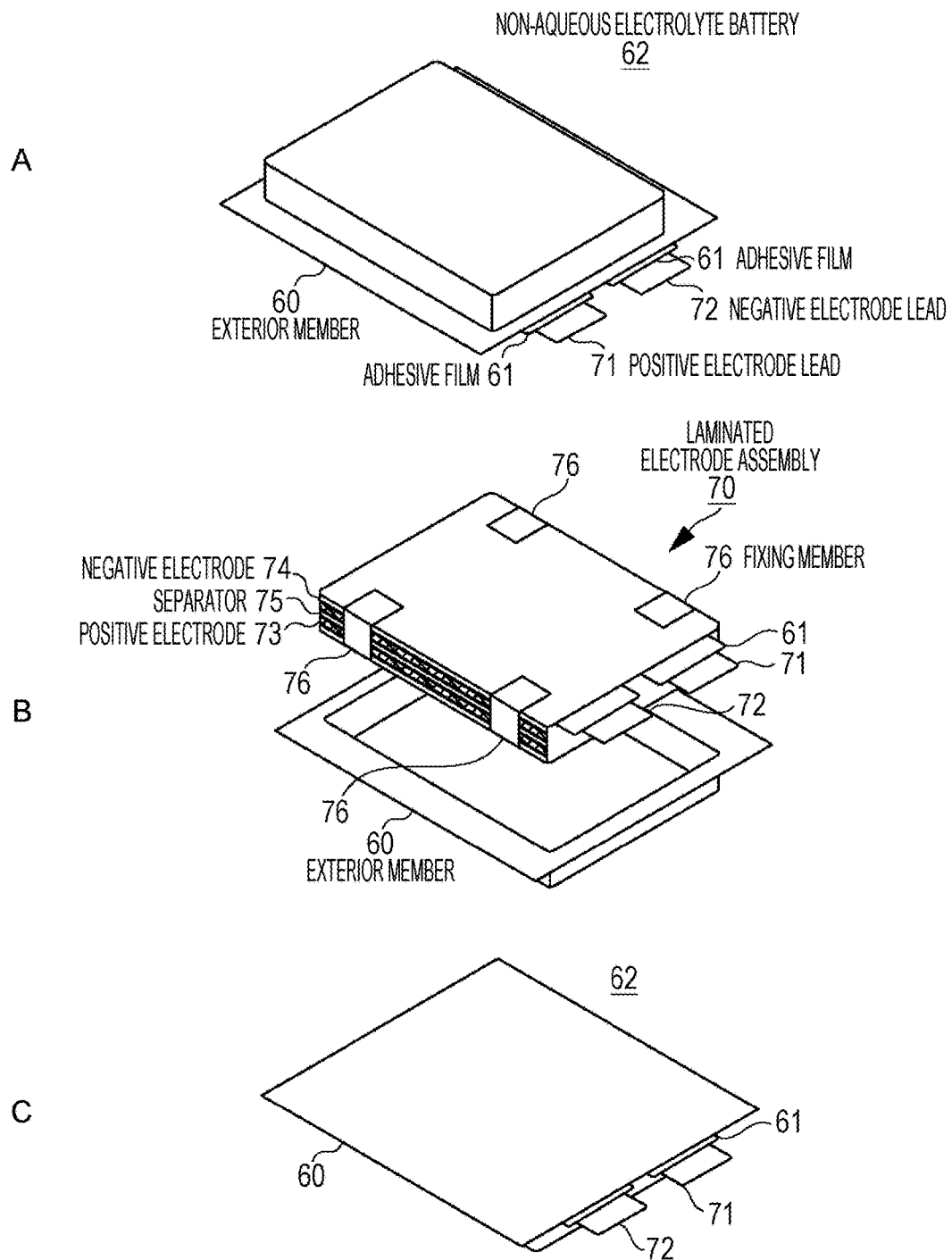
FIG. 5 is an exploded perspective view diagram illustrating the configuration of a laminate film type non-aqueous electrolyte battery using a laminated electrode assembly.

Next, the laminated electrode assembly was sheathed with a laminate film having a soft aluminum layer, and the edge from which the positive electrode terminal and the negative electrode terminal were led out, and other three edges around the laminated electrode assembly were tightly sealed by sealing by thermal fusion. Thereby, a laminate film type battery as illustrated in FIG. 5, having a battery shape that measured 37 mm in thickness, 49 mm in width, and 84 mm in height (374984 size), and a battery capacity of 2000 mAh, was produced.

<Example 6-14> to <Example 6-24>

Laminate film type batteries of Example 6-14 to Example 6-24 were produced in the same manner as in Example 6-2 to Example 6-12, respectively, except that the batteries were produced to have a configuration of a laminate film type battery similar to that of Example 6-13.

Example 6-25

A laminate film type battery was produced, in which the respective configurations of the positive electrode, the negative electrode and the gel electrolyte layer were similar to those of Example 6-1, and the wound electrode assembly was sheathed with a soft laminate film. That is, the battery was configured such that the battery exterior material was a laminate film, the electrode assembly was of flat wound type, and the negative electrode active material was graphite. Furthermore, the separator was a polyethylene microporous film having a thickness of 9 μm. The method for assembling the laminate film type battery will be explained below.

[Assembling of Laminate Film Type Battery]

A precursor solution similar to that of Example 6-1 was applied on both surfaces of the positive electrode and the negative electrode, and the precursor solution was dried to remove the plasticizer. Thus, gel electrolyte layers were formed on the surfaces of the positive electrode and the negative electrode. Next, the positive electrode, the negative electrode, and the separator were laminated in the order of the positive electrode (having a gel electrolyte layer formed on both surfaces), the separator, the negative electrode (having a gel electrolyte layer on both surfaces), and the separator, and the laminate was wound several times in the longitudinal direction in a flat shape. Subsequently, the winding end portion was fixed with an adhesive tape, and thereby a wound electrode assembly was formed.

Next, as illustrated in FIG. 7, the wound electrode assembly was sheathed with a soft laminate film having a soft aluminum layer and a hard laminate film having a hard aluminum layer, and the edge from which the positive electrode terminal and the negative electrode terminal were led out, and the other three edges around the wound electrode assembly were tightly sealed by sealing by thermal fusion under reduced pressure. Thereafter, two edges of the hard laminate film were formed into an elliptic cross-sectional shape by bringing the shorter edges of the hard laminate film into contact, the portions of the hard laminate film and the soft laminate film facing each other were pasted, and thus a battery cell was obtained. Subsequently, a positive electrode lead connected to the positive electrode, and a negative electrode lead connected to the negative electrode, were connected to a circuit board, and the circuit board was accommodated in a top cover. Lastly, the top cover and a bottom cover were respectively inserted and adhered to the battery cell, and thus a laminate film type battery as illustrated in FIG. 6, having a battery shape that measured 37 mm in thickness, 49 mm in width, and 87 mm in height (374987 size), and a battery capacity of 2000 mAh, was produced.

<Example 6-26> to <Example 6-36>

Laminate film type batteries of Example 6-26 to Example 6-36 were produced in the same manner as in Example 6-2 to Example 6-12, respectively, except that the battery was configured to be a laminate film type battery similar to that of Example 6-25.

Example 6'-1

A laminate film type battery similar to that of Example 1'-1 was produced, and this was used to produce a laminate film type battery of Example 6'-1 in which a gel electrolyte layer having a one-surface thickness of 7.6 μm was formed on both surfaces of a polyethylene microporous film having a thickness of 9 μm (in Table 6, indicated as both surfaces of substrate). That is, a battery in which a gel electrolyte layer was formed between the positive electrode and the separator, and between the negative electrode and the separator, was designated as the laminate film type battery of Example 6'-1.

Example 6'-2

A precursor solution similar to that of Example 1'-1 was applied on both surfaces of the positive electrode only, and the precursor solution was dried to remove the plasticizer. Thereby, a gel electrolyte layer having a one-surface thickness of 15.2 μm was formed only on the positive electrode side surface (the surface facing the positive electrode at the time of battery production; in Table 6, indicated as positive electrode side surface of substrate) of a polyethylene microporous film having a thickness of 9 μm. That is, a gel electrolyte layer was formed only between the positive electrode and the separator. Except for this, a laminate film type battery was produced in the same manner as in Example 6'-1.

Example 6'-3

A precursor solution similar to that of Example 1'-1 was applied on both surfaces of the negative electrode only, and the precursor solution was dried to remove the plasticizer. Thereby, a gel electrolyte layer having a one-surface thickness of 15.2 μm was formed only on the negative electrode side surface (the surface facing the negative electrode at the time of battery production; in Table 6, indicated as negative electrode side surface of substrate) of a polyethylene microporous film having a thickness of 9 μm. That is, a gel electrolyte layer was formed only between the positive electrode and the separator. Except for this, a laminate film type battery was produced in the same manner as in Example 6'-1.

<Example 6'-4> to <Example 6'-6>

Laminate film type batteries of Example 6'-4 to Example 6'-6 were produced in the same manner as in Example 6'-1 to Example 6'-3, respectively, except that silicon was used as the negative electrode active material, and a negative electrode mix slurry having a configuration similar to that of Example 1'-13 was used.

<Example 6'-7> to <Example 6'-9>

Laminate film type batteries of Example 6'-7 to Example 6'-9 were produced in the same manner as in Example 6'-1 to Example 6'-3, respectively, except that a carbon-tin composite material was used as the negative electrode active material, and a negative electrode mix slurry having a configuration similar to that of Example 1'-25 was used.

<Example 6'-10> to <Example 6'-12>

Laminate film type batteries of Example 6'-10 to Example 6'-12 were produced in the same manner as in Example 6'-1 to Example 6'-3, respectively, except that lithium titanate was used as the negative electrode active material, and a negative electrode mix slurry having a configuration similar to that of Example 1'-37 was used.

Example 6'-13

A laminate film type battery was produced, in which the respective configurations of the positive electrode, the negative electrode, the separator, and the gel electrolyte layer were similar to those of Example 6'-1, and the laminated electrode assembly was sheathed with a soft laminate film. That is, the battery was configured to include a laminate film as the battery exterior material, a laminate type electrode assembly, and graphite as the negative electrode active material.

[Assembling of Laminate Film Type Battery]

A precursor solution similar to that of Example 6'-1 was applied on both surfaces of a rectangular-shaped positive electrode and a rectangular-shaped negative electrode, and the precursor solution was dried to remove the plasticizer. Thus, gel electrolyte layers were formed on the surfaces of the positive electrode and the negative electrode. Next, the rectangular-shaped positive electrode and negative electrode, and a rectangular-shaped separator were laminated in the order of the positive electrode (having a gel electrolyte layer formed on both surfaces), the separator, the negative electrode (having a gel electrolyte layer formed on both surfaces), and the separator, and thus a laminated electrode assembly was formed.

Next, the laminate electrode assembly was sheathed with a laminate film having a soft aluminum layer, and the edge from which the positive electrode terminal and the negative electrode terminal were led out, and other three edges around the laminate electrode assembly were tightly sealed by sealing by thermal fusion. Thereby, a laminate film type battery as illustrated in FIG. 5, having a battery shape that measured 37 mm in thickness, 49 mm in width, and 84 mm in height (374984 size), and a battery capacity of 2000 mAh, was produced.

<Example 6'-14> to <Example 6'-24>

Laminate film type batteries of Example 6'-14 to Example 6'-24 were produced in the same manner as in Example 6'-2 to Example 6'-12, respectively, except that the battery was configured to be a laminate film type battery similar to that of Example 6'-13.

Example 6'-25

A laminate film type battery was produced, in which the respective configurations of the positive electrode, the negative electrode, the separator, and the gel electrolyte layer were the same as those of Example 6'-1, and a wound electrode assembly was sheathed with a soft laminate film. That is, the battery was configured to include a laminate film as the battery exterior material, a flat wound type electrode assembly, and graphite as the negative electrode active material. Furthermore, a microporous film made of polyethylene and having a thickness of 9 μm was used as the separator. The method for assembling the laminate film type battery will be explained below.

[Assembling of Laminate Film Type Battery]

A precursor solution similar to that of Example 6'-1 was applied on both surfaces of a positive electrode and a negative electrode, and the precursor solution was dried to remove the plasticizer. Thus, gel electrolyte layers were formed on the surfaces of the positive electrode and the negative electrode. Next, the positive electrode, the negative electrode, and a separator were laminated in the order of the positive electrode (having a gel electrolyte layer formed on both surfaces), the separator, the negative electrode (having a gel electrolyte layer formed on both surfaces), and the separator, and the laminate was wound several times in the longitudinal direction in a flat shape. Subsequently, the winding end portion was fixed with an adhesive tape, and thereby a wound electrode assembly was formed.

Next, as illustrated in FIG. 7, the wound electrode assembly was sheathed with a soft laminate film having a soft aluminum layer and a hard laminate film having a hard aluminum layer, and the edge from which the positive electrode terminal and the negative electrode terminal were led out, and the other three edges around the wound electrode assembly were tightly sealed by sealing by thermal fusion under reduced pressure. Thereafter, two edges of the hard laminate film were formed into an elliptic cross-sectional shape by bringing the shorter edges of the hard laminate film into contact, the portions of the hard laminate film and the soft laminate film facing each other were pasted, and thus a battery cell was obtained. Subsequently, a positive electrode lead connected to the positive electrode, and a negative electrode lead connected to the negative electrode, were connected to a circuit board, and the circuit board was accommodated in a top cover. Lastly, the top cover and a bottom cover were respectively inserted and adhered to the battery cell, and thus a laminate film type battery as illustrated in FIG. 6, having a battery shape that measured 37 mm in thickness, 49 mm in width, and 87 mm in height (374987 size), and a battery capacity of 2000 mAh, was produced.

<Example 6'-26> to <Example 6'-36>

Laminate film type batteries of Example 6'-26 to Example 6'-36 were produced in the same manner as in Example 6'-2 to Example 6'-12, respectively, except that the battery was configured to be a laminate film type battery similar to that of Example 6'-25.

[Evaluation of Batteries: Short Circuit Test]

For the batteries of various Examples and various Comparative Examples thus produced, a short circuit test was carried out in the same manner as in Example 1-1.

The evaluation results are presented in the following Table 6.

TABLE 6

Heat absorbing layer: heat capacity per area: 0.0006 J/Kcm², heat capacity per volume: 0.4 J/Kcm³

| | Battery configuration | | | Negative | Gel electrolyte layer | |
|---|---|---|---|---|---|---|
| | battery exterior material | element shape | non-aqueous electrolyte | electrode active material | Inorganic particles | Resin material |
| Example 6-1 | Laminate film type (soft exterior material) | Flat wound type | Gel | Graphite | Boehmite | PVdF |
| Example 6-2 | | | | | | |
| Example 6-3 | | | | | | |
| Example 6-4 | | | | Silicon | | |
| Example 6-5 | | | | | | |
| Example 6-6 | | | | | | |
| Example 6-7 | | | | Carbon-tin composite | | |

TABLE 6-continued

Heat absorbing layer: heat capacity per area: 0.0006 J/Kcm², heat capacity per volume: 0.4 J/Kcm³

| | | | | | | |
|---|---|---|---|---|---|---|
| Example 6-8 | | | | | | |
| Example 6-9 | | | | material | | |
| Example 6-10 | | | | Lithium titanate | | |
| Example 6-11 | | | | | | |
| Example 6-12 | | | | | | |
| Example 6-13 | Laminate film type (soft exterior material) | Laminate type | Gel | Graphite | Boehmite | PVdF |
| Example 6-14 | | | | | | |
| Example 6-15 | | | | | | |
| Example 6-16 | Laminate film type (soft exterior material) | Laminate type | Gel | Silicon | Boehmite | PVdF |
| Example 6-17 | | | | | | |
| Example 6-18 | | | | | | |
| Example 6-19 | | | | Carbon-tin composite | | |
| Example 6-20 | | | | material | | |
| Example 6-21 | | | | | | |
| Example 6-22 | | | | Lithium titanate | | |
| Example 6-23 | | | | | | |
| Example 6-24 | | | | | | |
| Example 6-25 | Laminate film (hard exterior material + soft exterior material) | Flat wound type | Gel | Graphite | Boehmite | PVdF |
| Example 6-26 | | | | | | |
| Example 6-27 | | | | | | |
| Example 6-28 | | | | Silicon | | |
| Example 6-29 | | | | | | |
| Example 6-30 | | | | | | |
| Example 6-31 | Laminate film (hard exterior material + soft exterior material) | Flat wound type | Gel | Carbon-tin composite material | Boehmite | PVdF |
| Example 6-32 | | | | | | |
| Example 6-33 | | | | | | |
| Example 6-34 | | | | Lithium titanate | | |
| Example 6-35 | | | | | | |
| Example 6-36 | | | | | | |
| Example 6'-1 | Laminate film type (soft exterior material) | Flat wound type | Gel | Graphite | talc | PVdF |
| Example 6'-2 | | | | | | |
| Example 6'-3 | | | | | | |
| Example 6'-4 | | | | Silicon | | |
| Example 6'-5 | | | | | | |
| Example 6'-6 | | | | | | |
| Example 6'-7 | | | | Carbon-tin composite material | | |
| Example 6'-8 | | | | | | |
| Example 6'-9 | | | | | | |
| Example 6'-10 | | | | Lithium titanate | | |
| Example 6'-11 | | | | | | |
| Example 6'-12 | | | | | | |
| Example 6'-13 | Laminate film type (soft exterior material) | Laminate type | Gel | Graphite | talc | PVdF |
| Example 6'-14 | | | | | | |
| Example 6'-15 | | | | | | |
| Example 6'-16 | Laminate film type (soft exterior material) | Laminate type | Gel | Silicon | talc | PVdF |
| Example 6'-17 | | | | | | |
| Example 6'-18 | | | | | | |
| Example 6'-19 | | | | Carbon-tin composite material | | |
| Example 6'-20 | | | | | | |
| Example 6'-21 | | | | | | |
| Example 6'-22 | | | | Lithium titanate | | |
| Example 6'-23 | | | | | | |
| Example 6'-24 | | | | | | |
| Example 6'-25 | Laminate film (hard exterior material + soft exterior material) | Flat wound type | Gel | Graphite | talc | PVdF |
| Example 6'-26 | | | | | | |
| Example 6'-27 | | | | | | |
| Example 6'-28 | | | | Silicon | | |
| Example 6'-29 | | | | | | |
| Example 6'-30 | | | | | | |
| Example 6'-31 | Laminate film (hard exterior material + soft exterior material) | Flat wound type | Gel | Carbon-tin composite | talc | PVdF |

TABLE 6-continued

Heat absorbing layer: heat capacity per area: 0.0006 J/Kcm², heat capacity per volume: 0.4 J/Kcm³

| | | | |
|---|---|---|---|
| Example 6'-32 | exterior material) | | material |
| Example 6'-33 | | | |
| Example 6'-34 | | | Lithium titanate |
| Example 6'-35 | | | |
| Example 6'-36 | | | |

| | Gel electrolyte layer | | Short circuit test | |
|---|---|---|---|---|
| | Position of gel electrolyte layer | Thickness | Test result | Gas eruption |
| Example 6-1 | Both surfaces of substrate | 15 μm, with 7.5 μm each for single surface | 62° C. | No |
| Example 6-2 | Positive electrode side surface of substrate | 15 μm | 70° C. | No |
| Example 6-3 | Negative electrode side surface of substrate | 15 μm | 66° C. | No |
| Example 6-4 | Both surfaces of substrate | 15 μm, with 7.5 μm each for single surface | 72° C. | No |
| Example 6-5 | Positive electrode side surface of substrate | 15 μm | 80° C. | No |
| Example 6-6 | Negative electrode side surface of substrate | 15 μm | 76° C. | No |
| Example 6-7 | Both surfaces of substrate | 15 μm, with 7.5 μm each for single surface | 66° C. | No |
| Example 6-8 | Positive electrode side surface of substrate | 15 μm | 74° C. | No |
| Example 6-9 | Negative electrode side surface of substrate | 15 μm | 80° C. | No |
| Example 6-10 | Both surfaces of substrate | 15 μm, with 7.5 μm each for single surface | 64° C. | No |
| Example 6-11 | Positive electrode side surface of substrate | 15 μm | 72° C. | No |
| Example 6-12 | Negative electrode side surface of substrate | 15 μm | 68° C. | No |
| Example 6-13 | Both surfaces of substrate | 15 μm, with 7.5 μm each for single surface | 62° C. | No |
| Example 6-14 | Positive electrode side surface of substrate | 15 μm | 70° C. | No |
| Example 6-15 | Negative electrode side surface of substrate | 15 μm | 66° C. | No |
| Example 6-16 | Both surfaces of substrate | 15 μm, with 7.5 μm each for single surface | 72° C. | No |
| Example 6-17 | Positive electrode side surface of substrate | 15 μm | 80° C. | No |
| Example 6-18 | Negative electrode side surface of substrate | 15 μm | 76° C. | No |
| Example 6-19 | Both surfaces of substrate | 15 μm, with 7.5 μm each for single surface | 66° C. | No |
| Example 6-20 | Positive electrode side surface of substrate | 15 μm | 74° C. | No |
| Example 6-21 | Negative electrode side surface of substrate | 15 μm | 80° C. | No |
| Example 6-22 | Both surfaces of substrate | 15 μm, with 7.5 μm each for single surface | 64° C. | No |
| Example 6-23 | Positive electrode side surface of substrate | 15 μm | 72° C. | No |
| Example 6-24 | Negative electrode side surface of substrate | 15 μm | 68° C. | No |
| Example 6-25 | Both surfaces of substrate | 15 μm, with 7.5 μm each for single surface | 62° C. | No |
| Example 6-26 | Positive electrode side surface of substrate | 15 μm | 70° C. | No |
| Example 6-27 | Negative electrode side surface of substrate | 15 μm | 66° C. | No |
| Example 6-28 | Both surfaces of substrate | 15 μm, with 7.5 μm each for single surface | 72° C. | No |
| Example 6-29 | Positive electrode side surface of substrate | 15 μm | 80° C. | No |
| Example 6-30 | Negative electrode side surface of substrate | 15 μm | 76° C. | No |
| Example 6-31 | Both surfaces of substrate | 15 μm, with 7.5 μm each for single surface | 66° C. | No |

TABLE 6-continued

| | | Heat absorbing layer: heat capacity per area: 0.0006 J/Kcm², heat capacity per volume: 0.4 J/Kcm³ | | | |
|---|---|---|---|---|---|
| Example 6-32 | Positive electrode side surface of substrate | 15 μm | 74° C. | No |
| Example 6-33 | Negative electrode side surface of substrate | 15 μm | 80° C. | No |
| Example 6-34 | Both surfaces of substrate | 15 μm, with 7.5 μm each for single surface | 64° C. | No |
| Example 6-35 | Positive electrode side surface of substrate | 15 μm | 72° C. | No |
| Example 6-36 | Negative electrode side surface of substrate | 15 μm | 68° C. | No |
| Example 6'-1 | Both surfaces of substrate | 15.2 μm, with 7.6 μm each for single surface | 62° C. | No |
| Example 6'-2 | Positive electrode side surface of substrate | 15.2 μm | 70° C. | No |
| Example 6'-3 | Negative electrode side surface of substrate | 15.2 μm | 66° C. | No |
| Example 6'-4 | Both surfaces of substrate | 15.2 μm, with 7.6 μm each for single surface | 72° C. | No |
| Example 6'-5 | Positive electrode side surface of substrate | 15.2 μm | 80° C. | No |
| Example 6'-6 | Negative electrode side surface of substrate | 15.2 μm | 76° C. | No |
| Example 6'-7 | Both surfaces of substrate | 15.2 μm, with 7.6 μm each for single surface | 66° C. | No |
| Example 6'-8 | Positive electrode side surface of substrate | 15.2 μm | 74° C. | No |
| Example 6'-9 | Negative electrode side surface of substrate | 15.2 μm | 80° C. | No |
| Example 6'-10 | Both surfaces of substrate | 15.2 μm, with 7.6 μm each for single surface | 64° C. | No |
| Example 6'-11 | Positive electrode side surface of substrate | 15.2 μm | 72° C. | No |
| Example 6'-12 | Negative electrode side surface of substrate | 15.2 μm | 68° C. | No |
| Example 6'-13 | Both surfaces of substrate | 15.2 μm, with 7.6 μm each for single surface | 62° C. | No |
| Example 6'-14 | Positive electrode side surface of substrate | 15.2 μm | 70° C. | No |
| Example 6'-15 | Negative electrode side surface of substrate | 15.2 μm | 66° C. | No |
| Example 6'-16 | Both surfaces of substrate | 15.2 μm, with 7.6 μm each for single surface | 72° C. | No |
| Example 6'-17 | Positive electrode side surface of substrate | 15.2 μm | 80° C. | No |
| Example 6'-18 | Negative electrode side surface of substrate | 15.2 μm | 76° C. | No |
| Example 6'-19 | Both surfaces of substrate | 15.2 μm, with 7.6 μm each for single surface | 66° C. | No |
| Example 6'-20 | Positive electrode side surface of substrate | 15.2 μm | 74° C. | No |
| Example 6'-21 | Negative electrode side surface of substrate | 15.2 μm | 80° C. | No |
| Example 6'-22 | Both surfaces of substrate | 15.2 μm, with 7.6 μm each for single surface | 64° C. | No |
| Example 6'-23 | Positive electrode side surface of substrate | 15.2 μm | 72° C. | No |
| Example 6'-24 | Negative electrode side surface of substrate | 15.2 μm | 68° C. | No |
| Example 6'-25 | Both surfaces of substrate | 15.2 μm, with 7.6 μm each for single surface | 62° C. | No |
| Example 6'-26 | Positive electrode side surface of substrate | 15.2 μm | 70° C. | No |
| Example 6'-27 | Negative electrode side surface of substrate | 15.2 μm | 66° C. | No |
| Example 6'-28 | Both surfaces of substrate | 15.2 μm, with 7.6 μm each for single surface | 72° C. | No |
| Example 6'-29 | Positive electrode side surface of substrate | 15.2 μm | 80° C. | No |
| Example 6'-30 | Negative electrode side surface of substrate | 15.2 μm | 76° C. | No |
| Example 6'-31 | Both surfaces of substrate | 15.2 μm, with 7.6 μm each for single surface | 66° C. | No |
| Example 6'-32 | Positive electrode side surface of substrate | 15.2 μm | 74° C. | No |
| Example 6'-33 | Negative electrode side surface of substrate | 15.2 μm | 80° C. | No |

TABLE 6-continued

Heat absorbing layer: heat capacity per area: 0.0006 J/Kcm², heat capacity per volume: 0.4 J/Kcm³

| | | | | |
|---|---|---|---|---|
| Example 6'-34 | Both surfaces of substrate | 15.2 μm, with 7.6 μm each for single surface | 64° C. | No |
| Example 6'-35 | Positive electrode side surface of substrate | 15.2 μm | 72° C. | No |
| Example 6'-36 | Negative electrode side surface of substrate | 15.2 μm | 68° C. | No |

As can be seen from Table 6, in the case of batteries including a gel electrolyte layer that had been produced so as to have a total heat capacity per unit area of 0.0006 J/Kcm² and a total heat capacity per unit volume of 0.4 J/Kcm³, the batteries had a low heat generation temperature in the short circuit test, such as 80° C. or lower, and were highly safe, irrespective of the battery configuration.

Particularly, from Example 6-1 to Example 6-3 and Example 6'-1 to Example 6'-3, batteries provided with a gel electrolyte layer both between the positive electrode and the separator and between the negative electrode and the separator exhibited highest safety. Furthermore, it was found that in a case in which the gel electrolyte layer is provided between the positive electrode and the separator, or between the negative electrode and the separator, it is more effective to provide the gel electrolyte layer between the negative electrode and the separator, rather than to provide the gel electrolyte layer between the positive electrode and the separator.

<Example 7-1> to <Example 7-94>

Example 7-1

A laminate film type battery was produced in the same manner as in Example 1-1, in which boehmite having a spherical particle shape ("length of major axis"/"length of minor axis"=1) was used as the heat absorbent particles. Meanwhile, the ratio of the particle shape ("length of major axis"/"length of minor axis") was determined as follows. Fifty particles were randomly selected, and each of the inorganic particles selected was three-dimensionally observed by scanning electron microscope. Thereby, the ratio of each inorganic particle ("length of major axis"/"length of minor axis") was obtained from the length of the longest part (length of major axis) of each inorganic particle, and the length of the shortest part of each inorganic particle that was perpendicular to the major axis (length of minor axis (thickness or fiber thickness)). Then, an average value of these was designated as the ratio ("length of major axis"/"length of minor axis") of Example 7-1 (the same applies to the following Examples).

Example 7-2

A laminate film type battery was produced in the same manner as in Example 7-1, except that boehmite having a plate-like particle shape (length:thickness=3:1, that is, "length of major axis"/"length of minor axis"=3) was used as the heat absorbent particles.

Example 7-3

A laminate film type battery was produced in the same manner as in Example 7-1, except that boehmite having a needle-like particle shape (length:thickness=3:1, that is, "length of major axis"/"length of minor axis"=3) was used as the heat absorbent particles.

<Example 7-4> to <Example 7-6>

In Example 7-4, aluminum nitride having a spherical particle shape ("length of major axis"/"length of minor axis"=1) was used as the heat absorbent particles. In Example 7-5, aluminum nitride having a plate-like particle shape (length:thickness=3:1, that is, "length of major axis"/"length of minor axis"=3) was used as the heat absorbent particles. In Example 7-6, aluminum nitride having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-7> to <Example 7-9>

In Example 7-7, boron nitride having a spherical particle shape ("length of major axis"/"length of minor axis"=1) was used as the heat absorbent particles. In Example 7-8, boron nitride having a plate-like particle shape (length:thickness=3:1, that is, "length of major axis"/"length of minor axis"=3) was used as the heat absorbent particles. In Example 7-9, boron nitride having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-10> to <Example 7-12>

In Example 7-10, silicon carbide having a spherical particle shape ("length of major axis"/"length of minor axis"=1) was used as the heat absorbent particles. In Example 7-11, silicon carbide having a plate-like particle shape (length:thickness=3:1, that is, "length of major axis"/"length of minor axis"=3) was used as the heat absorbent particles. In Example 7-12, silicon carbide having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-13> to <Example 7-15>

In Example 7-13, talc having a spherical particle shape ("length of major axis"/"length of minor axis"=1) was used as the heat absorbent particles. In Example 7-14, talc having a plate-like particle shape (length:thickness=3:1, that is, "length of major axis"/"length of minor axis"=3) was used as the heat absorbent particles. In Example 7-15, talc having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-16> to <Example 7-18>

In Example 7-16, $Li_2O_4$ having a spherical particle shape ("length of major axis"/"length of minor axis"=1) was used as the heat absorbent particles. In Example 7-17, $Li_2O_4$ having a plate-like particle shape (length:thickness=3:1, that is, "length of major axis"/"length of minor axis"=3) was used as the heat absorbent particles. In Example 7-18, $Li_2O_4$ having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-19> to <Example 7-21>

In Example 7-19, $Li_3PO_4$ having a spherical particle shape ("length of major axis"/"length of minor axis"=1) was used as the heat absorbent particles. In Example 7-20, $Li_3PO_4$ having a plate-like particle shape (length:thickness=3:1, that is, "length of major axis"/"length of minor axis"=3) was used as the heat absorbent particles. In Example 7-21, $Li_3PO_4$ having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-22> to <Example 7-24>

In Example 7-22, LiF having a spherical particle shape ("length of major axis"/"length of minor axis"=1) was used as the heat absorbent particles. In Example 7-23, LiF having a plate-like particle shape (length:thickness=3:1, that is, "length of major axis"/"length of minor axis"=3) was used as the heat absorbent particles. In Example 7-24, LiF having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-25> to <Example 7-27>

In Example 7-25, diamond having a spherical particle shape ("length of major axis"/"length of minor axis"=1) was used as the heat absorbent particles. In Example 7-26, diamond having a plate-like particle shape (length:thickness=3:1, that is, "length of major axis"/"length of minor axis"=3) was used as the heat absorbent particles. In Example 7-27, diamond having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-28> to <Example 7-30>

In Example 7-28, zirconia having a spherical particle shape ("length of major axis"/"length of minor axis"=1) was used as the heat absorbent particles. In Example 7-29, zirconia having a plate-like particle shape (length:thickness=3:1, that is, "length of major axis"/"length of minor axis"=3) was used as the heat absorbent particles. In Example 7-30, zirconia having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-31> to <Example 7-33>

In Example 7-31, yttrium oxide having a spherical particle shape ("length of major axis"/"length of minor axis"=1) was used as the heat absorbent particles. In Example 7-32, yttrium oxide having a plate-like particle shape (length:thickness=3:1, that is, "length of major axis"/"length of minor axis"=3) was used as the heat absorbent particles. In Example 7-33, yttrium oxide having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-34> to <Example 7-36>

In Example 7-34, barium titanate having a spherical particle shape ("length of major axis"/"length of minor axis"=1) was used as the heat absorbent particles. In Example 7-35, barium titanate having a plate-like particle shape (length:thickness=3:1, that is, "length of major axis"/"length of minor axis"=3) was used as the heat absorbent particles. In Example 7-36, barium titanate having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-37> to <Example 7-39>

In Example 7-37, strontium titanate having a spherical particle shape ("length of major axis"/"length of minor axis"=1) was used as the heat absorbent particles. In Example 7-38, strontium titanate having a plate-like particle shape (length:thickness=3:1, that is, "length of major axis"/"length of minor axis"=3) was used as the heat absorbent particles. In Example 7-39, strontium titanate having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-40> to <Example 7-42>

In Example 7-40, silicon oxide having a spherical particle shape ("length of major axis"/"length of minor axis"=1) was used as the heat absorbent particles. In Example 7-41, silicon oxide having a plate-like particle shape (length:thickness=3:1, that is, "length of major axis"/"length of minor axis"=3) was used as the heat absorbent particles. In Example 7-42, silicon oxide having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-43> to <Example 7-45>

In Example 7-43, zeolite having a spherical particle shape ("length of major axis"/"length of minor axis"=1) was used as the heat absorbent particles. In Example 7-44, zeolite having a plate-like particle shape (length:thickness=3:1, that is, "length of major axis"/"length of minor axis"=3) was used as the heat absorbent particles. In Example 7-45, zeolite having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-46> to <Example 7-48>

In Example 7-46, barium sulfate having a spherical particle shape ("length of major axis"/"length of minor axis"=1) was used as the heat absorbent particles. In Example 7-47, barium sulfate having a plate-like particle shape (length:thickness=3:1, that is, "length of major axis"/"length of minor axis"=3) was used as the heat absorbent particles. In Example 7-48, barium sulfate having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-49> to <Example 7-51>

In Example 7-49, titanium oxide having a spherical particle shape ("length of major axis"/"length of minor axis"=1) was used as the heat absorbent particles. In Example 7-50, titanium oxide having a plate-like particle shape (length:thickness=3:1, that is, "length of major axis"/"length of minor axis"=3) was used as the heat absorbent particles. In Example 7-51, titanium oxide having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-52> to <Example 7-54>

In Example 7-52, magnesium oxide having a spherical particle shape ("length of major axis"/"length of minor axis"=1) was used as the heat absorbent particles. In Example 7-53, magnesium oxide having a plate-like particle shape (length:thickness=3:1, that is, "length of major axis"/"length of minor axis"=3) was used as the heat absorbent particles. In Example 7-54, magnesium oxide having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-55> to <Example 7-57>

In Example 7-55, graphite having a spherical particle shape ("length of major axis"/"length of minor axis"=1) was used as the heat absorbent particles. In Example 7-56, graphite having a plate-like particle shape (length:thickness=3:1, that is, "length of major axis"/"length of minor axis"=3) was used as the heat absorbent particles. In Example 7-57, graphite having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

Example 7-58

A laminate film type battery was produced in the same manner as in Example 7-1, except that carbon nanotubes having a needle-like particle shape (length:thickness=3:1, that is, "length of major axis"/"length of minor axis"=10) were used as the heat absorbent particles.

<Example 7-59> to <Example 7-61>

In Example 7-59, aluminum hydroxide having a spherical particle shape ("length of major axis"/"length of minor axis"=1) was used as the heat absorbent particles. In Example 7-60, aluminum hydroxide having a plate-like particle shape (length:thickness=3:1, that is, "length of major axis"/"length of minor axis"=3) was used as the heat absorbent particles. In Example 7-61, aluminum hydroxide having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-62> to <Example 7-64>

In Example 7-62, boron carbide having a spherical particle shape ("length of major axis"/"length of minor axis"=1) was used as the heat absorbent particles. In Example 7-63, boron carbide having a plate-like particle shape (length:thickness=3:1, that is, "length of major axis"/"length of minor axis"=3) was used as the heat absorbent particles. In Example 7-64, boron carbide having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-65> to <Example 7-67>

In Example 7-65, silicon nitride having a spherical particle shape ("length of major axis"/"length of minor axis"=1) was used as the heat absorbent particles. In Example 7-66, silicon nitride having a plate-like particle shape (length:thickness=3:1, that is, "length of major axis"/"length of minor axis"=3) was used as the heat absorbent particles. In Example 7-67, silicon nitride having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-68> to <Example 7-70>

In Example 7-68, titanium nitride having a spherical particle shape ("length of major axis"/"length of minor axis"=1) was used as the heat absorbent particles. In Example 7-69, titanium nitride having a plate-like particle shape (length:thickness=3:1, that is, "length of major axis"/"length of minor axis"=3) was used as the heat absorbent particles. In Example 7-70, titanium nitride having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-71> to <Example 7-73>

In Example 7-71, zinc oxide having a spherical particle shape ("length of major axis"/"length of minor axis"=1) was used as the heat absorbent particles. In Example 7-72, zinc oxide having a plate-like particle shape (length:thickness=3:1, that is, "length of major axis"/"length of minor axis"=3) was used as the heat absorbent particles. In Example 7-73, zinc oxide having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-74> to <Example 7-76>

In Example 7-74, alumina having a spherical particle shape ("length of major axis"/"length of minor axis"=1) was used as the heat absorbent particles. In Example 7-75, alumina having a plate-like particle shape (length:thickness=3:1, that is, "length of major axis"/"length of minor axis"=3) was used as the heat absorbent particles. In Example 7-76, alumina having a needle-like particle shape (length:thickness=3:1, that is, "length of major axis"/"length of minor axis"=3) was used as the heat absorbent particles. Laminate film type batteries were produced in the same manner as in Example 7-1, except for the above-described matter.

<Example 7-77> to <Example 7-79>

In Example 7-77, olivine having a spherical particle shape ("length of major axis"/"length of minor axis"=1) was used as the heat absorbent particles. In Example 7-78, olivine having a sheet-like particle shape (length:thickness=3:1, that is, "length of major axis"/"length of minor axis"=3) was used as the heat absorbent particles. In Example 7-79, olivine having a needle-like particle shape (length:thickness=3:1, that is, "length of major axis"/"length of minor axis"=3) was used as the heat absorbent particles. Except for this, laminate film type batteries were produced in the same manner as in Example 7-1.

<Example 7-80> to <Example 7-82>

In Example 7-80, montmorillonite having a spherical particle shape ("length of major axis"/"length of minor axis"=1) was used as the heat absorbent particles. In Example 7-81, montmorillonite having a sheet-like particle shape (length:thickness=3:1, that is, "length of major axis"/"length of minor axis"=3) was used as the heat absorbent particles. In Example 7-82, montmorillonite having a needle-like particle shape (length:thickness=3:1, that is, "length of major axis"/"length of minor axis"=3) was used as the heat absorbent particles. Except for this, laminate film type batteries were produced in the same manner as in Example 7-1.

<Example 7-83> to <Example 7-85>

In Example 7-83, zeolite having a spherical particle shape ("length of major axis"/"length of minor axis"=1) was used as the heat absorbent particles. In Example 7-84, zeolite having a sheet-like particle shape (length:thickness=3:1, that is, "length of major axis"/"length of minor axis"=3) was used as the heat absorbent particles. In Example 7-85, zeolite having a needle-like particle shape (length:thickness=3:1, that is, "length of major axis"/"length of minor axis"=3) was used as the heat absorbent particles. Except for this, laminate film type batteries were produced in the same manner as in Example 7-1.

<Example 7-86> to <Example 7-88>

In Example 7-86, mullite having a spherical particle shape ("length of major axis"/"length of minor axis"=1) was used as the heat absorbent particles. In Example 7-87, mullite having a sheet-like particle shape (length:thickness=3:1, that is, "length of major axis"/"length of minor axis"=3) was used as the heat absorbent particles. In Example 7-88, mullite having a needle-like particle shape (length:thickness=3:1, that is, "length of major axis"/"length of minor axis"=3) was used as the heat absorbent particles. Except for this, laminate film type batteries were produced in the same manner as in Example 7-1.

<Example 7-89> to <Example 7-91>

In Example 7-89, kaolinite having a spherical particle shape ("length of major axis"/"length of minor axis"=1) was used as the heat absorbent particles. In Example 7-90, kaolinite having a sheet-like particle shape (length:thickness=3:1, that is, "length of major axis"/"length of minor axis"=3) was used as the heat absorbent particles. In Example 7-91, kaolinite having a needle-like particle shape (length:thickness=3:1, that is, "length of major axis"/"length of minor axis"=3) was used as the heat absorbent particles. Except for this, laminate film type batteries were produced in the same manner as in Example 7-1.

<Example 7-92> to <Example 7-94>

In Example 7-92, imogolite having a spherical particle shape ("length of major axis"/"length of minor axis"=1) was used as the heat absorbent particles. In Example 7-93, imogolite having a sheet-like particle shape (length:thickness=3:1, that is, "length of major axis"/"length of minor axis"=3) was used as the heat absorbent particles. In Example 7-94, imogolite having a needle-like particle shape (length:thickness=3:1, that is, "length of major axis"/"length of minor axis"=3) was used as the heat absorbent particles. Except for this, laminate film type batteries were produced in the same manner as in Example 7-1.

[Evaluation of Batteries: Short Circuit Test]

For the batteries of various Examples and various Comparative Examples thus produced, a short circuit test was carried out in the same manner as in Example 1-1.

The evaluation results are presented in the following Table 7.

TABLE 7

Heat absorbing layer: heat capacity per area:
0.0006 J/Kcm², heat capacity per volume: 0.4 J/Kcm³

| | Negative electrode active material | Gel electrolyte layer | | Short circuit test | |
|---|---|---|---|---|---|
| | | Inorganic particles | Particle shape | Heat generation temperature | Gas eruption |
| Example 7-1 | Graphite | Boehmite | Spherical shape | 62° C. | No |
| Example 7-2 | | Specific heat capacity: 1.2 J/gK | Plate shape length:thickness = 3:1 | 58° C. | No |
| Example 7-3 | | | Needle shape length:thickness = 3:1 | 55° C. | No |
| Example 7-4 | | Aluminum nitride | Spherical shape | 62° C. | No |
| Example 7-5 | | Specific heat capacity: 0.7 J/gK | Plate shape length:thickness = 3:1 | 58° C. | No |
| Example 7-6 | | | Needle shape length:thickness = 3:1 | 55° C. | No |
| Example 7-7 | | Boron nitride | Spherical shape | 69° C. | No |
| Example 7-8 | | Specific heat capacity: 0.8 J/gK | Plate shape length:thickness = 3:1 | 65° C. | No |
| Example 7-9 | | | Needle shape length:thickness = 3:1 | 62° C. | No |
| Example 7-10 | | Silicon carbide | Spherical shape | 62° C. | No |
| Example 7-11 | | Specific heat capacity: 0.7 J/gK | Plate shape length:thickness = 3:1 | 58° C. | No |
| Example 7-12 | | | Needle shape length:thickness = 3:1 | 55° C. | No |
| Example 7-13 | | Talc | Spherical shape | 62° C. | No |
| Example 7-14 | | Specific heat capacity: 1.1 J/gK | Plate shape length:thickness = 3:1 | 58° C. | No |
| Example 7-15 | | | Needle shape length:thickness = 3:1 | 55° C. | No |
| Example 7-16 | | $Li_2O_4$ | Spherical shape | 69° C. | No |
| Example 7-17 | | Specific heat capacity: 0.8 J/gK | Plate shape length:thickness = 3:1 | 65° C. | No |
| Example 7-18 | | | Needle shape length:thickness = 3:1 | 62° C. | No |
| Example 7-19 | | $Li_3PO_4$ | Spherical shape | 69° C. | No |
| Example 7-20 | | Specific heat capacity: 0.8 J/gK | Plate shape length:thickness = 3:1 | 65° C. | No |
| Example 7-21 | | | Needle shape length:thickness = 3:1 | 62° C. | No |
| Example 7-22 | | LiF | Spherical shape | 69° C. | No |
| Example 7-23 | | Specific heat capacity: 0.9 J/gK | Plate shape length:thickness = 3:1 | 65° C. | No |
| Example 7-24 | | | Needle shape length:thickness = 3:1 | 62° C. | No |
| Example 7-25 | | Diamond | Spherical shape | 69° C. | No |
| Example 7-26 | | Specific heat capacity: 0.5 J/gK | Plate shape length:thickness = 3:1 | 65° C. | No |
| Example 7-27 | | | Needle shape length:thickness = 3:1 | 62° C. | No |
| Example 7-28 | | Zirconia | Spherical shape | 61° C. | No |
| Example 7-29 | | Specific heat capacity: 0.7 J/gK | Plate shape length:thickness = 3:1 | 57° C. | No |
| Example 7-30 | | | Needle shape length:thickness = 3:1 | 54° C. | No |
| Example 7-31 | | Yttrium oxide Specific heat capacity: 0.5 J/gK | Spherical shape | 68° C. | No |
| Example 7-32 | Graphite | Yttrium oxide Specific heat capacity: 0.5 J/gK | Plate shape length:thickness = 3:1 | 64° C. | No |
| Example 7-33 | | | Needle shape length:thickness = 3:1 | 61° C. | No |
| Example 7-34 | | Barium titanate | Spherical shape | 63° C. | No |
| Example 7-35 | | Specific heat capacity: 0.8 J/gK | Plate shape length:thickness = 3:1 | 59° C. | No |
| Example 7-36 | | | Needle shape length:thickness = 3:1 | 56° C. | No |
| Example 7-37 | | Strontium titanate | Spherical shape | 68° C. | No |
| Example 7-38 | | Specific heat capacity: 0.8 J/gK | Plate shape length:thickness = 3:1 | 64° C. | No |
| Example 7-39 | | | Needle shape length:thickness = 3:1 | 61° C. | No |
| Example 7-40 | | Silicon oxide | Spherical shape | 63° C. | No |
| Example 7-41 | | Specific heat capacity: 0.8 J/gK | Plate shape length:thickness = 3:1 | 59° C. | No |

TABLE 7-continued

Heat absorbing layer: heat capacity per area:
0.0006 J/Kcm², heat capacity per volume: 0.4 J/Kcm³

| | Negative electrode active material | Gel electrolyte layer | | Short circuit test | |
|---|---|---|---|---|---|
| | | Inorganic particles | Particle shape | Heat generation temperature | Gas eruption |
| Example 7-42 | | | Needle shape length:thickness = 3:1 | 56° C. | No |
| Example 7-43 | | Zeolite | Spherical shape | 69° C. | No |
| Example 7-44 | | Specific heat capacity: 1.0 J/gK | Plate shape length:thickness = 3:1 | 58° C. | No |
| Example 7-45 | | | Needle shape length:thickness = 3:1 | 55° C. | No |
| Example 7-46 | | Barium sulfate | Spherical shape | 69° C. | No |
| Example 7-47 | | Specific heat capacity: 0.9 J/gK | Plate shape length:thickness = 3:1 | 65° C. | No |
| Example 7-48 | | | Needle shape length:thickness = 3:1 | 62° C. | No |
| Example 7-49 | | Titanium oxide | Spherical shape | 62° C. | No |
| Example 7-50 | | Specific heat capacity: 0.8 J/gK | Plate shape length:thickness = 3:1 | 58° C. | No |
| Example 7-51 | | | Needle shape length:thickness = 3:1 | 55° C. | No |
| Example 7-52 | | Magnesium oxide | Spherical shape | 62° C. | No |
| Example 7-53 | | Specific heat capacity: 1.0 J/gK | Plate shape length:thickness = 3:1 | 58° C. | No |
| Example 7-54 | | | Needle shape length:thickness = 3:1 | 55° C. | No |
| Example 7-55 | | Graphite | Spherical shape | 69° C. | No |
| Example 7-56 | | Specific heat capacity: 0.8 J/gK | Plate shape length:thickness = 3:1 | 65° C. | No |
| Example 7-57 | | | Needle shape length:thickness = 3:1 | 62° C. | No |
| Example 7-58 | | Carbon nanotubes Specific heat capacity: 0.8 J/gK | Needle shape length:thickness = 10:1 | 69° C. | No |
| Example 7-59 | | Aluminum hydroxide | Spherical shape | 69° C. | No |
| Example 7-60 | | Specific heat capacity: 1.5 J/gK | Plate shape length:thickness = 3:1 | 65° C. | No |
| Example 7-61 | | | Needle shape length:thickness = 3:1 | 62° C. | No |
| Example 7-62 | | Boron carbide Specific heat capacity: 1.0 J/gK | Spherical shape | 69° C. | No |
| Example 7-63 | Graphite | Boron carbide Specific heat capacity: 1.0 J/gK | Plate shape length:thickness = 3:1 | 65° C. | No |
| Example 7-64 | | | Needle shape length:thickness = 3:1 | 62° C. | No |
| Example 7-65 | | Silicon nitride | Spherical shape | 69° C. | No |
| Example 7-66 | | Specific heat capacity: 0.7 J/gK | Plate shape length:thickness = 3:1 | 65° C. | No |
| Example 7-67 | | | Needle shape length:thickness = 3:1 | 62° C. | No |
| Example 7-68 | | Titanium nitride | Spherical shape | 69° C. | No |
| Example 7-69 | | Specific heat capacity: 0.6 J/gK | Plate shape length:thickness = 3:1 | 65° C. | No |
| Example 7-70 | | | Needle shape length:thickness = 3:1 | 62° C. | No |
| Example 7-71 | | Zinc oxide | Spherical shape | 69° C. | No |
| Example 7-72 | | Specific heat capacity: 0.5 J/gK | Plate shape length:thickness = 3:1 | 65° C. | No |
| Example 7-73 | | | Needle shape length:thickness = 3:1 | 62° C. | No |
| Example 7-74 | | Aluminum oxide | Spherical shape | 69° C. | No |
| Example 7-75 | | Specific heat capacity: 0.8 J/gK | Plate shape length:thickness = 3:1 | 65° C. | No |
| Example 7-76 | | | Needle shape length:thickness = 3:1 | 62° C. | No |
| Example 7-77 | | Olivine | Spherical shape | 62° C. | No |
| Example 7-78 | | Specific heat capacity: 0.8 J/gK | Plate shape | 58° C. | No |
| Example 7-79 | | | length:thickness = 3:1 | 55° C. | No |
| Example 7-80 | | Montmorillonite | Spherical shape | 62° C. | No |
| Example 7-81 | | Specific heat capacity: 0.7 J/gK | Plate shape | 58° C. | No |
| Example 7-82 | | | length:thickness = 3:1 | 55° C. | No |
| Example 7-83 | | Zeolite | Spherical shape | 62° C. | No |
| Example 7-84 | | Specific heat capacity: | | 58° C. | No |

TABLE 7-continued

Heat absorbing layer: heat capacity per area:
0.0006 J/Kcm², heat capacity per volume: 0.4 J/Kcm³

| | Negative electrode active material | Gel electrolyte layer | | Short circuit test | |
|---|---|---|---|---|---|
| | | Inorganic particles | Particle shape | Heat generation temperature | Gas eruption |
| Example 7-85 | | 0.6 J/gK | | 55° C. | No |
| Example 7-86 | | Mullite | Spherical shape | 62° C. | No |
| Example 7-87 | | Specific heat capacity: | Plate shape | 58° C. | No |
| Example 7-88 | | 0.8 J/gK | length:thickness = 3:1 | 55° C. | No |
| Example 7-89 | | Kaolinite | Spherical shape | 62° C. | No |
| Example 7-90 | | Specific heat capacity: | Plate shape | 58° C. | No |
| Example 7-91 | | 0.7 J/gK | length:thickness = 3:1 | 55° C. | No |
| Example 7-92 | | Imogolite | Spherical shape | 62° C. | No |
| Example 7-93 | | Specific heat capacity: | | 58° C. | No |
| Example 7-94 | | 0.8 J/gK | | 55° C. | No |

As can be seen from Table 7, higher safety was obtained in the case of using heat absorbent particles whose particle shape was an anisotropic shape such as a needle shape or a plate shape, compared to the case of using heat absorbent particles having a spherical particle shape.

5. Other Embodiments

Thus, the present technology has been described by way of various embodiments and Examples; however, the present technology is not intended to be limited to these, and various modifications can be made within the scope of the gist of the present technology.

For example, the numerical values, structures, shapes, materials, raw materials, production processes and the like mentioned in the embodiments and Examples described above are only for illustrative purposes, and if necessary, numerical values, structures, shapes, materials, raw materials, production processes and the like different from these may also be used.

Furthermore, the configurations, methods, processes, shapes, materials, numerical values and the like of the embodiments and Examples described above can be combined with one another, as long as the gist of the present technology is maintained.

For example, the thickness of the gel electrolyte layer and the compositions of various materials may be set in accordance with the configurations of the positive electrode and the negative electrode. Furthermore, the non-aqueous electrolyte battery may be a primary battery. Furthermore, the non-aqueous electrolyte battery may be a primary battery.

Furthermore, in the embodiments and Examples, when the battery structure is a laminate film type, the case in which the electrode assembly has a wound structure or a laminated structure has been explained as an example; however, the present technology is not intended to be limited to these. The electrolyte layer of the present technology is similarly applicable even to the cases of other battery structures such as a laminate film type, a coin type, a rectangular type or a button type.

First example to third example of other electrolyte layers composed of the following electrolytes may also be used instead of the gel electrolyte layer described above. Regarding a first example of other electrolyte layers, for example, a solid electrolyte layer containing heat absorbent particles, an ion-conductive polymer material and an electrolyte salt, which is constructed from a solid electrolyte having ion conductivity using the ion-conductive polymer material and the electrolyte salt, may also be used. Examples of the ion-conductive polymer material include polyether, polyester, polyphosphazene, and polysiloxane. Regarding a second example of other electrolyte layers, for example, a solid electrolyte layer containing heat absorbent particles and an ion-conductive polymer material, which is constructed from a solid electrolyte having ion conductivity using the polymer material, may also be used. Regarding a third example of other electrolyte layers, a solid electrolyte layer containing heat absorbent particles and an ion-conductive inorganic material, which is constructed from a solid electrolyte having ion conductivity using the inorganic material, may also be used. Examples of the ion-conductive inorganic material include ion-conductive ceramics, ion-conductive crystals, and ion-conductive glasses. In the first to third examples of the other electrolyte layers, the heat capacity per unit area of the electrolyte layer is 0.0001 J/Kcm² or more, and the heat capacity per unit volume is 3.0 J/Kcm³ or less.

Meanwhile, the present invention may also adopt the following configurations.

[1]

A battery including:

a positive electrode;

a negative electrode; and an electrolyte layer formed from a gel-like electrolyte containing particles, a liquid electrolyte, and a resin material for retaining the liquid electrolyte, or a solid electrolyte containing particles, the electrolyte layer being disposed between the positive electrode and the negative electrode, wherein the electrolyte layer has a heat capacity per unit area of 0.0001 J/Kcm² or more and a heat capacity per unit volume of 3.0 J/Kcm³ or less.

[2]

The battery according to [1], further including a separator provided between the positive electrode and the negative electrode, wherein the electrolyte layer is disposed at least one of between the positive electrode and the separator, and between the negative electrode and the separator.

[3]

The battery according to [1] or [2], wherein the particles are present in a dispersed state in the electrolyte layer.

[4]

The battery according to any of [1] to [3], wherein the specific heat capacity of the particles is 0.5 J/gK or more.

[5]

The battery according to any of [1] to [4], wherein the particles contain at least one selected from alumina, boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a silicic acid salt, $Li_2O_4$, $Li_3PO_4$, LiF, aluminum hydroxide, graphite, carbon nanotubes, and diamond.

[6]

The battery according to [5], wherein the silicic acid salt is at least one selected from a nesosilicate mineral, a sorosilicate mineral, a cyclosilicate mineral, an inosilicate mineral, a phyllosilicate mineral, a tectosilicate mineral, an asbestos, sepiolite, and imogolite.

[7]

The battery according to [6], wherein the nesosilicate mineral is at least one selected from olivine and mullite, the phyllosilicate mineral is at least one selected from talc, montmorillonite, and kaolinite, and the tectosilicate mineral is zeolite.

[8]

The battery according to any of [1] to [7], wherein the shape of the particles is a shape having anisotropy.

[9]

The battery according to [8], wherein the ratio of the length of the longest part of the particle and the length of the shortest part of the particle in a direction perpendicular to the longest part ("length of the longest part"/{length of the shortest part}) is 3 times or more.

[10]

The battery according to any of [1] to [9], wherein at least one of the melting point and the glass transition temperature of the resin material is 180° C. or higher.

[11]

The battery according to [10], wherein the resin material is polyvinylidene fluoride.

[12]

The battery according to any of [1] to [11], wherein a negative electrode active material included in the negative electrode is formed from a material containing at least one of a metal element and a semimetal element as a constituent element.

[13]

An electrolyte layer formed from a gel-like electrolyte containing particles, a liquid electrolyte, and a resin material for retaining the liquid electrolyte, or from a solid electrolyte containing particles, the electrolyte layer having a heat capacity per unit area of 0.0001 $J/Kcm^2$ or more and a heat capacity per unit volume of 3.0 $J/Kcm^3$ or less.

[14]

A battery pack including:

the battery according to any of [1] to [11];

a control unit controlling the battery; and an exterior material enclosing the battery.

[15]

An electronic apparatus including the battery according to any of [1] to [11], and receiving the supply of electric power from the battery.

[16]

An electric vehicle including:

the battery according to any of [1] to [11], a conversion device receiving the supply of electric power from the battery and converting the electric power to the driving force for the vehicle; and a control device performing information processing in connection with the vehicle control, based on information on the battery.

[17]

A power storage device including the battery according to any of [1] to [11], and supplying electric power to an electronic apparatus connected to the battery.

[18]

The power storage device according to [17], including an electric power information control device transmitting and receiving signals to and from another apparatus through a network, and performing charge-discharge control of the battery based on information received by the electric power information control device.

[19]

An electric power system receiving the supply of electric power from the battery according to any of [1] to [11], or supplying electric power from a power generation device or an electric power network to the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

50 Wound electrode assembly
51 Positive electrode lead
52 Negative electrode lead
53 Positive electrode
53A Positive electrode current collector
53B Positive electrode active material layer
54 Negative electrode
54A Negative electrode current collector
54B Negative electrode active material layer
55 Separator
56 Gel electrolyte layer
57 Protective tape
60 Exterior member
61 Adhesive film
70 Laminated electrode assembly
71 Positive electrode lead
72 Negative electrode lead
73 Positive electrode
74 Negative electrode
75 Separator
76 Fixing member
80 Cell
81 Circuit board
82a Top cover
82b Bottom cover
83 Hard laminate film
84 Notch part
85 Soft laminate film
86 Recess 87 Adhesive film
90 Battery pack
100 Power storage system
101 House
102a Thermal power station
102b Nuclear power station
102c Hydroelectric power station
102 Centralized electric power system
103 Power storage device
104 Domestic power generation device
105 Power consuming device
105a Refrigerator
105b Air conditioning device
105c Television receiver
105d Bathroom
106 Electric vehicle
106a Electric car
106b Hybrid car
106c Electric motorcycle
107 Smart meter
108 Power hub
109 Electric power network
110 Control device
111 Sensor
112 Information network
113 Server
200 Hybrid vehicle
201 Engine
202 Power generator
203 Electric power driving force transducer
204a, 204b Driving wheels
205a, 205b Car wheels
208 Battery
209 Vehicle control device
210 Various sensors
211 Charging slot
301 Assembled battery
301a Secondary battery
302a Charging control switch
302b Diode
303a Discharging control switch
303b Diode
304 Switch unit
307 Current detection resistance
308 Temperature detection element
310 Control unit
311 Voltage detection unit
313 Current measuring unit
314 Switch control unit
317 Memory
318 Temperature detection unit
321 Positive electrode terminal
322 Negative electrode terminal

The invention claimed is:

1. A battery comprising:
a positive electrode;
a negative electrode; and
an electrolyte layer disposed between the positive electrode and the negative electrode,
wherein the electrolyte layer is formed from (i) a gel-like electrolyte containing heat absorbent particles, a liquid electrolyte, and a resin material for retaining the liquid electrolyte, or (ii) a solid electrolyte containing the heat absorbent particles,
wherein a mass ratio of the heat absorbent particles and the resin material is in the range of 20:80 to 80:20,
wherein the electrolyte layer has a heat capacity per unit volume of 0.4 J/Kcm$^3$ or less and a heat capacity per unit area of 0.0002 J/Kcm$^2$ or more, and
wherein the heat absorbent particles have a specific heat capacity of 0.5 J/gK or more and a melting point of 1000° C. or higher,
wherein the heat absorbent particles comprise a silicic acid salt and wherein the silicic acid salt is at least one selected from a nesosilicate mineral, a sorosilicate mineral, a cyclosilicate mineral, an inosilicate mineral, a tectosilicate mineral, an asbestos, a sepiolite, and an imogolite, and
wherein the heat absorbent particles have an anisotropic shape,
wherein the ratio of the length of the longest part of the heat absorbent particle and the length of the shortest part of the heat absorbent particle in a direction perpendicular to the longest part ("length of the shortest part"/{length of the shortest part}) is 3 times or more.

2. The battery according to claim 1, further comprising a separator provided between the positive electrode and the negative electrode, wherein the electrolyte layer is disposed at least one of between the positive electrode and the separator, and between the negative electrode and the separator.

3. The battery according to claim 1, wherein the heat absorbent particles are present in a dispersed state in the electrolyte layer.

4. The battery according to claim 1, wherein the heat absorbent particles further comprise one or more of alumina, boehmite, yttrium oxide, titanium oxide, magnesium oxide, zirconium oxide, silicon oxide, zinc oxide, aluminum nitride, boron nitride, silicon nitride, titanium nitride, silicon carbide, boron carbide, barium titanate, strontium titanate, barium sulfate, a silicic acid salt, $Li_2O_4$, $Li_3PO_4$, LiF, aluminum hydroxide, graphite, carbon nanotubes, and diamond.

5. The battery according to claim 1, wherein the tectosilicate mineral is a zeolite.

6. The battery according to claim 1, wherein at least one of the melting point and the glass transition temperature of the resin material is 180° C. or higher.

7. The battery according to claim 6, wherein the resin material is polyvinylidene fluoride.

8. The battery according to claim 1, wherein a negative electrode active material included in the negative electrode is formed from a material containing at least one of a metal element and a semimetal element as a constituent element.

9. A battery pack comprising: the battery according to claim 1; a control unit controlling the battery; and an exterior material enclosing the battery.

10. An electronic apparatus comprising the battery according to claim 1, and receiving the supply of electric power from the battery.

11. An electric vehicle comprising: the battery according to claim 1, a conversion device receiving the supply of electric power from the battery and converting the electric power to the driving force for the vehicle; and a control device performing information processing in connection with the vehicle control, based on information on the battery.

12. A power storage device comprising the battery according to claim 1, wherein the power storage device is configured to supply electric power to an electronic apparatus connected to the battery.

13. The power storage device according to claim 12, comprising an electric power information control device configured to transmit and receive signals to and from another apparatus through a network, and perform charge-discharge control of the battery based on information received by the electric power information control device.

14. An electric power system configured to receive the supply of electric power from the battery according to claim 1, or supply electric power from a power generation device or an electric power network to the battery.

15. The battery according to claim 1, wherein the nesosilicate mineral is one or both of olivine and mullite.

16. The battery according to claim 1, wherein the anisotropic shape comprises one or more of a needle shape particle, a scaly shape particle, and a sheet shape particle.

17. The battery according to claim 1, wherein the heat absorbent particles comprise primary particles having an average particle size of 0.3 µm or more.

18. The battery according to claim 1, wherein the heat absorbent particles comprise primary particles having an average particle size of 1.0 µm or less.

19. The battery according to claim 1, wherein the heat absorbent particles comprise primary particles having an average particle size in the range of 0.3 µm to 0.8 µm.

20. The battery according to claim 1, wherein the heat absorbent particles comprise first primary particles having an average particle size in the range of 0.3 µm to 0.8 µm, and second primary particles having an average particle size in the range of 1.0 µm to 10 µm.

21. The battery according to claim 1, wherein the heat absorbent particles comprise first primary particles having an average particle size in the range of 0.3 µm to 0.8 µm, and third primary particles having an average particle size in the range of 0.01 µm to 0.10 µm.

22. The battery according to claim 1, wherein a heat capacity per unit area of 0.0015 J/Kcm$^2$ or less.

23. An electrolyte layer formed from (i) a gel-like electrolyte containing heat absorbent particles, a liquid electrolyte, and a resin material for retaining the liquid electrolyte, or from (ii) a solid electrolyte containing the heat absorbent particles,
wherein a mass ratio of the heat absorbent particles and the resin material is in the range of 20:80 to 80:20, the electrolyte layer has a heat capacity per unit volume of 0.4 J/Kcm$^3$ or less and a heat capacity per unit area of 0.0002 J/Kcm$^2$ or more, and the heat absorbent particles have a specific heat capacity of 0.5 J/gK or more and a melting point of 1000° C. or higher,
wherein the heat absorbent particles comprise a silicic acid salt and wherein the silicic acid salt is one or more of a nesosilicate mineral, a sorosilicate mineral, a cyclosilicate mineral, an inosilicate mineral, a tectosilicate mineral, an asbestos, a sepiolite, and an imogolite, and
wherein the heat absorbent particles have an anisotropic shape,
wherein the ratio of the length of the longest part of the heat absorbent particle and the length of the shortest part of the heat absorbent particle in a direction perpendicular to the longest part ("length of the shortest part"/{length of the shortest part}) is 3 times or more.

* * * * *